United States Patent
MacLean et al.

(10) Patent No.: US 7,088,388 B2
(45) Date of Patent: Aug. 8, 2006

(54) METHOD AND APPARATUS FOR CALIBRATING A SENSOR FOR HIGHLIGHTS AND FOR PROCESSING HIGHLIGHTS

(75) Inventors: Steven D. MacLean, Webster, NY (US); Roger A. Morton, Penfield, NY (US); Kenneth A. Parulski, Rochester, NY (US); Nestor M. Rodriguez, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 591 days.

(21) Appl. No.: 10/072,251

(22) Filed: Feb. 7, 2002

(65) Prior Publication Data

US 2002/0110376 A1 Aug. 15, 2002

Related U.S. Application Data

(60) Provisional application No. 60/267,348, filed on Feb. 8, 2001.

(51) Int. Cl.
*H04N 9/68* (2006.01)

(52) U.S. Cl. .................. 348/234; 348/238; 348/228.1; 348/229.1

(58) Field of Classification Search ............... 348/234, 348/235, 238, 241, 251, 297, 222.1, 228.1, 348/230.1, 207.2, 236, 221.1, 229.1
See application file for complete search history.

(56) References Cited

U.S. PATENT DOCUMENTS

| | | | |
|---|---|---|---|
| 4,051,458 A | 9/1977 | Morton | |
| 4,479,062 A | 10/1984 | Kawasaki et al. | |
| 4,652,735 A | 3/1987 | Ishikawa et al. | |
| 5,010,504 A | 4/1991 | Lee et al. | |
| 5,047,861 A | 9/1991 | Houchin et al. | |
| 5,055,667 A | 10/1991 | Sayag | |
| 5,151,588 A | 9/1992 | Kiri et al. | |
| 5,221,848 A * | 6/1993 | Milch | 250/559.02 |
| 5,235,197 A | 8/1993 | Chamberlain et al. | |
| 5,247,366 A * | 9/1993 | Ginosar et al. | 348/256 |
| 5,260,592 A | 11/1993 | Mead et al. | |
| 5,280,354 A * | 1/1994 | Nakamura | 348/688 |
| 5,631,705 A * | 5/1997 | Tani | 348/314 |
| 5,982,424 A | 11/1999 | Simerly | |
| 6,028,299 A | 2/2000 | Hirama et al. | |
| 6,040,858 A * | 3/2000 | Ikeda | 348/242 |
| 6,069,377 A * | 5/2000 | Prentice et al. | 257/292 |
| 6,088,059 A * | 7/2000 | Mihara et al. | 348/335 |
| 6,252,536 B1 * | 6/2001 | Johnson et al. | 341/155 |

(Continued)

OTHER PUBLICATIONS

Brad Hunt et al., "High Resolution Electronic Intermediate Systems for Motion Picture", J. SMPTE, 100, pp. 156-161, Mar. 1991.

(Continued)

*Primary Examiner*—David Ometz
*Assistant Examiner*—Nelson D. Hernandez
(74) *Attorney, Agent, or Firm*—Pamela R. Crocker

(57) ABSTRACT

A method and apparatus for calibrating a sensor for highlights and for processing highlights is described. In an embodiment, a method includes identifying highlight regions in an image of a scene. The method further includes calculating flare intensity values for the image using the locations of the highlight regions. The method also includes subtracting the flare intensity values from the image.

2 Claims, 35 Drawing Sheets

U.S. PATENT DOCUMENTS

| | | | |
|---|---|---|---|
| 6,697,114 B1 * | 2/2004 | Merrill | 348/308 |
| 6,765,611 B1 * | 7/2004 | Gallagher et al. | 348/222.1 |
| 6,809,768 B1 * | 10/2004 | Merrill | 348/308 |
| 6,831,692 B1 * | 12/2004 | Oda | 348/315 |
| 2004/0130638 A1 * | 7/2004 | Sakamoto | 348/254 |

OTHER PUBLICATIONS

Robert Rast, "SMPTE Technology Committee on Digital Cinema-DC28: A Status Report" J. SMPTE, 110, pp. 78,84, Feb. 2001.

* cited by examiner

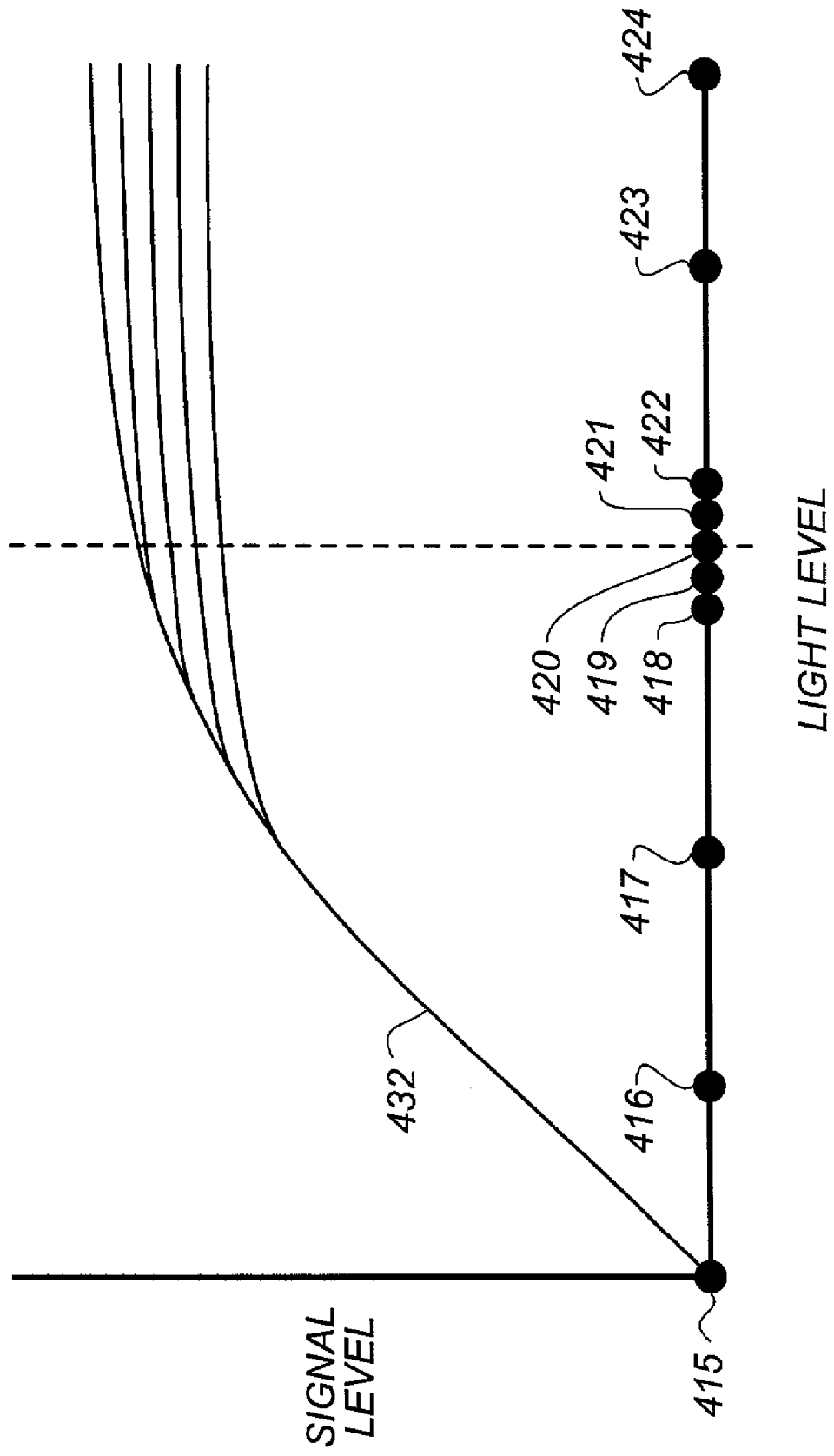

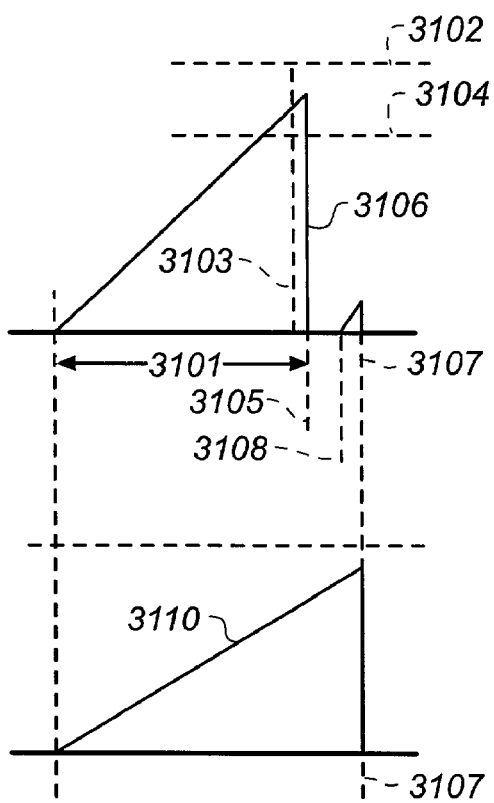
FIG. 31A
FIG. 31B
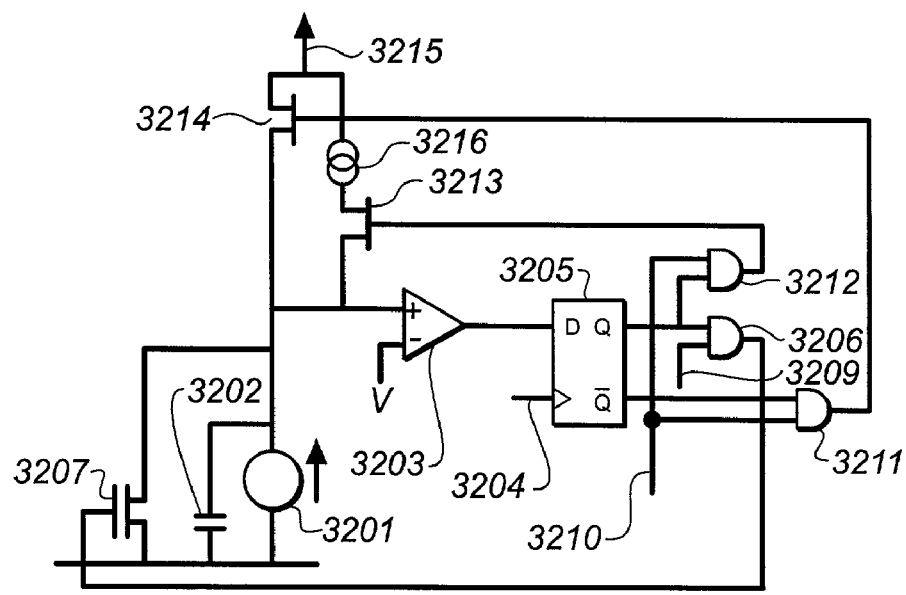
FIG. 32

METHOD AND APPARATUS FOR CALIBRATING A SENSOR FOR HIGHLIGHTS AND FOR PROCESSING HIGHLIGHTS

CROSS-REFERENCE TO RELATED APPLICATION(S)

This application is related to and claims priority from a U.S. application entitled "Accurately Reproducing Image Highlights Using Electronic Sensors—Signal Processing" having Ser. No. 60/267,348 by MacLean et al., filed on Feb. 8, 2001, and incorporated by reference herein.

BACKGROUND OF THE INVENTION

1. Field of the Invention

The present invention is directed to the field of processing data from electronic light sensors that are directly exposed to a scene or that are exposed to film that has captured the scene.

2. Description of the Related Art

Photographic film is often able to capture in a single exposure the full dynamic range of a scene, which can often have a range of up to one million to one. However, this full dynamic range may not be communicated to the viewer through conventional optical and digital techniques.

Fortunately, because of the nature of photographic film and because of its wide latitude, it is possible to scan the developed film negative using an electronic photosensitive or charge coupled device ("CCD") sensor. Although the CCD used in the scanner is based on conventional electronic sensor technology, this arrangement of film scanning can capture the entire dynamic range of the scene. The ability to capture over 16 stops (where a stop corresponds to a two-to-one increase in light level) has been demonstrated. The issue with film is shown in FIG. 37 where, for different colors, while the response may be consistent within normal intensity ranges, the response may differ at extreme ranges of highlights. Notice that FIG. 37 is plotted as the logarithmic to the base 10 of intensity E of the scene against the data value from the AND of the film scanner after passing through a look up table to produce, for example, density values of the film.

CCDs and other electronic scene sensors generate image signals by producing an electron signal that is generally converted into an output voltage. CCDs for example, produce an electron charge generated by photons that impinge on the sensor area of the CCD or other electronic sensor. Consequently, this imaging process is fundamentally linear with light intensity for a fixed exposure time (and integrated light energy for a variable exposure time). Because of this linear nature, typical electronic images have a dynamic range of about one thousand-to-one. However, a scene can also have specular highlights with a range of up to one million-to-one or greater. Accurate reproduction of both the color and structure of these highlights is required if a scene is to be accurately reproduced.

What is needed and the problem to be solved is the provision of a system for increasing the dynamic range of an electronic image sensor and the ability to ensure that, for a film-based system, the scene is accurately captured over its entire range.

SUMMARY OF THE INVENTION

It is an aspect of the invention to improve the dynamic range of a captured image using calibration techniques on the image capture system.

It is another aspect to improve the dynamic range of a captured image using signal processing operations on the captured image.

It is another aspect to electronically capture a picture that has areas that are more than ten times brighter than the whitest reflective area in the picture using a highlight sensitive sensor, and to accurately reproduce those areas electronically.

A method and apparatus for calibrating a sensor for highlights and for processing highlights is described. In an embodiment, a method includes identifying highlight regions in an image of a scene. The method further includes calculating flare intensity values for the image using the locations of the highlight regions and other flare-sensing methods. The method also includes subtracting the flare intensity values from the image.

BRIEF DESCRIPTION OF THE DRAWINGS

FIGS. 4a–c illustrate an apparatus for the implementation of a data conversion function for a multi-mode electronic sensor, according to embodiments of the invention.

FIG. 31a–b illustrate a timing configuration, according to embodiments of the invention.

FIG. 32 illustrates a circuit, according to embodiments of the invention.

DETAILED DESCRIPTION OF THE PREFERRED EMBODIMENTS

Figure 1A:
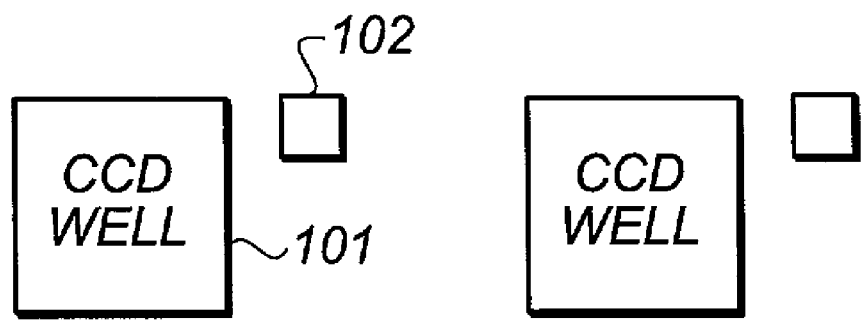
FIGS. 1a–f illustrate multi-mode sensors, according to embodiments of the invention.

A system for increasing the dynamic range of an electronic image is disclosed. A number of different techniques can be used to impose the dynamic range of an electronic image. It is an aspect of the present invention to electronically capture a picture that has areas that are at least ten times brighter than the whitest diffuse reflective area in the picture using a highlight sensitive sensor, and to accurately reproduce those areas electronically. It is another aspect of the present invention to improve the accuracy of the dynamic range of the captured image for both electronic cameras and film based cameras using calibration operations on the image capture system. It is a further aspect of the present invention to improve the dynamic range of the captured image using signal processing operations on the captured image. Another aspect of this invention is to ensure that in highlight areas sensors and their associated systems can provide stable, reproducible and accurate data so that the color and texture in highlights can be consistently and accurately represented as digital image intensity values. Another aspect of this invention is to ensure that, in highlight areas, sensors and their associated systems can display, in a visually realistic or acceptable way, the full captured dynamic range within the limitations of the display device. The above aspects can be attained by a system that includes highlight sensitive sensor combined with a highlight processing system. The highlight processing system can include a system for calibrating the image capture system and/or a system for applying image processing operations to the captured image.

Other aspects of this invention include: (1) calibration technique with highlights—calibrating directly looking at a light source; (2) increasing or adjusting the light level to tabulate where the switch point level of mode switching sensor systems provide greater sensitivity, to expand dynamic range; (3) identifying classes of electronic sensor photosites and apply the appropriate calibration and conversion methods to produce a faithful imaging signal; (4) outputting the maximum switch level of the sensor to enable processing to compensate for switch level artifacts; (5) using a lookup table that responds to a mode in which the sensor is operating data and applies an appropriate lookup table function for that specific mode; (6) using merged data and a lookup table with the mode as an input into image processing to correct for mode switching contours; (7) using separate lookup tables for each sensor mode; (8) correcting for sensor errors in highlight data by computing the function describing the error and then computing the inverse and applying it to the data from the sensor; (9) computing correction to be applied as a sum or product of image sensor data; (10) accurately reproducing highlights and then scaling the intensity in such a way that the texture and color of the highlight is preserved while remaining in the range desired by the film director or reproduction medium; (11) merging data from a multi-mode sensor using a lookup table; (12) performing sensor correction for highlights in two spaces, for example, a log space and a linear space; (13) automatically calibrating film by downloading the film batch or other ID on the Internet or other electronic communication system, to provide data automatically into the system for appropriate calibration; (14) updating film calibration data by uploaded film history or time since manufacture, before downloading calibration data to the scanner; using software to modify calibration data in the scanner based on film history; (15) providing digital data along with film to calibrate the film; (16) solving for the optimal function $G(C_1,C_2)$ in order to ensure optimal calibration between different modes or outputs between different channels, including simultaneous output channels and outputs from single channels; (17) rendering scenes with full highlight information to match the available output dynamic range of the output device; (18) capturing the full color highlights of an image by performing calibration of the full dynamic range of the image and then processing the image in such a way that texture an highlights are preserved while ensuring that the display print or output device is operating within its available dynamic range; (19) suppressing or modifying the size or appearance of highlights; (20) modifying lookup tables based on the lens used; (21) calibrating highlights at a center or single position in a field; (22) calibrating across an entire field; (23) to prevent false color from contaminating the highlights, adding a term that reduces color saturation (by, for example, converting into YCC color space, reducing the gain on the two C channels and then converting back to the original spec, or going through a 3×3 matrix to reduce the color) to desaturate the color as the luminance increases beyond the channel saturation point; (24) extending the black range or shadow detail, paying attention to saturation and noise—noise removal; and (25) correcting the bilinear or higher order term of a lookup table that corrects for highlights to 2D bilinear or higher order, to merge multiple output channels from CCD sensors.

A system for increasing the dynamic range of an electronic image is disclosed. A number of different techniques can be used to improve the dynamic range of an electronic image. The discussion below will cover: (1) calibration, (2) signal processing, and (3) sensor changes of film-based systems using electronic scanning as well as electronic cameras. These techniques can be used alone or in combination to improve the dynamic range of electronic images.

Figure 35A:
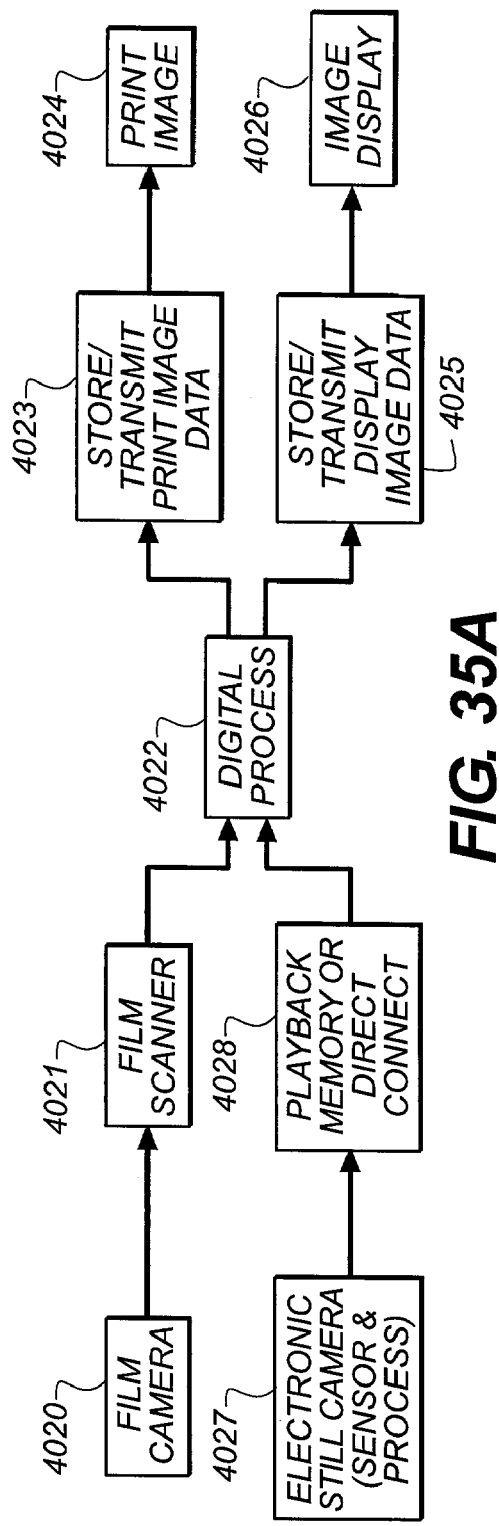
FIGS. 35a–b illustrate systems for capturing stationary or still images using either film or electronic apparatuses and applying digital processing before printing or displaying the captured image, and systems for capturing motion images using either film or electronic apparatuses and applying digital processing before using film or electronic apparatuses for displaying the captured image, according to embodiments of the invention.

FIG. 35a illustrates a block diagram encompassing a variety of scene capture to image output systems into which the technologies described herein may be applied. These systems are associated with capturing stationary or still images using either film or electronic apparatuses and applying digital processing before printing or displaying the captured image. Film Camera 4020 uses photosensitive film to capture a scene. This film is processed and scanned in Film Scanner 4021 to produce digital or electronic data that corresponds to the captured scene. This data is then processed in Digital Processor 4022 to transform the image to remove artifacts already introduced using a variety of approaches including those described herein, enhance quality using a variety of approaches including those described herein, add image information, extend both the black and white dynamic range as described herein, correct or prepare for downstream display, or print functions or perform a variety of other possible digital processes.

Alternately, image data may be captured by the Electronic Still Camera (sensor & process) 4027 producing electronic data that may have been processed within the camera in numerous ways, including enhancing quality, compensating for sensor artifacts, and extending both the black and white dynamic range as described herein. The data is then passed to the Digital Processor 4022 via the Playback Memory or Direct Connect function 4028. The Digital Processor 4022 may then further transform the image so as to remove artifacts already introduced using a variety of approaches including those described herein, enhance quality using a variety of approaches including those described herein, add image information, extend both the black and white dynamic range as described herein, correct or prepare for downstream display, or print functions or perform a variety of other possible digital processes.

If the image is to be printed, it may be first stored or transmitted. This function is performed by Store/Transmit Print image data function 4023. The data then passes to Printer 4024 for printing. Alternatively, the image may be viewed in a display apparatus. To achieve this it is stored or transmitted. This function is performed by Store/Transmit Print image data function 4025 that forwards data to the Image Display 4026.

Figure 35B:
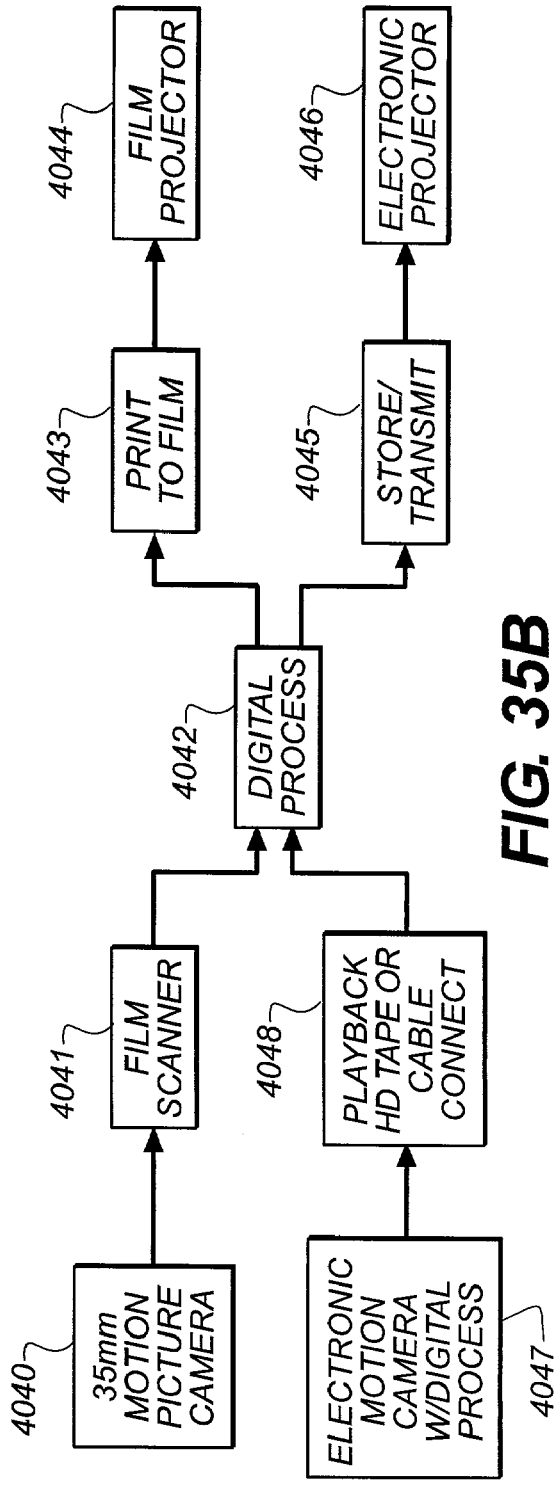

FIG. 35b illustrates a block diagram encompassing motion picture scene capture to image output systems into which the technologies described herein may be applied. These systems are associated with capturing motion images using either film or electronic apparatuses and applying digital processing before printing or displaying the captured image The 35 mm Motion Picture Camera 4040 uses photosensitive film to capture a motion scene. This film is processed and scanned in Film Scanner 4041 to produce digital or electronic data that corresponds to the captured motion scene. This data is then processed in Digital Processor 4042 to calibrate the image, transform the image so as to remove artifacts already introduced using a variety of approaches including those described herein, enhance quality using a variety of approaches including those described herein, add image information, extend both the black and white dynamic range as described herein, correct or prepare for downstream display or print functions, or perform a variety of other possible digital processes.

Digital Processor 4042 may also change the artistic look of the image. The concept of look is associated with terms such as "film look," "soft look," or "harsh look," and is based on the assessment by artists of the appearance of the image. Manipulating a variety of image properties including tone scale, sharpness, noise, and image grain changes the look. Digital Processor 4042 may include conventional digital post-production processes such as digital intermediate processes, similar processes referred to in Brad Hunt, Glenn Kennel, LeRoy DeMarsh and Steve Kristy "High Resolution Electronic Intermediate Systems for Motion Picture" J. SMPTE, 100: 156–161, March 1991 or the digital functions performed by companies such as Cinesite®. The processing may also include the functions of Electronic Preparation of Elements, Color Correction layers, or the various conversion functions referred to in Robert (Bob). R. M. Rast, "SMPTE Technology Committee on Digital Cinema—DC28: A Status Report" J .SMPTE, 110: 78–84, February 2001.

Instead of using film, image data may be captured by the Electronic Motion Camera w/digital process 4047 producing electronic data that may have been processed within the camera in numerous ways including to transform the image so as to remove artifacts already introduced using a variety of approaches including those described herein, enhance quality using a variety of approaches including those described herein, add image information, extend both the black and white dynamic range as described herein, correct or prepare for downstream display, or print functions or perform a variety of other possible digital processes.

The in-camera processing may also change the artistic look of the image. The concept of look is associated with terms such as "film look," "soft look," or "harsh look," and is based on the assessment by artists of the appearance of the image. Manipulating a variety of image properties including tone scale, sharpness, noise, and image grain changes the look.

The in-camera processing may include conventional digital post-production processes such as digital intermediate processes, similar processes referred to in Brad Hunt, Glenn Kennel, LeRoy DeMarsh and Steve Kristy "High Resolution Electronic Intermediate Systems for Motion Picture" J. SMPTE, 100: 156–161, March 1991 or the digital functions performed by companies such as Cinesite®. The processing may also include the functions of Electronic Preparation of Elements, Color Correction layers, or the various conversion functions referred to in Robert (Bob). R. M. Rast, "SMPTE Technology Committee on Digital Cinema—DC28: A Status Report" J .SMPTE, 110: 78–84, February 2001. The data is then passed to the Digital Processor 4042 via the Playback HD Tape or Cable Connect 4048. The Digital Processor 4042 may then further calibrate the image, transform the image so as to remove artifacts already introduced using a variety of apparatuses including those described herein, enhance quality using a variety of apparatuses including those described herein, add image information, extend both the black and white dynamic range as described herein, correct or prepare for downstream display or print functions, or perform a variety of other possible digital processes.

Data from the Electronic Motion Camera w/digital process 4047 is then passed to the Playback HD Tape or Cable Connect function 4048 and then passes to the Digital Process 4042 function that performs some or all of the aforementioned functions If the image is to be passed to film, it is first recorded to film and then, in the preferred embodiment the film, is duplicated using film printers common in to the motion picture industry. This function is performed by Print to Film 4043. The film then passes to the Film Projector 4044 that projects the images to the motion picture screen.

Alternatively, the image may be viewed using an electronic projector. To achieve this, data from Digital Processor 4042 is stored, transmitted, or both. This function is performed by Store/Transmit 4045 that forwards data to the Electronic Projector 4046. The Electronic Projector 4046 projects the images to the motion picture screen.

Multi-mode electronic sensors, as disclosed in this invention, are one way to capture a wide dynamic range scene. These multi-mode sensors have modes with different levels of sensitivity. As a single image signal is generally required by downstream electronics processes, it is necessary to merge the signals from the each of the modes.

One type of multi-mode sensing system includes normal charged coupled device ("CCD") elements and less sensitive CCD elements that only reproduce the highlights. These elements can be rendered less sensitive by being smaller than the primary elements or having a shorter integration time. This is shown in FIG. 1a where primary CCD element 101 is used for the range of image intensity below its saturation level. The second CCD element 102 is used for intensities in the region of or above saturation level of CCD well 101.

The method of communicating which one or whether both CCD wells contribute to the output signal can be as described below.

During output of the CCD signal the output of both CCD elements can be sent to the output of the CCD chip. Alternatively a threshold sensor associated with CCD well 101 can sense whether it is at or near saturation and if so the output signal from CCD well 102 can be inserted in place of the output of CCD well 101. Along with this output would be a signal indicating which CCD (101 or 102) is responsible for the output signal. Although the signals within light sensors, associated circuitry, and connectors may in fact go either positive or negative with increasing light depending on the specific design, for ease of understanding descriptions herein, the convention that increasing light produces increasing signal is generally used.

further method is to output the signal from both CCD wells. It is also possible to output the signal from the appropriate CCD well and indicate whether the signal is derived from 101 or 102 by changing the polarity of the output signal with respect to a reference level, for example signals above the reference level would correspond to 101 or signals below the reference level would correspond to 102. It is also possible to change the reference level to indicate whether it is from 101 or 102.

Figure 1B:
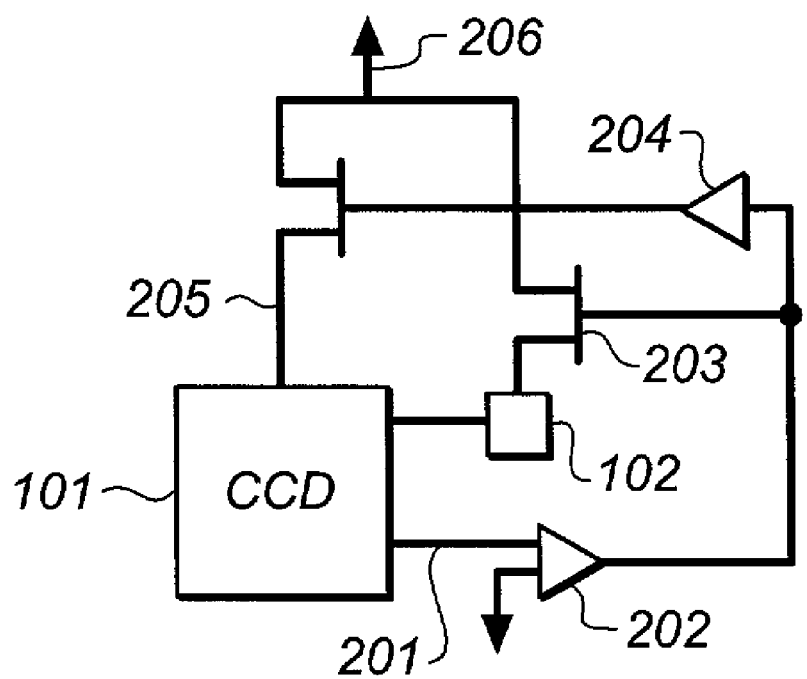

One method of implementing these types of techniques is shown in FIG. 1b where the primary CCD site 101 generates a signal on line 201 to a thresholding device such as a single transistor 202 which controls a gating transistor 203 to output the charge from low sensitivity CCD site 102 when the signal on line 201 indicates that CCD site 101 is reaching its full charge.

Simultaneously inverter 204 generates a signal to gate transistor 205 which is normally the operative transistor to transfer the charge from CCD site 101 and disables this so that the charge to the CCD shift register on line 206 can come from either CCD site 101 if it is not full, and from CCD site 102 when 101 is full or is close to full.

It will be appreciated that these operations could be undertaken multiple times with different periods of charge integration during the scene exposure time. These periods could be in a binary length of time in the sequence 1, 2, 4, 8, but are more likely to be in higher ratios such as 1 time increment, 60 time increments, 3600 time increments for a total integration time of 3,600 time increments (using this technique the total integration time is equal to the longest integration time, since shorter integrations occur during the longer integrations). Integrations however can be sequential leading to an integration time of 36,061 time increments or longer.

Figure 1C:
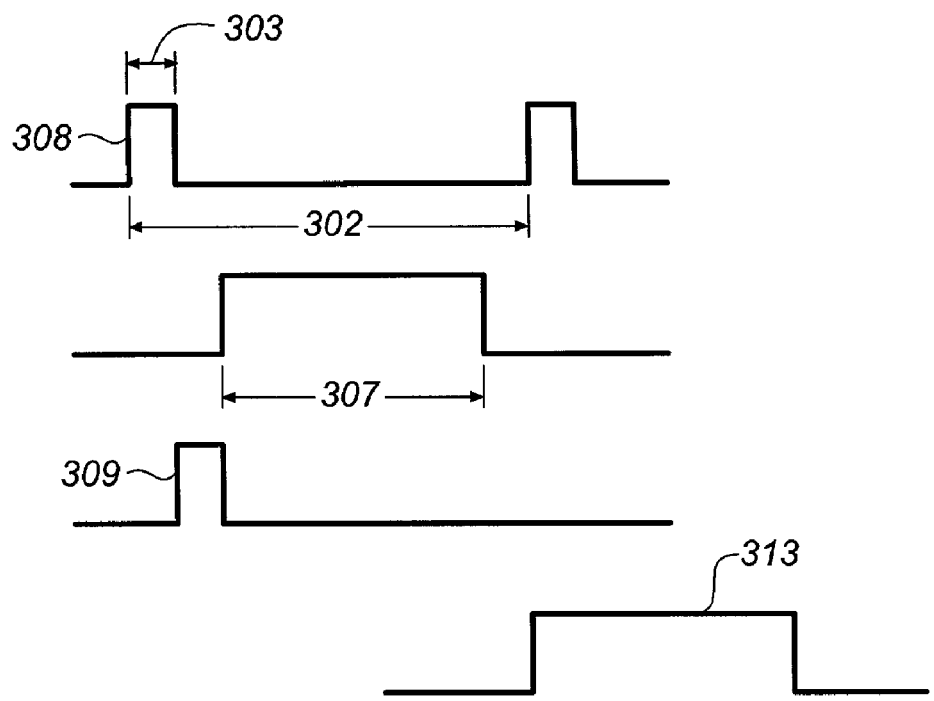
Figure 1D:
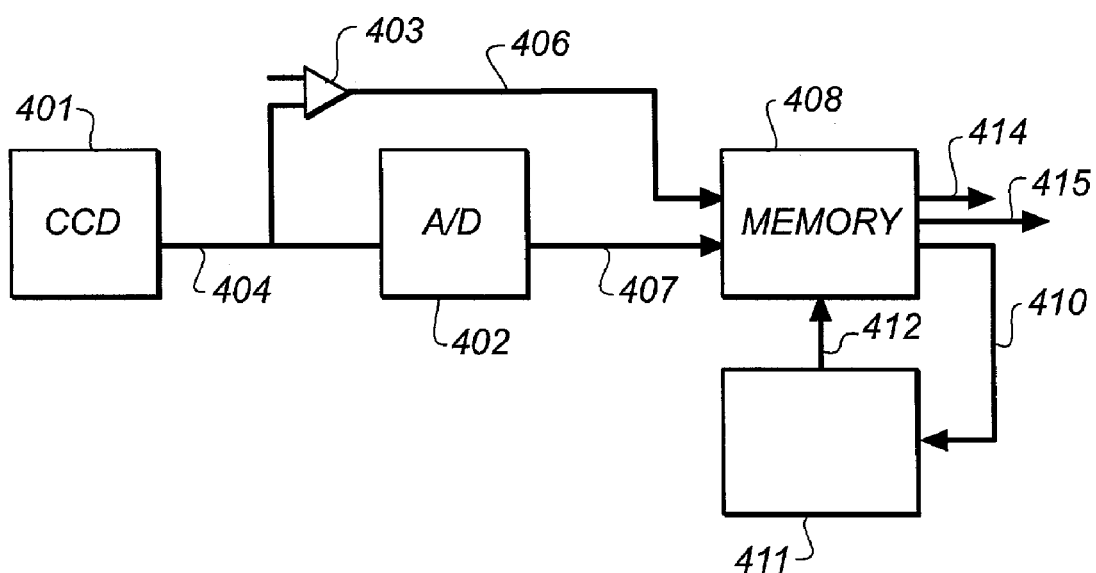
Figure 1E:
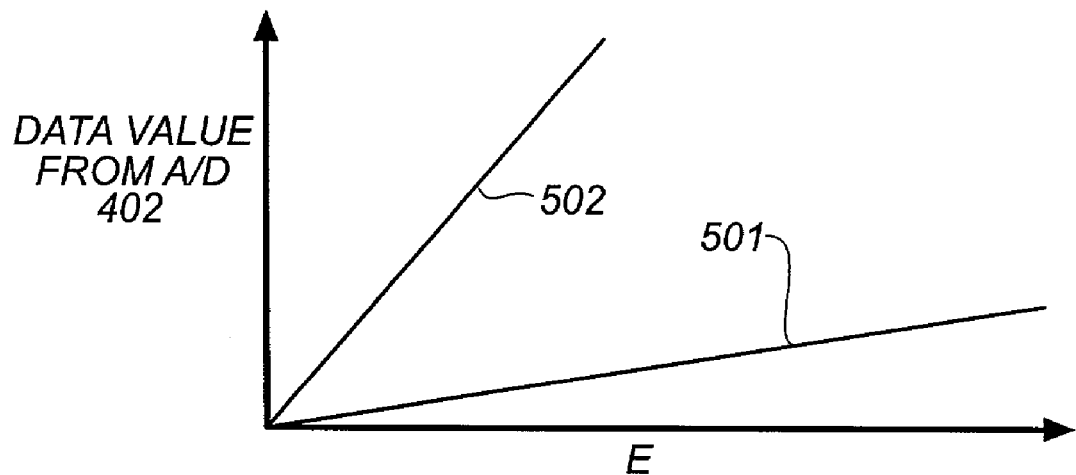

The charge signal from the sites can be stored in a memory 408 (see FIG. 1d). If the contents of the memory 408 were plotted versus scene light intensity E, as sensor response is proportional to linear light intensity, there will be two types of data as shown in FIG. 1e. When the information on line 406 indicates that the data is a result of the initial charge transfer of photo site 101 this would correspond to line 501, or subsequent discharge transfer of site 101 or any other primary photo site would correspond to line 502. If additional discharge cycles were used, other storage bits would be used and other lines required or multi-level lines would be required. The vertical axis of FIG. 1e corresponds to the data value from A/D 402 stored in memory 408.

Another type of multi-mode sensing systems uses a dual integration time approach where a short integration time is used along with a longer integration time. The short integration time is first discharged, then the longer integration time is discharged from the CCD, and then the two images are combined.

Figure 1F:
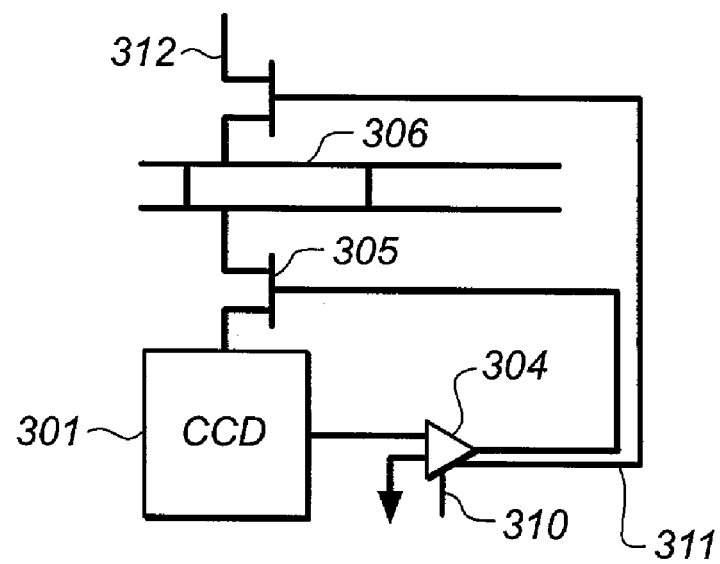

This is shown in FIGS 1c and 1f. CCD site 301 first integrates for a brief time 303, which is a brief fraction of the total integration cycle 302. If during that time level sensing circuit 304 senses that the voltage on CCD sensor 301 has exceeded a certain level then the charge on the CCD is passed during an initial CCD discharge cycle to the charge shift register by opening transistor gate 305 and discharging the signal on the shift register 306 during its initial discharge cycle. The time for this discharge cycle is shown as time 307, and is initiated at the falling edge at a time which is at or after the falling edge of pulse 308, by a clock signal 309 which is sent on line 310 to cause comparator 304 to open gate 305 provided the voltage level of CCD cell site 301 exceeds a the value V. A separate output on line 311 from comparator 304 may also be optionally used to discharge through transistor gate 312 so that there is a different level signal for example a negative signal injected into CCD charge shift register 306 in the event that CCD cell site 301 did not reach the threshold level. This different level can be used in subsequent circuitry as an indicator as to whether the level was reached and that whether this predischarge phase during period 307 contains a contribution from CCD cell site 301.

At the end of the primary integration time 302 and during period shown by waveform 313 the main discharge cycle takes place. This discharge cycle is subsequent to the discharge cycle during period 307 and can include the charge contribution of all cells whether they were predischarged or not. FIG. 1d shows the circuitry for handling these signals and 401 shows the CCD array of which CCD cell site 301 and associated electronics are a part. As signal information is discharged during period 307 on line 404, the signal is sent to A/D 402. A signal from comparator 403 senses whether the level on line 404 corresponds to a predischarge of each specific CCD cell or whether the CCD cell continues to discharge. This digital signal on line 406 along with the digital data on lines 407 is stored in digital memory 408.

During the second discharge cycle 313, the signal on line 410 stored in memory 408 is read out on line 410 in synchronism with the discharge data coming out of CCD 401. If the signal 410 indicates that the currently discharged CCD cell site has already during the 307 cycle outputted discharge data (due to the fact that it was in a high intensity region of the scene) the memory 408 control circuit 411 is signaled to prevent a further write cycle of the data on line 407 through memory control lines 412 consequently the original data in the memory is left undisturbed, but if the information of the second cycle is preempted by the discharge of the CCD during the first cycle, then new data is written into the memory. It will be appreciated that in order to achieve a wider dynamic range these cycles may be performed repeatedly.

Calibration can be performed to correct for a number of different aspects of the captured electronic image to improve the dynamic range of the image. Sensor calibration ensures that the full dynamic range of the sensor is utilized. Color calibration ensures that the optimal spectral sensitivity is utilized. Artifact calibration reduces the deleterious affect that artifacts have on the dynamic range of the image. Each of these types of calibration will be discussed below.

Meeting the improved dynamic range challenge requires an accurate calibration, over all sources of variability, of the photo sensing system response. This may be done once for each light sensor design, may need to be done for every sensor manufactured, or may need to be done for each film type or for every batch of a given film type. The decision of how frequently these calibrations need to be generated depends in part on manufacturing variability and device stability due to time, temperature, and other variables. The sensor system must also be tested for other sources of variability, such as flare, that must be characterized as part of the overall sensor system model produced by the calibration process.

Figure 2A:
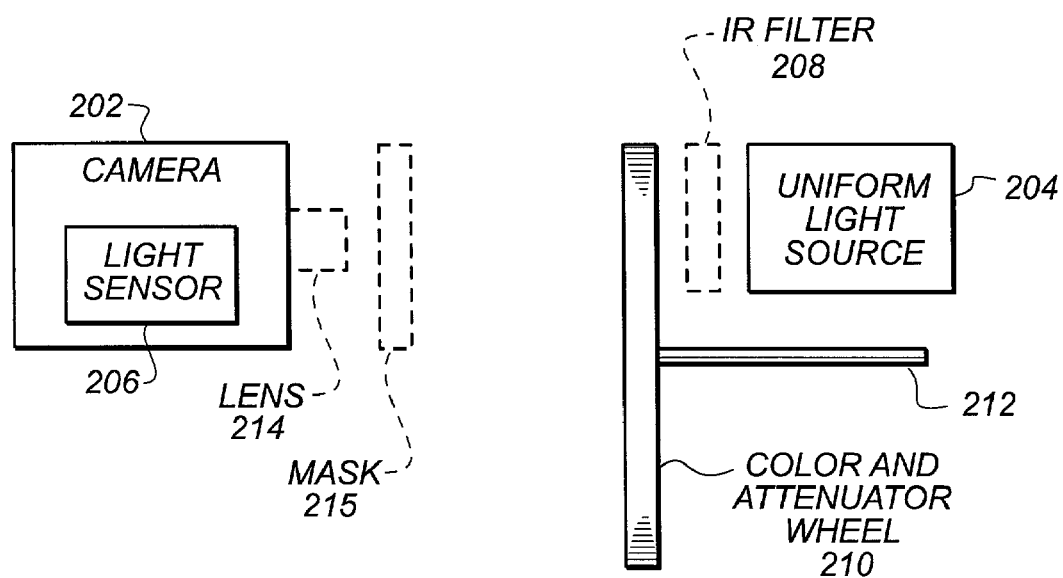
FIGS. 2a–d illustrate a sensor calibration system and a sensor calibration image and scene image data flow system, according to embodiments of the invention.

FIG. 2a illustrates a sensor calibration system of the present invention. In particular, FIG. 2a illustrates camera 202, which contains light sensor 206. However, embodiments of the present invention are not so limited, as camera 202 may be any type of electronic camera or film in combination with a CCD scanner. In an embodiment, light sensor 206 is color sensing. However, embodiments of the present invention are not so limited. For example, light sensor 206 could be monochrome. Further, in FIG. 2a, camera 202 represents any number of electronic or film cameras, and the invention is not limited to a single camera. In an embodiment, light sensor 206 is typically an array of CCDs that generate image signals by producing an electron signal that is converted into an output voltage. Alternatively, light sensor 206 may be film that is later scanned. Uniform light source 204 is situated separately from camera 202, such that uniform light source 204 casts uniform light on light sensor 206 within camera 202. In an embodiment, uniform light source 204 is a tungsten or xenon light source with appropriate optics at an appropriate distance or both, so that the light shinning or light sensor 206 is essentially uniform. However, embodiments of the present invention are not so limited, as uniform light source 204 may be of any type.

Color and attenuator wheel 210 is positioned between uniform light source 204 and camera 202, and is rotatably coupled with shaft 212 such that color and attenuator wheel 210 is able to be rotated in front of uniform light source 204, presenting a different color or image brightness and sensitivity filter through which uniform light source 204 can cast light onto camera 202. The intensity of the light can be measured in a separate photometer (not shown). The color and attenuator wheel 110 contains color filters and neutral density attenuators. Each filter or attenuator spans the region between spokes of the wheel so that the light color or brightness is modified and uniformly illuminates the sensor.

For an electronic camera, specific density values of color and attenuator wheel 210 are chosen so that the full dynamic range of the sensor is calibrated by exposing the sensor to light values that fall across that range. In addition, if a break-point approach or multi-mode approach were chosen for light sensor 206, then the exposures of color and attenuator wheel 210 are particularly concentrated at the intensities where a mode change occurs, so that the key data values that need to be used to establish correct calibration are produced. In the case of non-linear approaches, such as those used in some CCDs (or in film), the values would be distributed across the dynamic range in such a way as to accurately measure both the linear and non-linear aspects of the response. If it is not necessary to compensate for characteristics of individual pixels in the light sensor 206 in the case of an electronic camera, then not all of the CCD pixels need to be exposed or analyzed.

To control the spectral illumination and to limit heating, an IR filter 208 (illustrated in FIG. 2a using dashed lines) is optional and may be introduced in the optical path, for example, between uniform light source 204 and color and attenuator wheel 210. If it is difficult to maintain a large uniform field from uniform light source 206, or if the light sensor 206 pixel values shift as a result of the average signal level of the sensor, then selected areas of light sensor 206 may be exposed while others are left unexposed, by using a mask 215 (illustrated in FIG. 2a using dashed lines). Mask 215 or light sensor 206 may then be moved around, and repeated measurements may be made to check every CCD element in the light sensor 206, or in the case of the film camera, the CCD that will scan the film, if desired. In an alternative, mask 215 may be replaced with a lens 214 (illustrated in FIG. 2a using dashed lines) that is coupled with camera 202. In an embodiment, lens 214 is detachable, and the flare characteristics of such a lens may be separately calibrated using an apparatus, such as is shown later herein. With a calibrated light sensor 206 and lens 214, data may be loaded into calibration tables to compensate for lens characteristics. If temperature or other secondary parameters of the CCD affect calibration, then these parameters are recorded and used in the calibration process to generate tables that can respond to measurements of the secondary parameters that would be included in the camera.

Figure 2B:
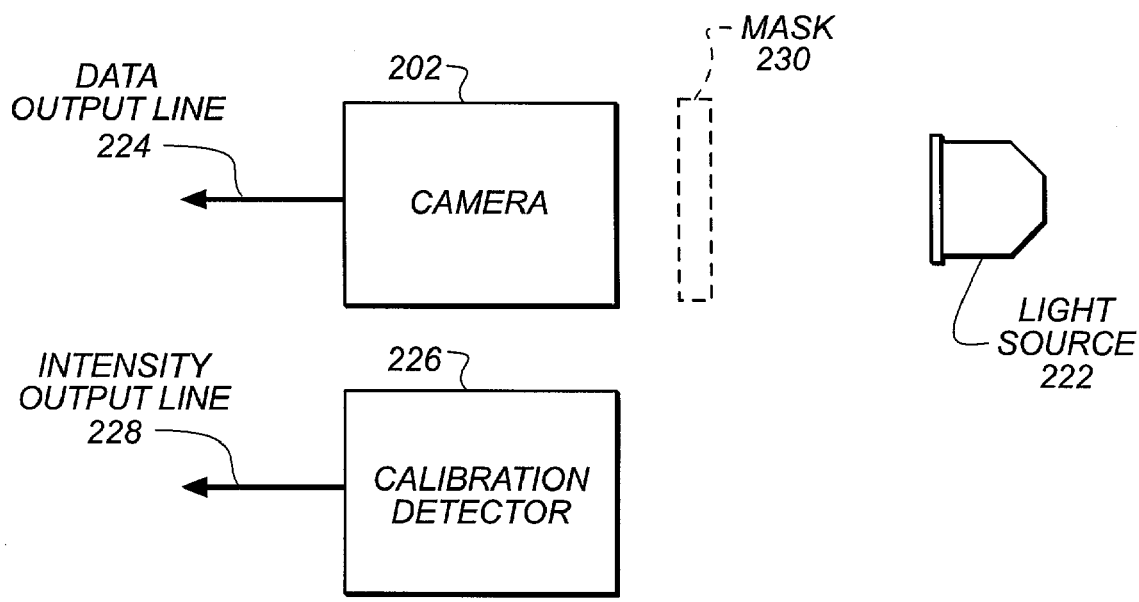

FIG. 2b illustrates a second break point or multi-mode calibration system, according to embodiments of the present invention. Specifically, FIG. 2b illustrates camera 202 (as explained in FIG. 2a) and a light source 222, having the same functionality as light sources 610 and 612 in FIG. 6. In this embodiment, camera 202 is not coupled with a lens such as lens 214. Light source 222 provides a uniform illumination of the photosensitive area in camera 202. Data is collected from light sensor 206 (not pictured) and transmitted on data output line 224 as the intensity of light source 222 is incrementally increased using filters (not shown) or by changing the light intensity electrically while preferably preserving color temperature. Based on the value of this data, it is possible to determine for each photo site the intensity of light at which a mode switch occurs. To ensure accurate calibration at this point, calibration detector 226 may also be used and the output value of the intensity adjacent to camera 202 may be transmitted on intensity output line 228 to a data collection system.

It is also possible to use a mask 230 in close proximity to the light sensor of camera 202 to image light source 222 as a shadowed highlight in small areas of the sensor to prevent the light sensor from being affected by the average picture level, or suffering from temperature changes from the intensity of the light. Camera 202 may then be shifted in XY to ensure that all pixels view a uniform highlight area during the calibration process.

Figure 2C:
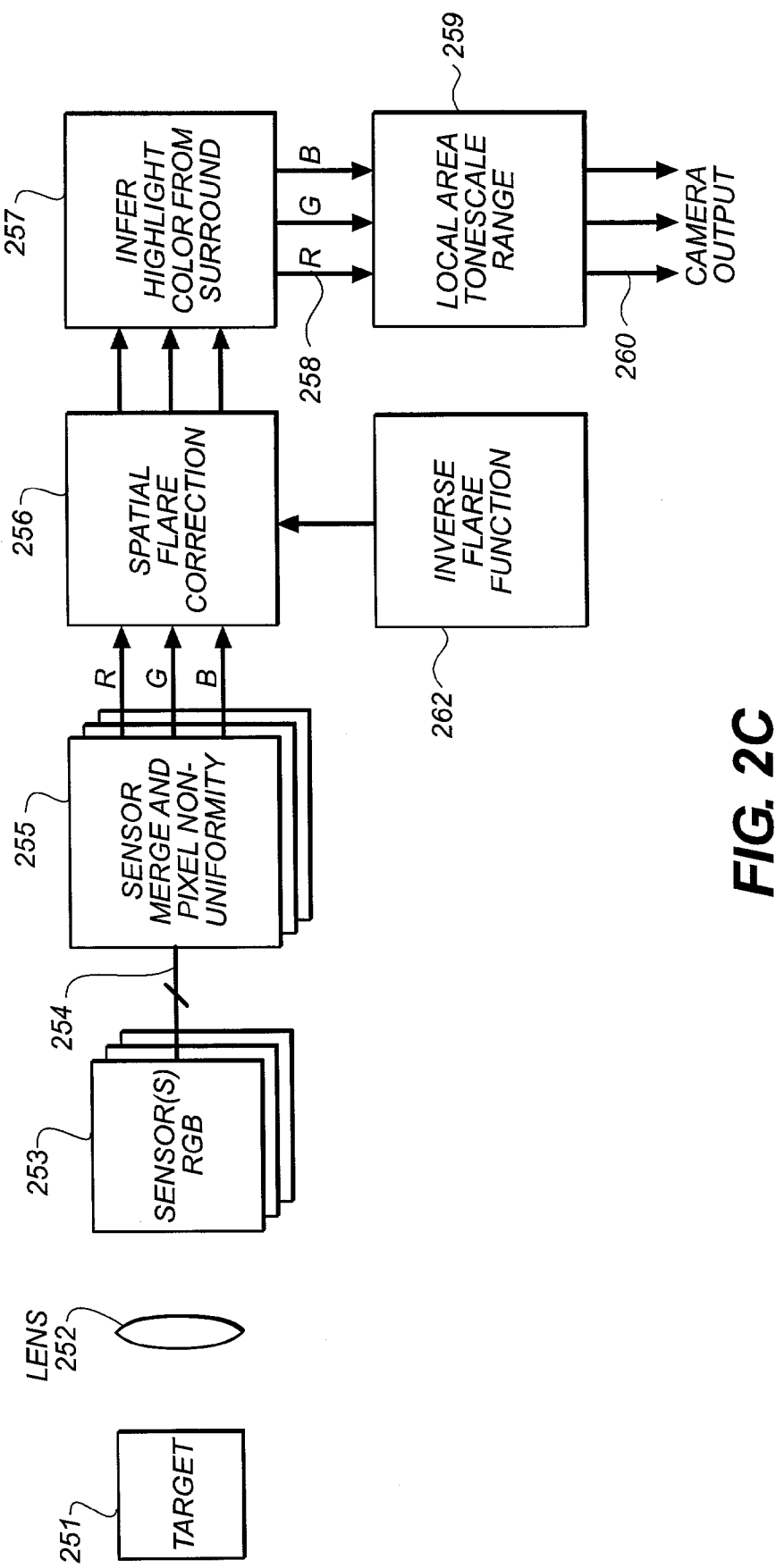

FIG. 2c shows a typical block diagram of the scanner or capture system. In this embodiment, it shows an electronic camera system viewing a calibration target 251 through lens 252. Signals are transmitted from the sensors 253, which may be red, green, and blue (RGB) sensors or some other color sensors or sensors with differed levels of attenuation, or may be a single sensor with or without multiple colors. The outputs from the sensors pass along line 254 to sensor merge and pixel non-uniformity correction functions 255. Sensor merge and pixel non-uniformity correction functions 255 may be arithmetic processing functions or lookup tables. These signals then pass to spatial flare correction functions 256 that may use an inverse flare function 262, which may also involve various techniques such as the glare correction. Highlight correction functions 257 accurately process highlight signals within the image. This process is based on information computed generally during the calibration process. The highlight is calibrated, and flare is corrected in the signal using techniques as herein described to calibrate the full range of the sensor correcting for spatial flare so that highlights are handled correctly is then obtained.

Having been fully calibrated, a signal is produced on RGB lines 258. These signals pass to local area tone scale correction functions 259 that scale the tone of the highlight to accommodate the available dynamic range from the camera or scanner output 260. These processes may be performed in other sequential orders in addition to the order laid out here, and techniques disclosed herein may perform multiple functions within one technique.

Figure 2D:
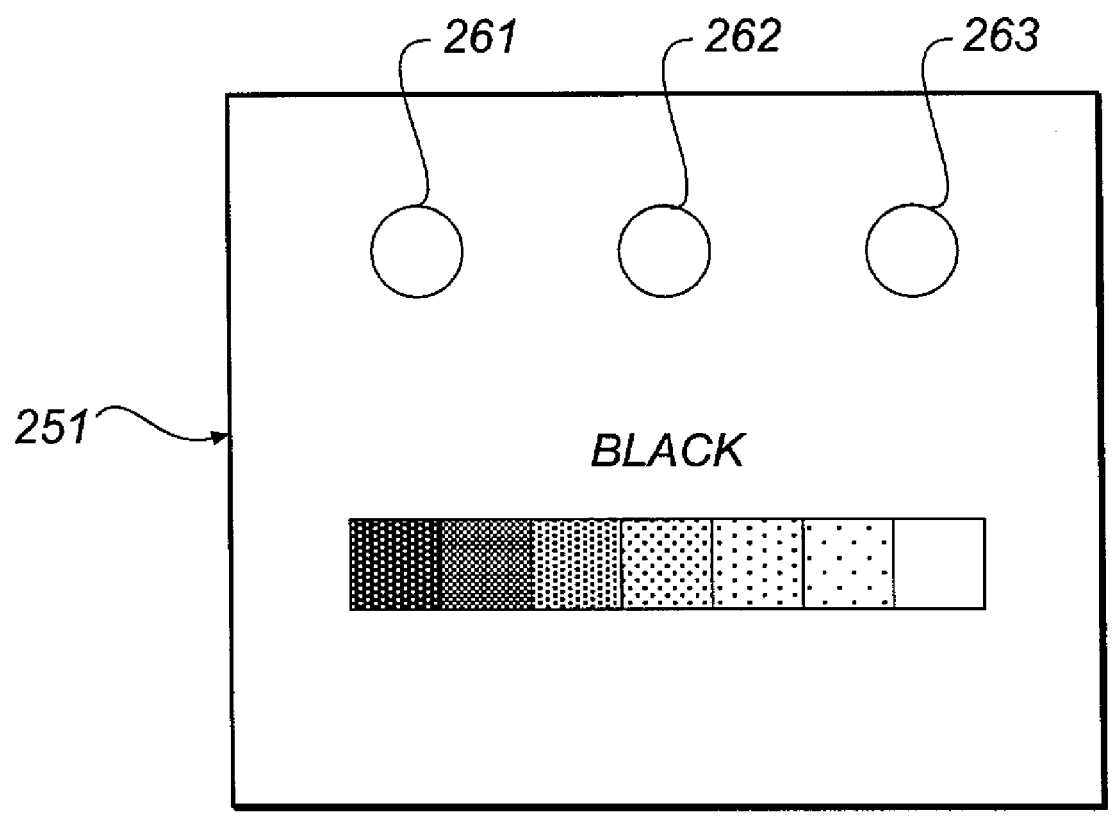

FIG. 2d shows the appearance of a typical target 251 comprising reflective calibration highlight surfaces 261, 262, and 263 that may be reflective metal surfaces imaging reflections of a calibrated source light. Each of these isolated highlight reflective surfaces will image multiple light sources to provide multiple highlights of a uniform color but at different calibrated intensities on each of the highlight surfaces 261, 262, and 263. Another embodiment involves using metal film or other attenuators with different areas of attenuation for each light source or using multiple light sources with illumination behind the metal film attenuators. Another aspect of calibration is shown in FIG. 4. FIG. 2d shows how the captured highlights may appear, to the lens 252 or for example, as image data at point 254 (see FIG. 2c), or at other points in the system.

When a highlight occurs in a scene, it is as if the sensor was pointing directly at the light source that is illuminating the scene. Normally, an image is formed by diffused reflection from objects, and so the amount of light that reaches the sensor is a very small fraction of the total light from the illuminator. In areas of highlights, this fraction is much larger, and so the intensity of the light may be up to one million times brighter than the more common diffuse areas of the scene. To simulate these higher intensities, special methods are required to generate highlight calibration light sources.

Figure 6A:
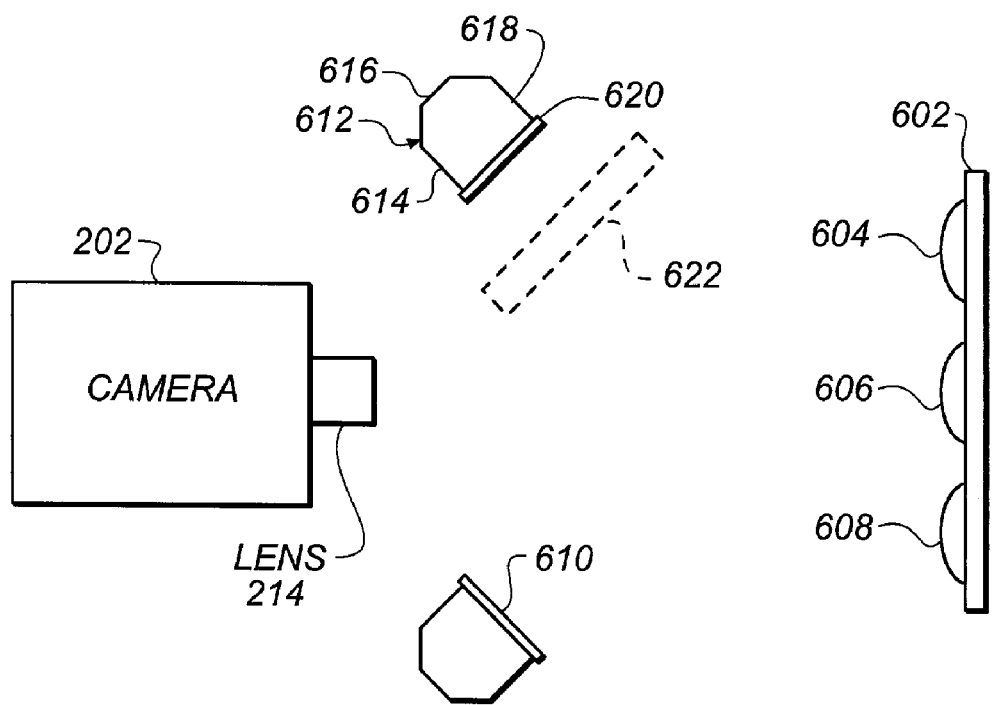
FIGS. 6a–b illustrate embodiments of an apparatus for calibration, according to embodiments of the invention.

These special methods and equipment that provide highlight calibration light sources will now be discussed. FIG. 6a illustrates an embodiment of an apparatus for highlight calibration. FIG. 6a illustrates a camera, light sources, and a test image for calibration, according to embodiments of the present invention. Specifically, FIG. 6a includes a camera to be calibrated, for example, camera 202 and lens 214 from FIG. 2a, as well as test image 602 and light sources 610 and 612. Metallic reflective surfaces 604, 606, and 608 comprising curved, polished metals having different colors of reflectivity (for example gold, copper, chrome, silver and nickel are coupled with test image 602 such that light sources 610 and 612 each reflect directly to camera 202 and lens 214. Light sources 610 and 612 comprise high intensity tungsten or HMI lights which may have reflective surfaces 614, 616, and 618 (using only light source 612 as an example) surrounding them. Reflective surfaces 614, 616, 618 are preferably of reflective either the Lambert ion or specular type. A diffuser 620 is coupled with a light source (as illustrated, with light source 612) at the point of light projection to provide a uniform lighted area. Diffuser 620 may be any manually inserted or motorized attenuating screens, or colored filters, or both.

Light sources 610 and 612 provide uniform specular highlight areas, and their intensity may be calibrated as a function of the intensity of the light and the diameter of diffuser 620. Light sources 610 and 612 may also be partially blocked to provide multiple levels of intensity. By choosing light sources with different intensities of lamps and having different sizes, it is possible to obtain highlights covering a wide range of intensities. Because this arrangement allows multiple highlights in each reflective surface 604, 606, 608, calibration may be expeditiously performed, as each scene will contain multiple highlights from each of the multiple domes. Furthermore, knowing the reflective characteristics of the domes, accurate information may be obtained about the intensity of the highlights. In addition, in this scene it is advantageous to include a diffuse gray scale and color target within the test image 602 so that the light sensor is calibrated across the entire dynamic range of the sensor.

If other variables significantly affect the response of the sensing system, it is necessary to ensure that the highlight images are captured across a range of those variables that is likely to be encountered. If individual photosites produce different responses, as can be the case with some electronic sensors, it becomes necessary to mount the light sensor in camera 202 on an X-Y stage, such that light sensor 206 may be moved at right angles to the optical axis of lens 214 (while remaining in focus), and such that every photosite is exposed to every highlight combination. If necessary, during this process, data may be collected regarding highlight and overall response of every light sensor as a function of the highlights and patches viewed and also as a function of other variables. This large database constitutes the raw sensor calibration data in response to test scenes including highlights. It is necessary to ensure that this database contains the information regarding the specific photo site, highlight, and patch response, as well as other variables for every sensor response collected.

To achieve this indexing information, which links highlight response to a specific photosite or device, it may be desirable (from a productivity point of view) to use image processing or analysis software that, based on knowledge of the scene X-Y, conventionally coordinates size, spectral intensity, or color of every highlight. This software generates a database that tabulates light sensor response to those variables that may have a significant effect on the response.

Figure 6B:
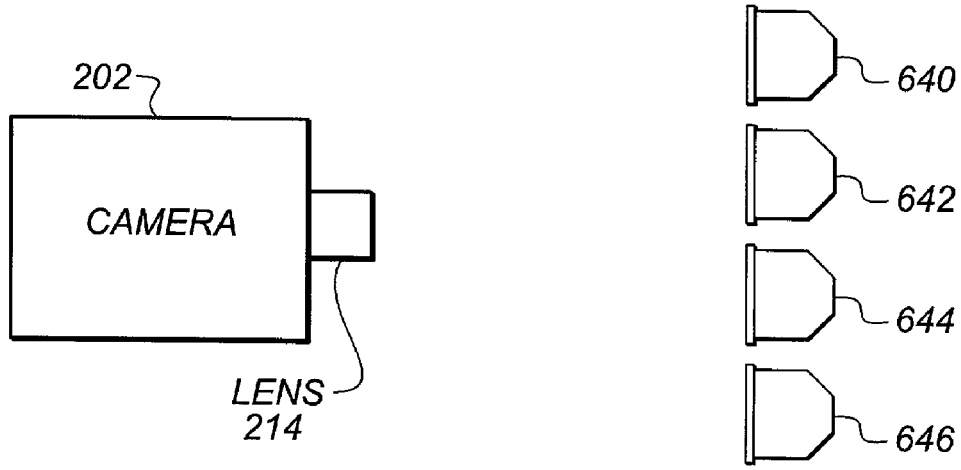

FIG. 6b illustrates a camera and light sources for calibration, according to embodiments of the invention. In particular, FIG. 6b illustrates camera 202, lens 214, and light sources 640, 642, 644, and 646. Camera 202 and lens 214 have the same functionality as in FIG. 6a, and light sources 640–646 have the same functionality as light sources 610–612 in FIG. 6a. In an embodiment, light sources 640–646 are arrayed with diffusers (as in FIG. 6a) and are calibrated to produce a variety of intensities and colors.

The testing fixture of FIGS. 6a–6b can be calibrated for sensor spatial illumination. However, provided that the sensor is used to capture images in actual usage, and if a high quality lens is used, a spatial lens for shading non-uniformities correction may not be needed in the usage context. Thus, the shading of the highlights needs to be corrected prior to correcting the lens flare effects. As already mentioned the corrections need to be done spatially in sensor space and in exposure space (often referred to as E), resulting in an accurate reproduction of the illumination that falls on the sensor. The sensor correction illumination can then be transformed using an actual lens or an optical model of the lens to generate offset and multiplicative corrections to reproduce the scene.

The artifacts of flare, scatter, and halation have the effect of causing highlights within an image to influence other areas of the image where the highlight is not found. These artifacts can have spectrally varying responses, e.g., a white highlight can scatter red or blue light into other parts of the image. Sometimes, this scattering of additional light occurs across the whole image; for other artifacts, it is more pronounced in the immediate vicinity of the highlight, and does not affect parts of the image that are more distant from the highlight.

These artifacts can arise from a number of factors, including lens design or manufacture, light scatter within the lens support mechanism, lack of sufficient shielding of the lens, stray light bouncing off the sensor and then back onto other parts of the sensor, or when film is used to initially record the image light scattered from the back of the film that is sensing the image, or from scatter or light piping within the layers of the film due to scatter by particles such as silver halide particles or other particles within the film. Similar effects can also occur from the diffusion of chemicals during film processing, or from chemical starvation and similar mechanisms.

As already mentioned, to characterize these effects, calibration techniques such as those shown in FIGS. 6a–b may be used. It may be first desirable to calibrate flare and related effects contributed to by the lens as these will change from lens to lens, and as mentioned herein, may be compensated for on a lens-by-lens basis for cameras with interchangeable lenses. For example, this calibration may be done using optical bench and laboratory-type flare methods. Next, the errors due to these artifacts that may arise from the sensor or subsequent processing are characterized. This is performed by imaging calibrated specular highlights and observing the spatial response of the system to these highlights.

When responding to image areas of high intensity, image sensor systems, whether they be film-based or electronic-based, can change in their spectral sensitivity response as a function of scene intensity. These changes in spectral sensitivity response may occur as a result of a variety of reasons, including non-linearities within the sensor, the effect of halation, or light scatter within the sensor or saturation effects. Any sensor that is inherently non-linear can change its spectral characteristics with regard to intensity, especially if there is a range of narrow spectral band intensities in the scene. Calibrating and correcting for these effects cannot be performed simply by using traditional linear methods such as 3×3 matrices to convert from the sensor color space into the specified output color space in digital data of the sensing system. At a minimum, when using 3×3 matrices, in the color conversion, it is necessary that the 3×3 matrix operators have coefficients that change as a function of the intensity of the image in each channel or as a function of the overall image intensity at the pixel where the calculation is being performed. Thus, in order to produce calibrated color output channels, each channel must be computed using color conversion from color source channels.

Figure 15:
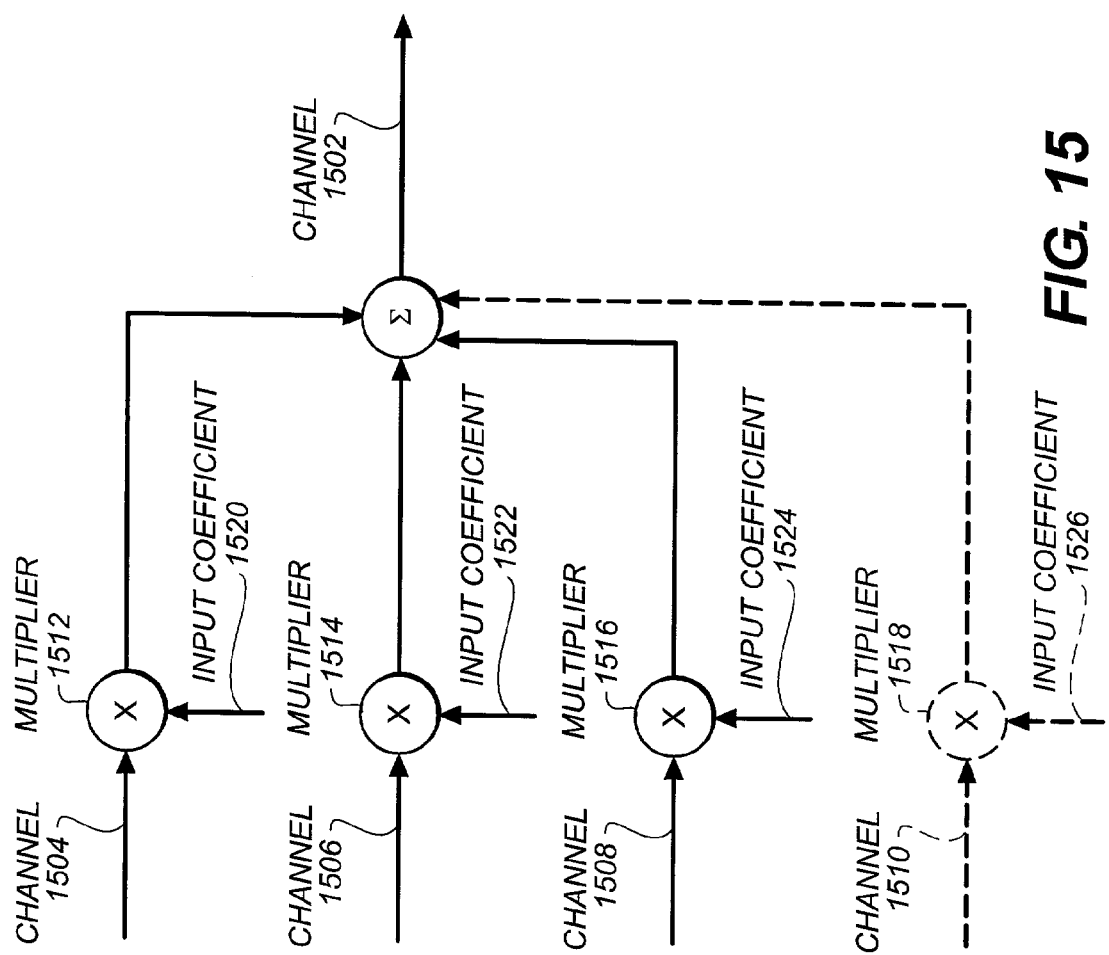
FIG. 15 illustrates the implementation of color conversion for a single color output channel, according to embodiments of the invention.

FIG. 15 illustrates arithmetic computational approaches of applying corrections to the image data to implement color conversion for a single color output channel, such as channel 1502 that is used once the data is collected as discussed above. This output channel has a value that is computed as the sum of the products of 3 channels (or more in some cases). For example, there may exist color channels 1504, 1506, 1508, and other possible color channels, for example, 1510 (illustrated in FIG. 15 using dashed lines). These channels are red, green, and blue, and in the case of the existence of channel 1510, a luminance or other black channel. However, embodiments of the invention are not so limited, as the channels may be other colors. The input coefficients to multipliers 1512, 1514, 1516, and possibly 1518 (illustrated in FIG. 15 using dashed lines) are specified as input coefficients 1520, 1522, 1524, and 1526 (illustrated in FIG. 15 using dashed lines), respectively.

In normal operations, these input coefficients are fixed for a given color conversion; however, in areas of highlight or in dark regions, experiments concerning color accuracy with intensity can show that more accurate color rendition is achieved if these coefficients change according to experimentally or analytical derived values. In addition, to accurately handle color in high intensity or in deep black areas where the sensor is non-linear, it is necessary to use additional computing methods based on the calibration data previously discussed. For example, based on data from channels 1504 through 1508 (and possibly 1510), it may be necessary to use a lookup table or other device to compute the necessary deviations from nominal fixed values of the input coefficients 1520, 1522, 1524, and possibly 1526. Other approaches to address this problem of non-linearity include the use of three or higher—dimensional lookup tables to perform the function shown in FIG. 15 or the implementation of polynomial methods to correct for these distortions of the spectral shape of the sensitivity functions of the sensor.

The values of these corrections can be determined using methods such as inverse polynomials, Fourier functions, numerical correction methods or other methods described herein or referenced. These methods use the experimental or analytically derived calibration data. These calibration techniques are able to provide both the necessary raw data for both the non-linearity of individual color channels and the modification of the spectral sensitivity of these channels. However, it may be necessary to know the spectral characteristics of the calibration light sources referred to in other parts of this disclosure, to accurately determine the required correction that transforms the color channels to a calibrated output color space.

Figure 3A:
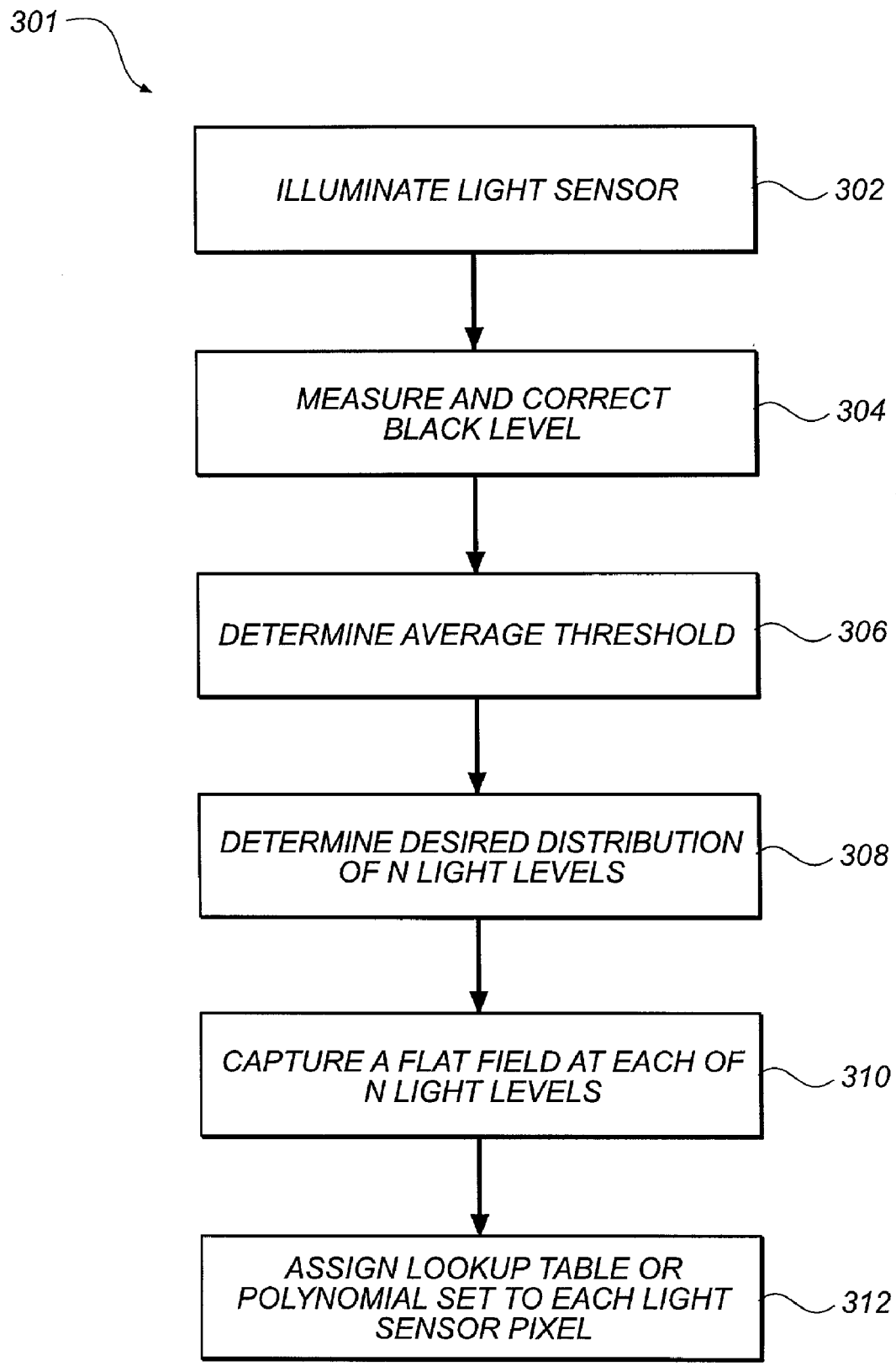
FIGS. 3a–b illustrate a flow diagram of an embodiment for calibrating a camera, according to embodiments of the invention.

FIG. 3a illustrates a flow diagram of an embodiment for calibrating a camera sensor. FIG. 3a is discussed with reference to FIGS. 2a–b, but are not limited thereto. In particular, FIG. 3a illustrates a flow diagram of method 301 for determining the correction of pixel-to-sensitivity variations. Method 301 begins where light sensor 206 on camera 202 (with no lens attached) is illuminated (302) with a variable intensity uniform light source 204. The output of light sensor 206 is measured (304) and the black level is corrected. The distribution of a number (N) of light levels is determined (308). A flat field is captured (310) at each of the N light levels. A lookup table or polynomial set is assigned (312) to each light sensor pixel to correct for variations in the breakpoint. As shown in FIG. 4c, in this calibration operation, the light sensor can be read with varying levels of uniform illumination from uniform light source 204 with non-uniform light increments, such that there are more data points near the expected breakpoint of the light sensor. For example, there can be ten different levels of uniform illumination (415–424). Five of these levels (418–422) are near the average threshold 430 or the average response curve 432.

Figure 3B:
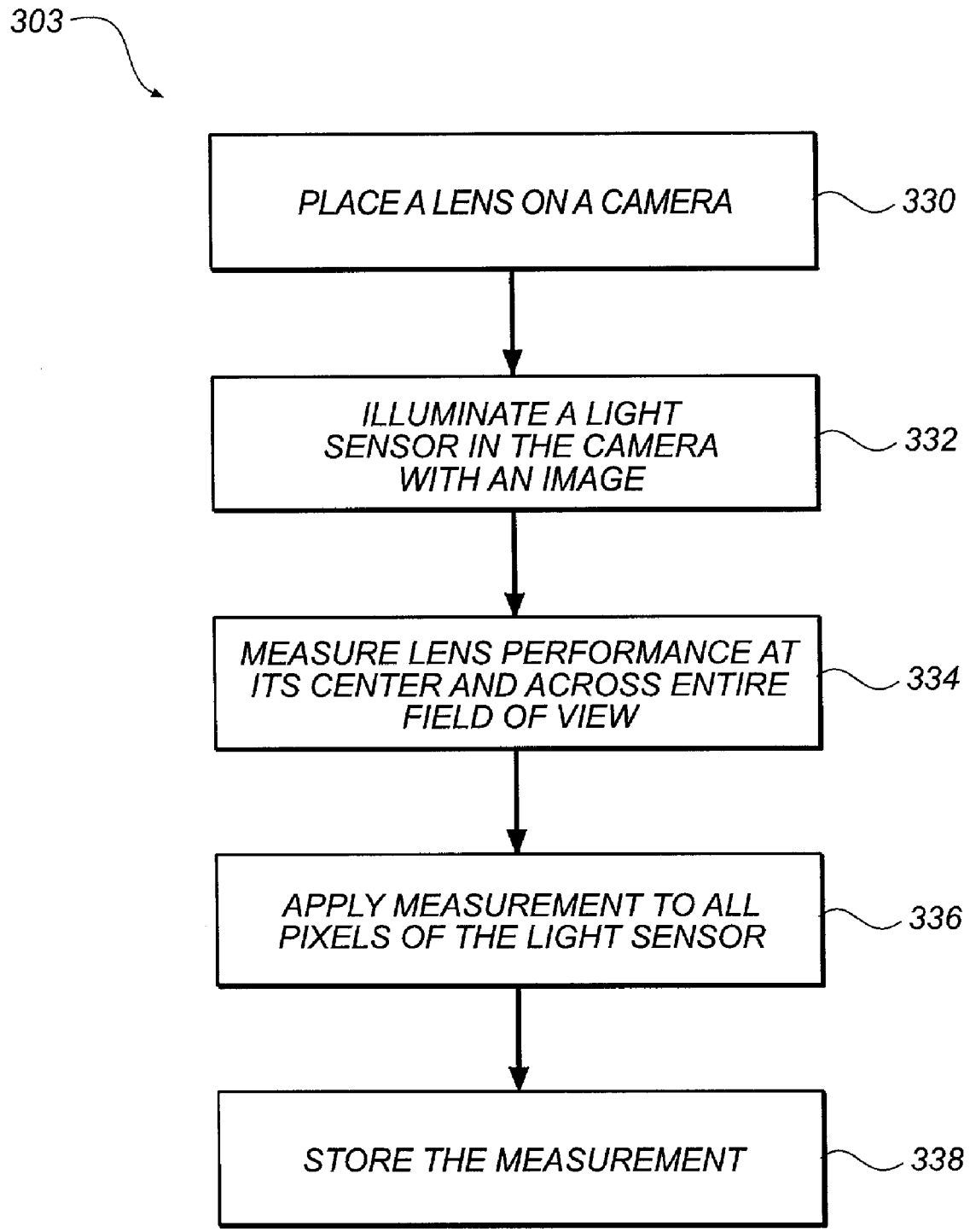

FIG. 3b illustrates a flow diagram of method 303 for correcting spatial variations in the image. Method 303 begins where lens 214 is placed (330) on camera 202. Light sensor 206 is illuminated (332) with an image. The shading and flare performance of lens 214 is measured (334) at its center and at points across the field of view. The measurements based on the image intensity output by the light sensor 206 are stored (338).

A multiplicative and offset correction for the shading and flare may be applied using techniques outlined in U.S. Pat. No. 4,051,458 (Video amplitude related measurements in image analysis Morton, Roger R.) or by determining across the lens the for each pixel, multiplicative and offset correction values, which when applied to the image data will, remove shading.

The correction for the measured variation is applied (336) across the field to all pixels of light sensor 206. producing image data that is corrected or compensated for lens shading. This method corrects for both average center lens/light and sensor effects. Next, light sensor 206 is typically illuminated through the lens with highlight test objects as shown in FIGS. 6a–b Lens flare from the highlights can now be corrected for using the glare correction method of U.S. Pat. No. 4,051,458 or improved methods disclosed herein that are able to go beyond the black to 100% diffuse reflectance white range disclosed in U.S. Pat. No. 4,051,458. Thus, by determining from the image data of the sensor the average intensity of the any image in exposure space, an offset correction signal may be generated which corrects for glare. If multiple lenses are involved, measurements and spatial offset, multiplicative and flare corrections stored (238) separately for each lens. In addition, using the techniques disclosed herein, such as shown in FIG. 18b (showing a higher order arithmetic computational approaches of applying corrections to the image data), if the parametric data on line 1836 is a function of position (the x and y values across the scene) higher order intensity corrections (such as intensity squared or cubed) can be implemented to more accurately correct for spatial variations.

Once the data from the calibration processes described herein are generated, it must be translated into either lookup tables or functional expressions, such as polynomials or Fourier functions, so as to apply correction operations to the data produced by the electronic sensor. Alternatively, a combination of lookup tables and functional corrections may be used. The decision regarding the appropriate combination of correction functions is made based on considerations of overall accuracy, throughput rate, and cost.

The generation of lookup tables and functions is well known in the art. The process includes multilinear (cubic, quartic, or higher) interpolation techniques, polynomial approaches. Also, least squares error minimization methods may be used. In such methods, a function may first be defined to fit the data from the calibration process. This function may be a polynomial or other function that describes the electronic image sensor response.

The general formulation of these calibration approaches is as follows. A response function O corresponds to the value of sensor image data at a defined point in the system. This may be an array of data derived from calibration processes herein described, and is defined as $$O = F(X_O, X_1, X_2, \ldots, X_i, \ldots, X_N).$$

This function describes the measured pixel-by-pixel (or group of pixels such as a 128×128 subsample of the image) image data response from the calibration of the sensor, where $X_1, X_2, \ldots, X_i, \ldots, X_N$ are the inputs affecting the specific pixel $X_0$. The variables $X_1, X_2, \ldots, X_i, \ldots, X_N$ correspond to highlight intensity and color of the highlight, which are all imaged to the pixel $X_0$. Other variables such as temperature and overall light intensity (including those mentioned previously) may also be assigned a variable such as $X_j$ and included if it is found that these variables have an effect on the electronic image sensor response, such that the exclusion of these variables would result in degrading the calibration accuracy to an unacceptable level. Adding additional variables increases the time required for calibration and the quantity of image data required to populate the array.

The analytical form of function O termed $f(X_O, X_1, X_2, \ldots, X_i, \ldots, X_N)$ may be computed using least squares methods to determine the coefficients of the function. In general, if the function is fit to a polynomial, there will be a vector or matrix C corresponding to the coefficients of the polynomial that describe the image data calibration response from the sensor. In practice, the number of coefficients in C need not be so large if it is found that, for example, pixel response to some variables can be described in a linear manner while other variables elicit a higher order response. The least squares method involves comparing the square of the error between the analytical response of the electronic sensor defined by $f(X_1, X_2, \ldots, X_i, \ldots, X_N)$ and the actual response $O = F(X_O, X_1, X_2, \ldots, X_i, \ldots, X_N)$ as recorded in the data array generated by one or more of the calibration processes described above. This error is summed over all data points, and then least squares optimization methods are applied to find the optimal set of coefficients C that produce the minimum sum of errors. Other forms of the function f may include tetrahedral, bilinear, cubic, or multi-linear approximations.

The least squares method may be implemented by computing using Newton, Conjugate, or related techniques. Correction functions correct the image data response of the sensor for errors introduced into the image data. As described herein, correction functions are implemented using lookup tables directly addressed by pixel data values or by using arithmetic computational approaches of applying corrections to the image data. These corrections may be driven by parameters from lookup tables or from coefficients implementing analytical correction functions such as polynomial correction functions. Whichever approach is used the correction function applied to the image data from the sensor can be defined analytically as function k with coefficients $M_1, M_2, \ldots, M$. The correction function may be represented as or be a data array K or as a function k. Either correction function K or k may be derived using error minimization where the minimal error defined as the sum of the pixel errors across a calibration image data from the sensor, where the pixel errors are defined, for each pixel, as $$(V^2 - V_s^2)^2$$

where V is the desired response from the sensor defined by $D(X_0, X_1, X_2, \ldots, X_i, \ldots, X_N)$ based on the intensity and color response of the calibration patches and $V_s$ is the corrected response to the test calibration image after applying function K or k to the image data. The values of the coefficients M or the data within the data set K are changed during optimization to produce the optimal function k or data set K, which will be determined under the appropriate constraints. The nature of these constraints depends on the specific data being created and the specific form of the functions being implemented. It is often necessary to experiment with different constraints before the optimal solution is found. Constraints generally are associated with limiting the available ranges of the coefficient M or specific values of K. Thus, constraints may be experimentally derived, for example, to constrain the values of M to converge on a solution, or due to constraints that arise from the physical limitations of the software or hardware implementing the correction function k or data correction set K.

A number of approaches for computing solutions are possible:
  a. Solve for coefficients M on a pixel-by-pixel basis. This can be done individually or in groups of spatially adjacent pixels near each other or across the entire image. This will produce a set of coefficients M for every pixel or pixel group
  b. Cluster the pixels according to similar response characteristics and solve for pixel clusters so that each set of pixel clusters is has a set of coefficients M.
  d. Parameterize the correction function over points of each pixel. This involves computing the parameters for each pixel typical parameters are gain and sensitivity of the pixel. In the case of multi-mode sensors, the sensitivity is computed before switchover. It involves determining scene exposure or output voltage at which switchover takes place and producing appropriate offsets and gain corrections before and after switchover. The coefficients M are then computed as a function of these parameters.

Once the data set K has been computed, it can be imbedded in a lookup table or the function k may be converted to look up tables that drive arithmetic computational techniques or approaches of applying corrections to the image data.

Figure 4A:
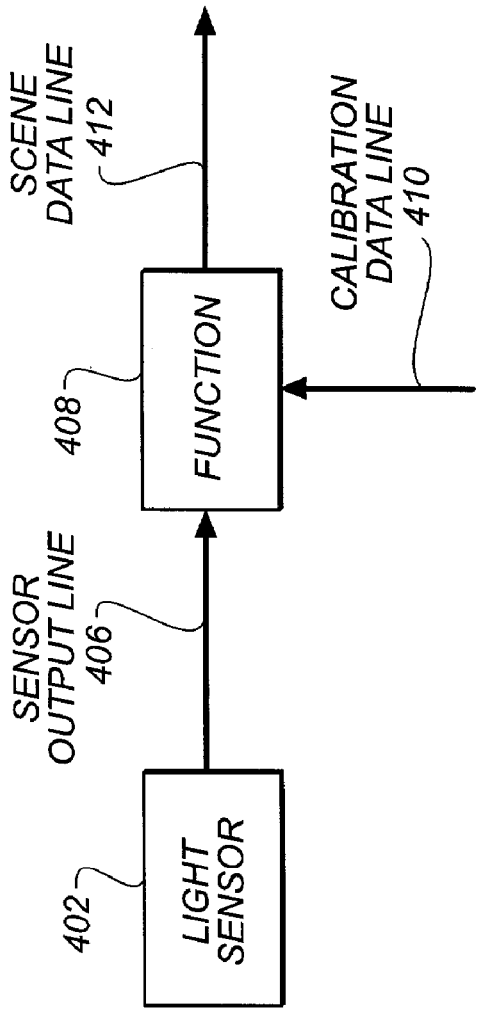

An alternative method to the least squares approach is to compute, an inverse G to the function f under the conditions imposed by function D. This inverse is calculated to give desired values $V_1, V_2, \ldots, V_i$ where $V_1, V_2, \ldots, V_i$ corresponding to the desired sensor image data. These desired values occur at the defined point in the system in response of to the calibration images herein described. Thus, this inverse $G(O, X_0, X_{i+1}, \ldots, X_N)$ applied to the sensor image data will now provide correction to the image data all values of $X_1, X_2, \ldots, X_i$. Therefore, by feeding the electronic sensor response into this function, actual scene corrected image data will result. There are methods other than the least squares method for computing function k from K, including Fourier and local neighborhood methods, such as multidimensional bi-linear and bi-cubic interpolation, tri-linear and tri-cubic interpolation, or multi-linear and multi-cubic interpolation methods, as well as other polygon-based methods. These methods determine the equations describing a surface or function for a local neighborhood of data points, that when applied to the image data produced by the calibration processes described above, result in a the desired calibration response. When applied to scene image data the result is corrected data that more accurately corresponds to the scene. The implementation is shown in FIG. 4a. A light sensor 402 reads a scene 404. The image data output of light sensor 402 is transmitted (including $X_0$, that is pixel number and sensor pixel response)) to correction function 408 along sensor output line 406. Also, data $X_{i+1}, \ldots, X_N$ is transmitted on calibration data line 410 corresponding to temperature, overall light intensity, and other variables that may affect calibration. In response to these inputs, correction function 408 using data set K or executing analytical correction k provides the scene data $V_1, V_2, \ldots, V_i$, on corrected scene image data line 412. Implementation of the function 408 may be via lookup tables such as the one illustrated in FIG. 4b using a lookup table directly addressed by pixel data values or using arithmetic methods.

Thus, the data on sensor output line 406 becomes the addresses to lookup table 414. Other address data to lookup table 414 include the data on calibration data line 410 to produce on corrected scene data line 412 the output data from lookup table 414 corresponding to the desired result of $V_1, V_2, \ldots, V_i$.

Lookup table 414 may be programmed by writing into the lookup table the function 408. This is done by programming a computer with the function 408 according to correction function K or k and then arranging for the computer to generate the appropriate control signals to a device that is designed to program lookup tables or memory. The specific device will depend on how the lookup table is implemented. Implementation techniques include read only memory ("ROM"), flash memory, programmable read only memory ("PROM"), field programmable gate arrays ("FPGA"), random access memory ("RAM"), or magnetic disk drives operating with a processor and possibly including a cache to improve response time.

Another way to implement the function 408 is to use a digital signal processor ("DSP") to implement the function directly. This is done by programming the DSP with the function 408 such that, as data enters from the sensor 402 into the DSP, it computes the specific values for function 408 based on the input data. Another way to compute function 408 is to directly use a least squares method or other optimization method in a manner similar to that described previously for determining the function K. This approach avoids the need for taking the inverse of F, while giving the result as correction function 408.

The actual implementation of the correction of electronic image sensor data is often independent of the way in which the correction function is generated. Thus, any of the techniques mentioned above may be applied to lookup tables or software implemented in polynomial or multilinear interpolation techniques.

In many cases, the lookup table interpolation technique just described can produce very large tables that are not economical. For this reason, it is appropriate to take steps to reduce the size of lookup tables. The methods for doing this include:

1. Clustering pixels according to correction required
2. Using look up tables that drive interpolators that may be linear, spline based, or polynomial
3. Generating correction data to existing image data
4. Using hardware polynomial calculation calculators, driven by coefficients set by look up tables.
5. Compressing data in lookup tables
6. Using a combination of the above.

In addition, other methods may be used to reduce the size of the lookup tables.

Figure 5A:
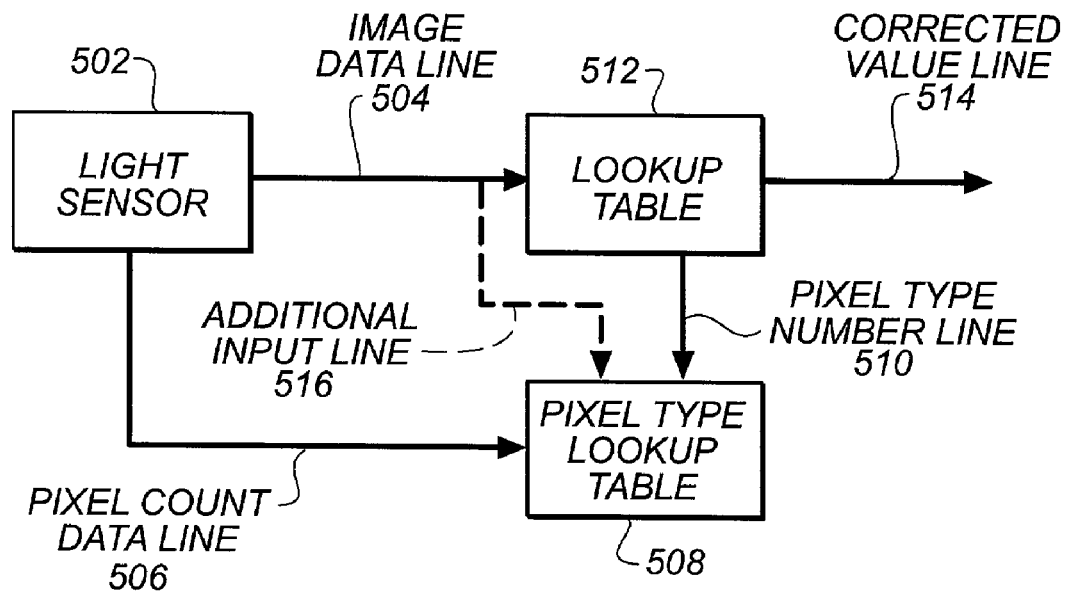
FIGS. 5a–b illustrate apparatus to reduce the size of the lookup tables, according to embodiments of the invention.

Often, it will be necessary to correct for the non-linearities of individual pixels on a pixel-to-pixel basis. However, building a one thousand word lookup table for three million pixels or more, coupled with additional banks of tables for various parameter defined conditions, may be economically prohibitive. In this situation, one approach is to build 100 or 1000 lookup tables, each 10-or 12-bit table corresponding to a particular class of pixel response. It is then necessary during the calibration process to classify the pixels, possibly using clustering techniques, building, for example, 100,000 pixel-type lookup tables and then identifying for each pixel the lookup table that is most appropriate. In this case the relation of the appropriate lookup table is driven by a pixel classification table that receives the current pixel number or address the appropriate classification, as is shown in FIG. 5a.

Clustering pixels according to the correction required takes advantage of the fact that, although there may be millions of individual pixel sites in the sensor or sensors used in a camera, the correction required for each one may not be so different, and the same correction may be applied to multiple pixel sites. The technique for implementing this using a look up table directly addressed by pixel data values is shown in FIG. 5a. Data flows from the light sensor 502. The image data on image data line 504 and the pixel count data is transmitted on pixel count data line 506. The pixel count data enters a pixel type lookup table 508, which, based on the number of the pixel, outputs a pixel type number on pixel type number line 510. This data passes to lookup table 512 and is used to access the section of the table for which correction data is stored for the type of pixel communicated on pixel type number line 510. Lookup table 512 then responds to the image data received on image data line 504, including multi-mode data from the sensor, and outputs corrected values on corrected scene value line 514. Creating the clusters of pixels of the same type is part of the process associated with the generation of the function 408 that is loaded into lookup table 512. In an embodiment, there are a number of lookup tables in lookup table 512, one for each pixel type.

Once function 408 is determined as described above for every pixel, a matching process is used to identify those pixels that produce the same correction response. One way to do this is to select an initial pixel, identify its correction response, and compare the response data of all the other pixels to find pixels with the same or similar correction response. Once these pixels are identified, they are considered a cluster having the same type of response, and are identified as having been selected. This process is repeated for all other unselected pixels within function 408. Once the point is reached where the remaining clusters have few pixels, these remaining clusters are grouped with existing clusters if the resulting error is acceptable. In cases where the result is not acceptable, they are considered separate clusters. Thus, pixel type lookup table 508 is generated as an index, indicating to which cluster each pixel belongs, and lookup table 512 is simply the correction for each cluster type. Thus, the pixels are grouped into pixel types by cluster.

This technique can group all of approximately six million pixels in an HDTV 3-sensor camera into 10,000 types, producing a lookup table size reduction of the order of 100 to 1,000 fold. An alternative clustering approach is to break clusters by the image data output signal and add additional inputs from image data line 504 along additional input line 516, to the pixel type lookup table 508.

Using look-up tables that drive interpolators that may be linear, spline based on polynomial involves using a lookup table that is not as densely populated as the data requires but rather is populated, at every 100th point (in general every $N^{th}$ point) across all of its dimensions. Thus, if the table is a four-dimensional table and it is populated at every $10^{th}$ point along every axis, then there is a savings in lookup table capacity of 10,000 to 1. Thus, at a desired data point, the points surrounding the desired data point are accessed (in the case of linear interpolation, this corresponds to two points, bilinear—4 points, trilinear (or linear interpolation over 3 dimensions)—8 points, and four-dimensional—16 points). Data is interpolated between pairs of points using straight-line interpolation, and these interpolated points are then again interpolated until the value at the desired point is reached. Cubic interpolation may also be used, in which triples of points instead of pairs of points are accessed. Thus, this approach generates the correct value from surrounding values by computing from the surrounding points, in real time, the interpolation coefficients to reach the desired value. In linear interpolation, these coefficients correspond to the difference between pairs of points that may also be written as the equation $$d*p_1+(1-d)*p_2$$

where d is the normalized distance (having values from 0 to 1 between points 1 and 2), $p_1$ is the value at the point 1, and $p_2$ is the value at the point 2.

Figure 5B:
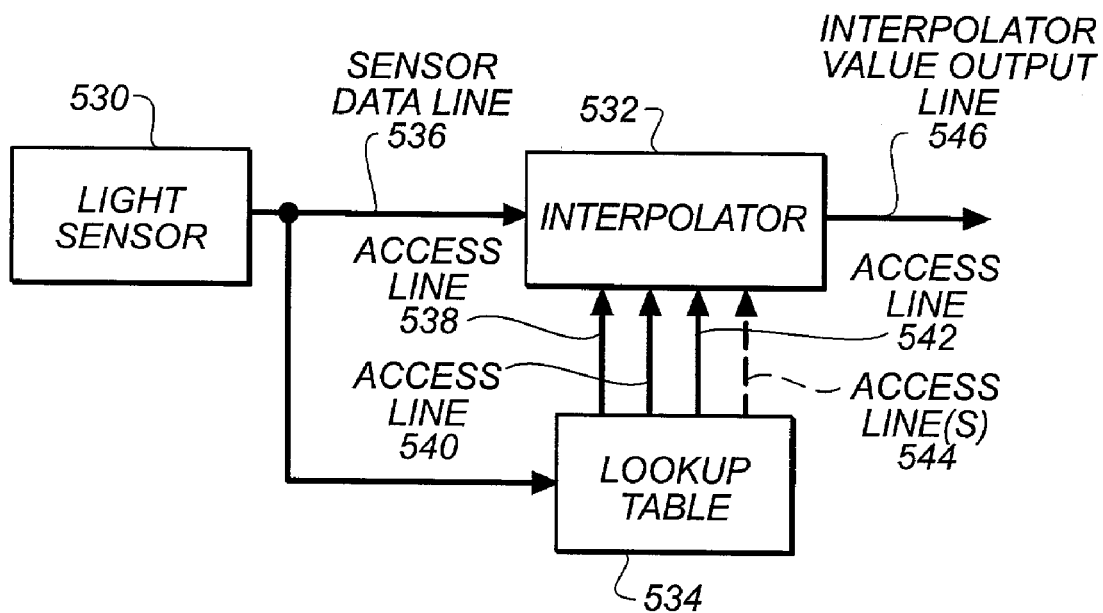

This is shown in FIG. 5b, where data from light sensor 530 is transmitted on sensor data line 536 to interpolator 532 and to lookup table 534. Lookup table 534 controls interpolator 532 on access lines 538, 540, 542, and possibly additional access line(s) 544, and outputs the values of the points surrounding the desired point based on information from light sensor 530 on sensor data line 536. This data will include all variables that affect the lookup table 534, including image data values, pixel numbers, and secondary effects such as temperature and flare. The interpolated corrected value exits on interpolated value output line 546, and corresponds to the calibrated scene data.

Figure 4B:
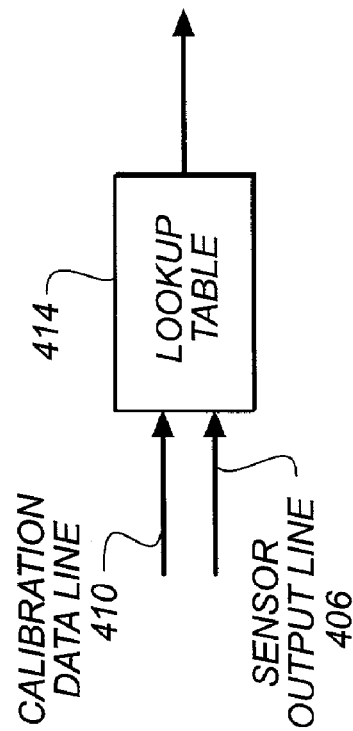
Figure 16A:
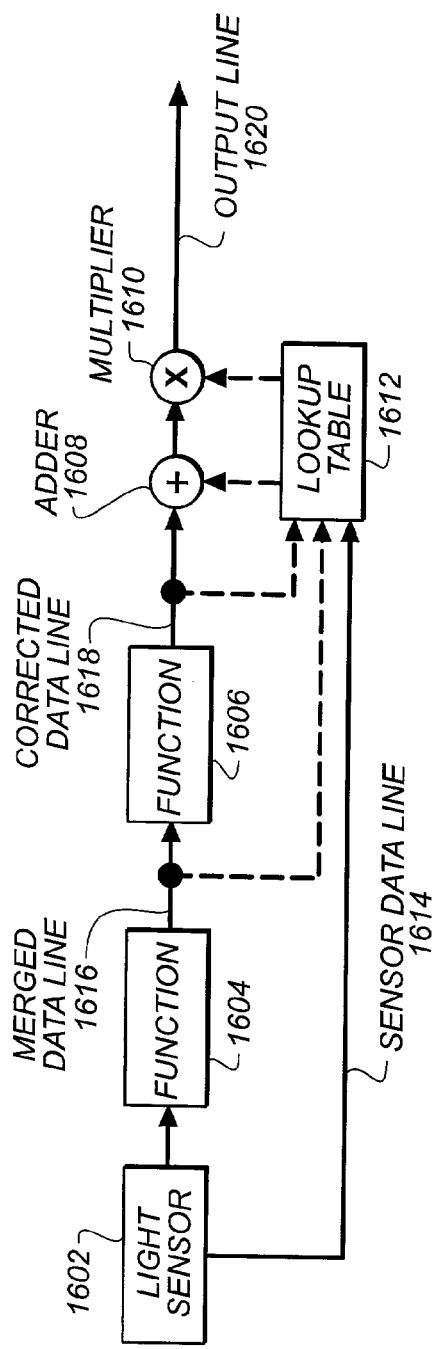
FIGS. 16a–b illustrate an apparatus to generate correction data to existing image data, according to embodiments of the invention.

An alternate approach of generating correction data for existing image data is to have the lookup table not compute the final values, but instead compute values that, when added to or multiplied by the output from the sensor (or a combination of both for higher order functions), produce the desired result. This approach is attractive because if the output from the electronic image sensor is already in the color space or units for which this approach is most effective, then the implementation can be quite simple. In most cases, the most appropriate space in which to do this is a linear sensor space—one whose output values are linear with light intensity; however, one disadvantage of this approach is that it may require a greater number of binary bits of precision. An embodiment is shown in FIG. 16a using an arithmetic computational approach of applying corrections to the image data. The output of the light sensor 1602 is, if necessary, merged into a single data stream by function 1604. This is necessary for multi-mode sensors. It will be appreciated that, in direct lookup table operations such as shown in FIG. 4b, the lookup table can also be used to merge data from the different modes, because the mode from which specific data from the sensor is obtained can be signaled by an additional input bit into the address of the lookup table so that corrections appropriate to that mode may be applied.

The merged output from light sensor 1602 is then transformed in space transformation function 1606 into a space where corrections can be added or multiplied by adder 1608 and multiplier 1610, which also receive inputs from lookup table 1612. The inputs from lookup table 1612 may be controlled by sensor data line 1614 using data directly from the sensor, from merged data line 1616, or data in the chosen correction space from correction data line 1618. It is also possible to perform correction in two spaces, for example, a log space and a linear space, in which cases functions such as adder 1608 and multiplier 1610 would be performed in a linear space with intensity.

Figure 16B:
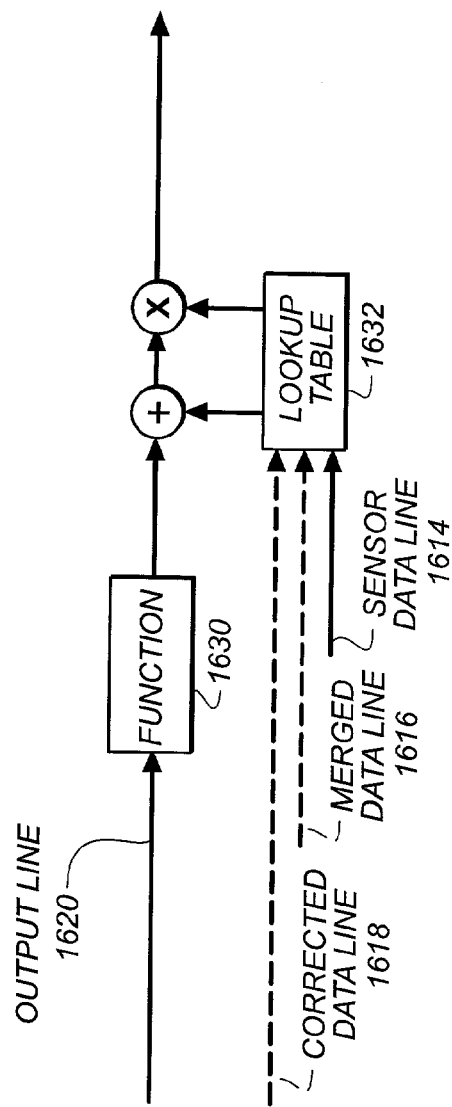

Then, the output on output line 1620 would be transformed into a logarithmic space and as shown in FIG. 16b, where function 1630 transforms the data on output line 1620 into a logarithmic space and then further addition and multiplication functions driven from another lookup table 1632 would apply additional corrections.

Using hardware polynomial calculators driven by coefficients set by look-up tables is a technique that involves using hardware-or software-implemented mathematical functions. These mathematical functions may take virtually any mathematical form including linear, spline-based, discrete cosine transform ("DCT"), wavelet, Bessel function, or polynomial. One advantage of discrete cosine transform is that application-specific integrated circuits ("ASICs") are already available to implement this function.

Figure 17:
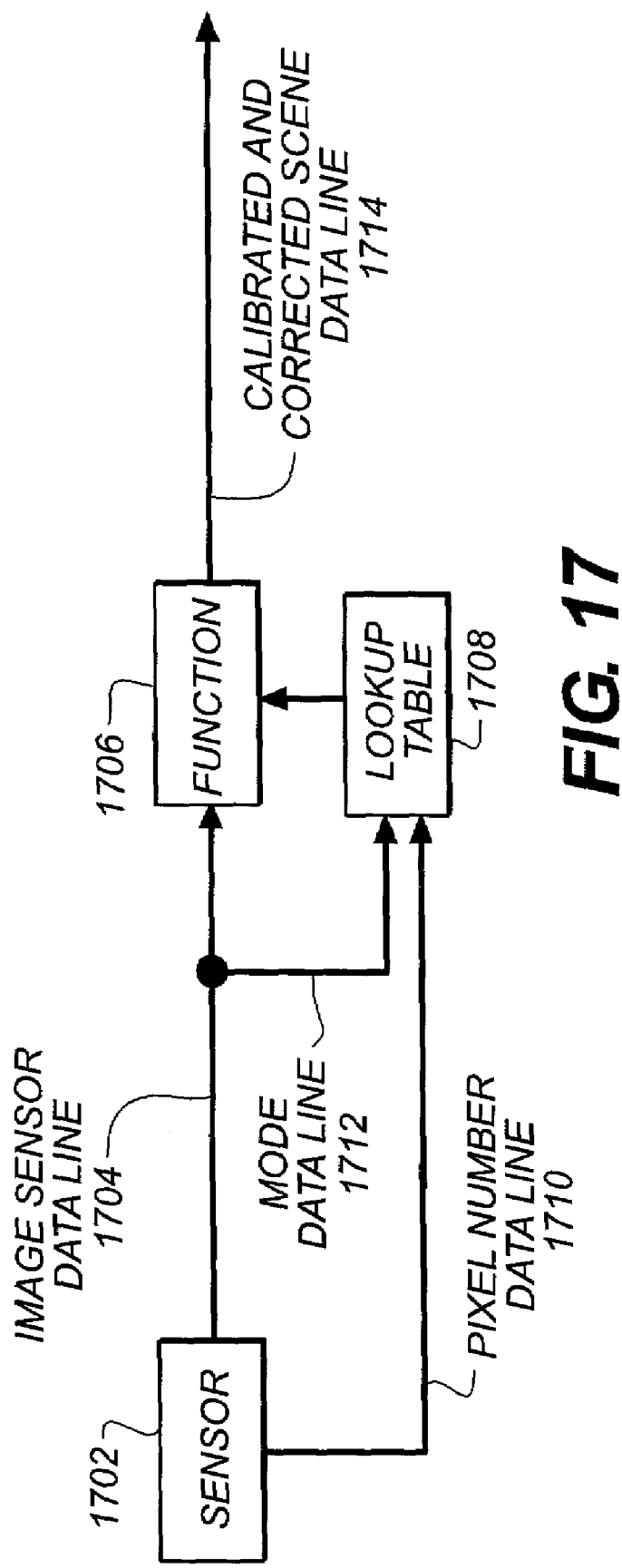
FIG. 17 illustrates an apparatus for using hardware polynomial calculators that are driven by coefficients set by lookup tables, according to embodiments of the invention.

As FIG. 17 shows, a signal from sensor 1702, corresponding to image amplitude data sent on image sensor data line 1704, to a hardware mathematical function 1706. This function implements the function K(x) where x includes generally image amplitude data V from image amplitude data line 1704. Appropriate coefficients for the mathematical function implemented in function 1706 are stored in lookup table 1708, which is addressed by pixel number data on pixel number data line 1710, as well as mode data on mode data line 1712 if multi-mode sensors are used.

The mathematical function used in function 1706 may have the same form as the correction function or may be transformed from function 1408 into some other function as part of the calibration process. Calibrated and corrected scene data is the result of the mathematical function 1706 and is transmitted on calibrated and corrected scene data line 1714.

Another way to reduce lookup table size is by compression methods such as Lempl-Ziv and other methods. These require that the data be stored in the lookup table in compressed format and that there be a decompression function at the output of the lookup table to transform the data to its desired decompressed format.

Many of the techniques described above may be used in combination to effect an even greater reduction in lookup table size. The decision of which to apply and in which combination is largely an issue of economy, throughput, and power consumption.

Figure 7A:
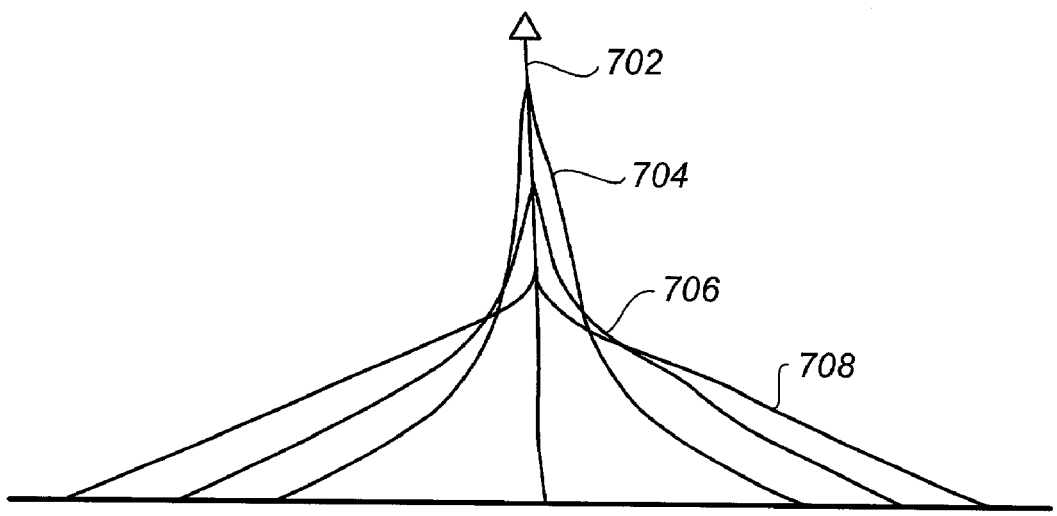
FIGS. 7a–b illustrate an apparatus for compensating for flare, scatter, and halation, according to embodiments of the invention.

As shown in FIG. 7a, for a bright small specular reflection characterized as an arrowhead 702, the light scatter profile will generally vary by color. For example, line 704 may correspond to the red response from a small white specular highlight, line 706 may correspond to the green response, and line 708 may correspond to the blue response. These responses will generally (but not always) be radially symmetric around the specular highlight. Such responses may be characterized as a function:

$$a_s(x, y) = F(I, R, \phi, r, g, b)$$

where $a_s(x, y)$ is the red R, green G, and blue B response of the sensor at distance x in the X direction and y in the Y direction away from the specular highlight; and where I is the intensity of the highlight, R the distance from the specular source at a$\phi$ angle to the x axis. Generally, the amplitude of $a_s(x, y)$ at any point is considerably less than the intensity encountered from the highlight, and in total integrated over all x and y, may have an energy of just a few percent of the energy in the highlight. In the vicinity and on the highlight, the function is limited to either zero or to not exceed the value of $a_s(x, y)$ 3 to 5 pixels away from the highlight.

A function for the lens may be determined by $a_l(x, y)$. The red, green, and blue response of the lens and the overall system response may be estimated from the sum of $$a(x, y) = a_s(x, y) + a_l(x, y).$$

Figure 7B:
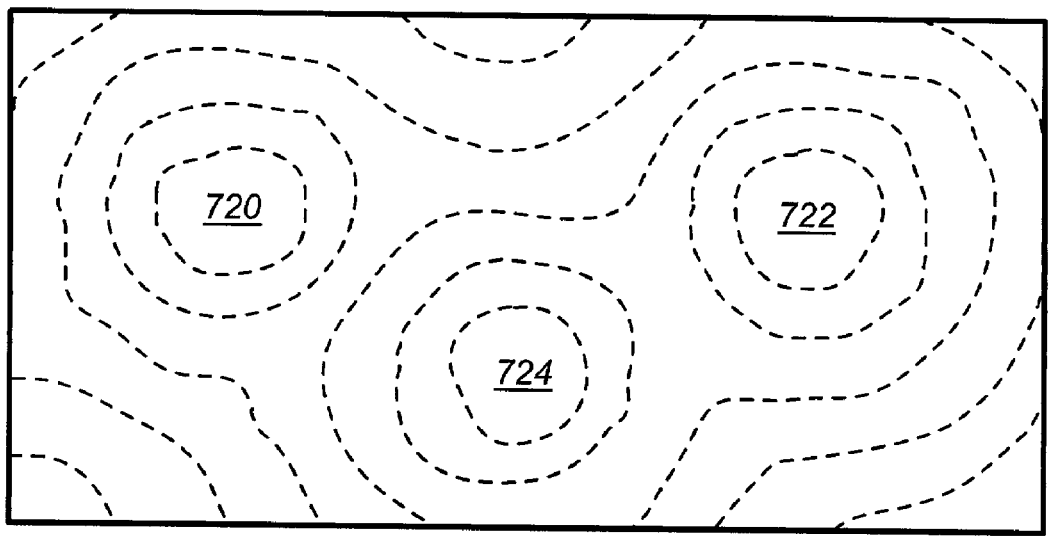

One way to compensate for these artifacts is to process the image data corresponding to the scene and produce a highlight map image. This can be done by sensing in the image processing associated with the sensor only those regions of the image which exceed a set level, e.g., 150% or 200% of the diffuse white level. Once these regions have been identified, then the flare intensity can be calculated over the entire image. The convolution of a(x, y) with the image highlights will produce a flare image based on the a(x, y) calibration data. This produces a flare image as shown in FIG. 7b, where regions 720, 722, and 724 correspond to the flare from the regions identified as exceeding the set level. The flare image may then be subtracted from the scene image to produce an image that compensates for flare due to highlight regions.

Because of the extent of the flare function a(x, y), it may be computationally intensive to use the convolution method. The flare image shown in FIG. 7a may also be generated by determining the distance of every pixel from each highlight in the scene and summing the various functions of a for each highlight where $x_1, y_1$ is the distance of the pixel form the first highlight, $x_2, y_2$ is the distance of the pixel from the $2^{nd}$ highlight, etc.

Figure 8A:
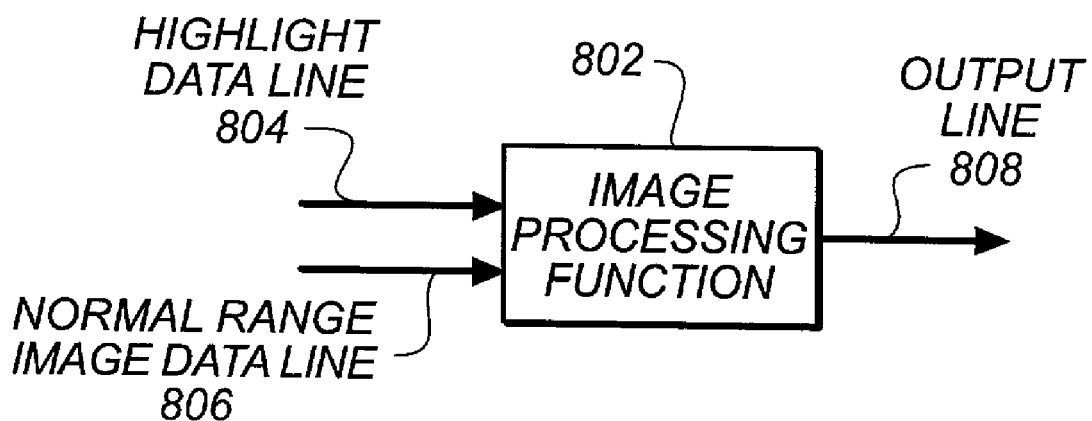
FIGS. 8a–b illustrate an apparatus for generating highlight data based on intensity data from a single luminance channel or several channels, according to embodiments of the invention.
Figure 8B:
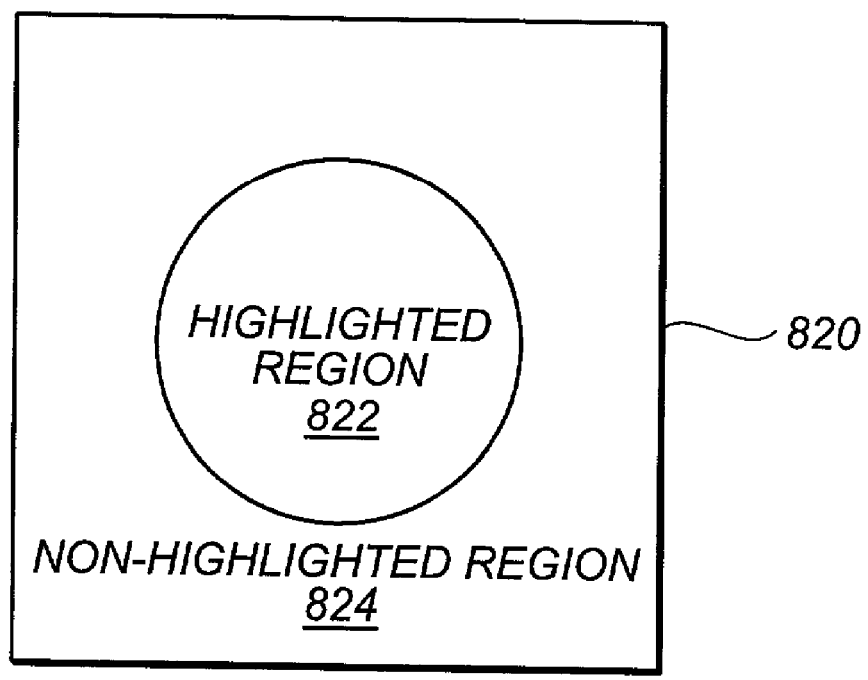

FIGS. 8a–b illustrate an apparatus for generating highlight data based on intensity data from a single luminescence channel or several channels. Normal range image data falling for example in the 0 to 150% of diffuse white reflectance range, which may be calibrated or uncalibrated, enters on data line 806 of FIG. 8a. The data on this line corresponds for the color of every pixel in every image range or image mode. Highlight data from the highlight channel enters on data line 804. FIG. 8b shows image 820 with a highlighted region 822. Non-highlighted region 824 corresponds to the normal image range, and data on highlight data line 806 corresponds to data within highlighted region 822.

The data on highlight data line 806 is saturated and therefore has a constant maximum value. In highlighted region 822, there may only be luminance or single channel values from the sensor. Image processing function 802 senses the region where the data on highlight data line 806 is saturated and inserts in highlighted region 822 the color values in non-highlighted region 824. The luminance of the color values inserted in highlighted region 822 are defined by the luminance values on normal range image data line 804. Thus, the output line 808 from image processing function 802 corresponds to the value on highlight data line 806 in the non-highlighted region 824 and the color and luminance values described above within highlighted region 822.

Figure 9A:
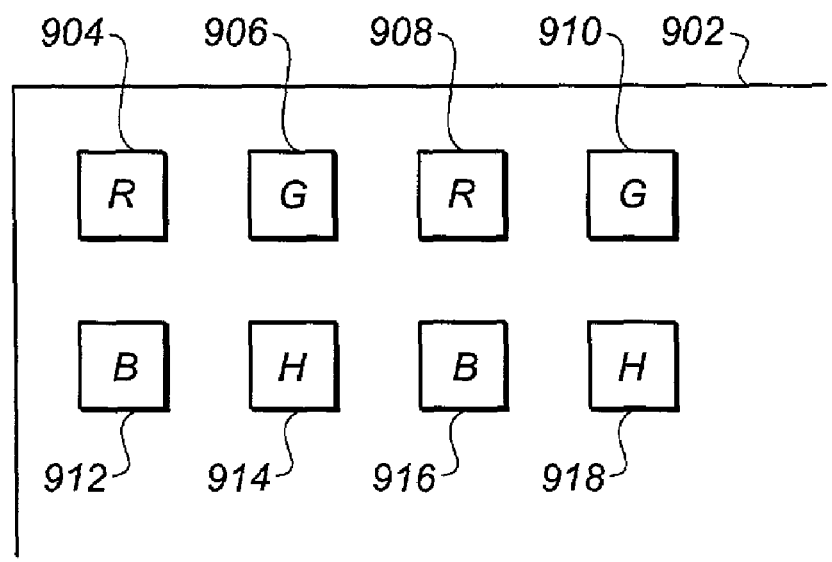
FIGS. 9a–c illustrate a diagram of a sensor that includes a number of photosensitive cells and that decodes data from such cells, according to embodiments of the invention.
Figure 9B:
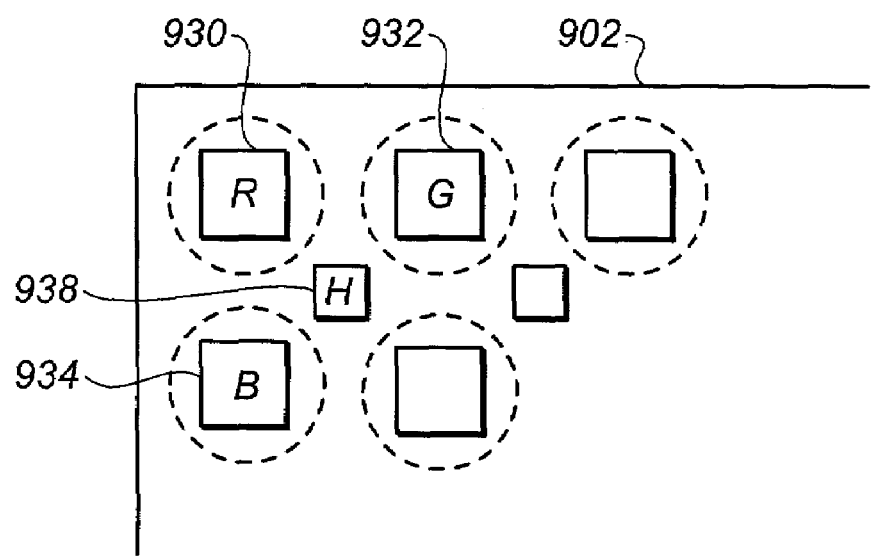

FIG. 9a shows a diagram of one embodiment of a sensor 902 that includes a number of photosensitive cells. Cells 904 and 908 receive red images, cells 906 and 910 receive green images, cells 912 and 916 receive blue images, and cells 914 and 918 receive highlight images. Because only small areas are required to receive highlight images, an arrangement such as that shown in FIG. 9b may be used, where cells 930, 932, and 934 receive red, green, and blue images, respectively, while the smaller cell 938 receives highlight images. If these cells are coupled with a lens to improve the light collection area (resulting in greater sensitivity), then light would be collected in the dotted circular areas around each photosensitive cell and the highlight cell would be positioned in the area where the circular areas intersect. Highlight cells may populate every such intersection area or every other intersection area. Highlight cells may also even less frequently populate the area.

Figure 9C:
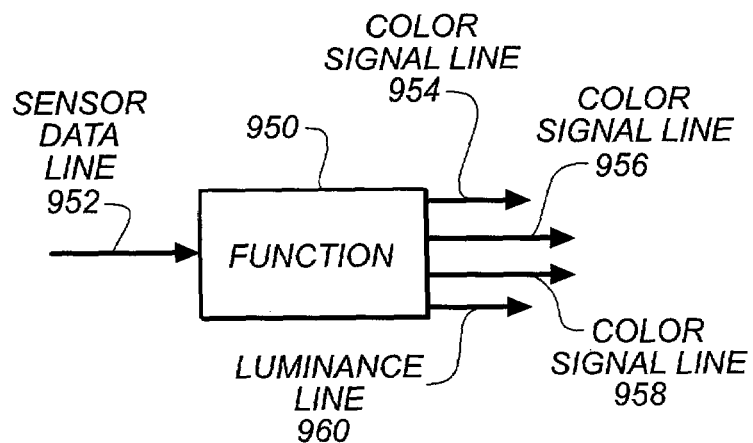

Data from highlight cells need only be outputted when one of the R, G, or B cells or more is saturated. Thus, in the output stream the signal from the highlight cells can be substituted (with an appropriate signal) for one or more of the saturating cells. This type of sensor produces data on a single line and the data is as shown in FIG. 9c. The data emerges from all cells in sensor 902 on sensor output line 952 and passes to a thresholding and substitution function 1350 that determines which cells if any are saturated. Once a saturated cell is sensed, the signal from the adjoining highlight cell in the sensor is substituted. Function 950 then produces color signals on color signal lines 954, 956, and 958 corresponding to the full range image signal from color data derived from the surrounding unsaturated sensors. Using prior art methods, it is also possible to produce a fourth signal on luminance line 960, which corresponds to luminance information. The data on lines 954, 956, and 958 can then be used to feed normal range image data line 804 of FIG. 8a.

In cases where a sensor may saturate when encountering a highlight, signal processing strategies associated with detecting the highlights may be applied. For example, because there are two classes of highlights, i.e., glossy highlights and metallic highlights, the edge of the highlight must be discerned. Highlights from glossy surfaces are characterized by a rapid change in color from the diffuse reflection color of the surface to the color of the light sources. In an embodiment, the method includes detecting the presence of a highlight using image processing algorithms that detect saturation. In a correctly exposed scene, the presence of a highlight will correspond to an image data signal at the saturation level of the sensing system, and provided that the saturation level of the system is above 100% to 150% diffuse white, corresponding to a highlight or light source in the scene.

The method further includes processing the edge of this saturated area to assess the color in the immediate surround. This may be an area only a few pixels wide around the highlight. If this surround has a color point that corresponds to the white of the scene or is close to the white of the scene then this area is assumed to correspond to a scene light source or a glossy reflection. The method also includes replacing the saturated values with pixel values whose color point corresponds to increasing intensities of the white point of the scene.

Figure 10:
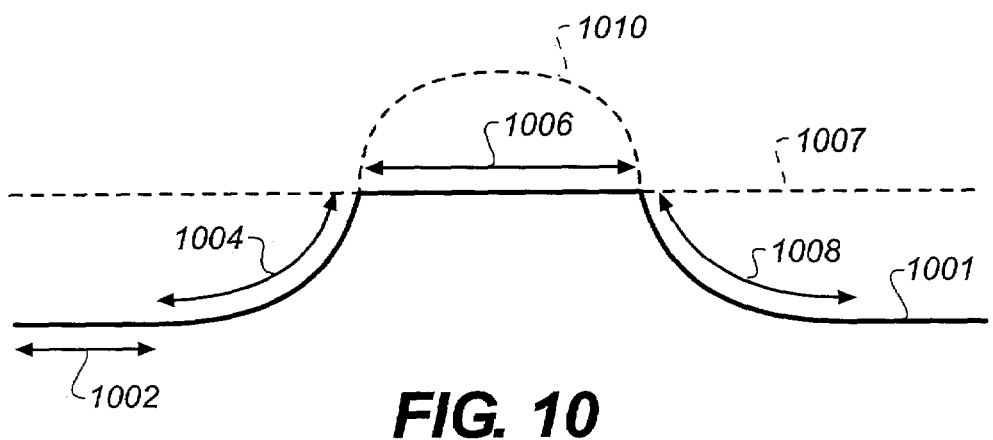
FIG. 10 illustrates a method for detecting the presence of a highlight using image processing algorithms, according to embodiments of the invention.

This is shown, for example, in FIG. 10. Profile 1001 corresponds to the actual response of the sensor system. Profile 1010 is the image data profile in the vicinity of a highlight point that the sensor system would produce if it did not saturate or clip the highlights. Level 1007 corresponds to the saturation level of the sensor system producing the image data profile 1001 because it is unable to reproduce the full highlight range. Region 1006 is the region of the sensor response where the sensor system misrepresents the image because of the sensor system saturation characteristics. Regions 1004 and 1008 correspond to the edge of the highlight region. If the color of these edge regions are close to the white point of the scene, the highlight signal processing system introduces a parabolic or similar profile of image data profile 1010 with the color of the scene white point. This profile has increasing luminosity that is an estimate of the highlight profile across the saturated region. In the case of metallic highlights, the edge regions 1004 and 1008 will carry the color of the surrounding metallic surface. After testing for and identifying that this is the case, a highlight image processing algorithm introduces the same profile while giving it a color corresponding to the color coordinates of the metallic surface surrounding the highlight.

Dynamic range can be extended by using the data from the non-saturated color channels. Typically, in color CCD imaging systems, one of the color selective channels will saturate before the remaining channels. This channel saturation sets the maximum usable dynamic range of the device. For the purposes of highlight reproduction, the color information may be less important than the tone scale information. This is because, in a scene with a single color illuminant, there can be two limiting cases of specular highlights. In one case, the highlight takes on the color of the illuminant. In the second case, the highlight takes on the color of the object. The remaining cases are often a blend of these limiting cases. Either reproduction method is adequate for extending the dynamic range to an extent limited by the color of the highlight. For example, if the highlight is white then the color channels may saturate at a similar level, thereby limiting the amount of extension available using this method. Alternatively, the sensitivity of different channels may be purposely mismatched in sensitivity.

In an embodiment, the regions in which channel saturation occur are identified. The neighboring color is analyzed. The saturated channels are interpolated assuming constant hue. To prevent false color from contaminating the highlights, a desaturating term is added to desaturate the color as the luminance increases beyond the channel saturation point. This provides an effective model for highlight reproduction. The highlight information is reproduced using extrapolation, taking the region surrounding the saturated region into account. The color and luminance slope may be determined. The data in the saturated region is presumed missing. The missing data is reproduced using standard curve fitting techniques. The curve fitting techniques that generate smooth data fits are preferred. The desaturating term is added to desaturate the color as the luminance increases beyond the channel saturation point. Desaturating reduces color saturation (for example, by converting into YCC color space, reducing the gain on the two C channels, and then converting back to the original spec or by going through a 3×3 matrix to reduce the color) to desaturate the color as the luminance increases beyond the channel saturation point.

Figure 36:
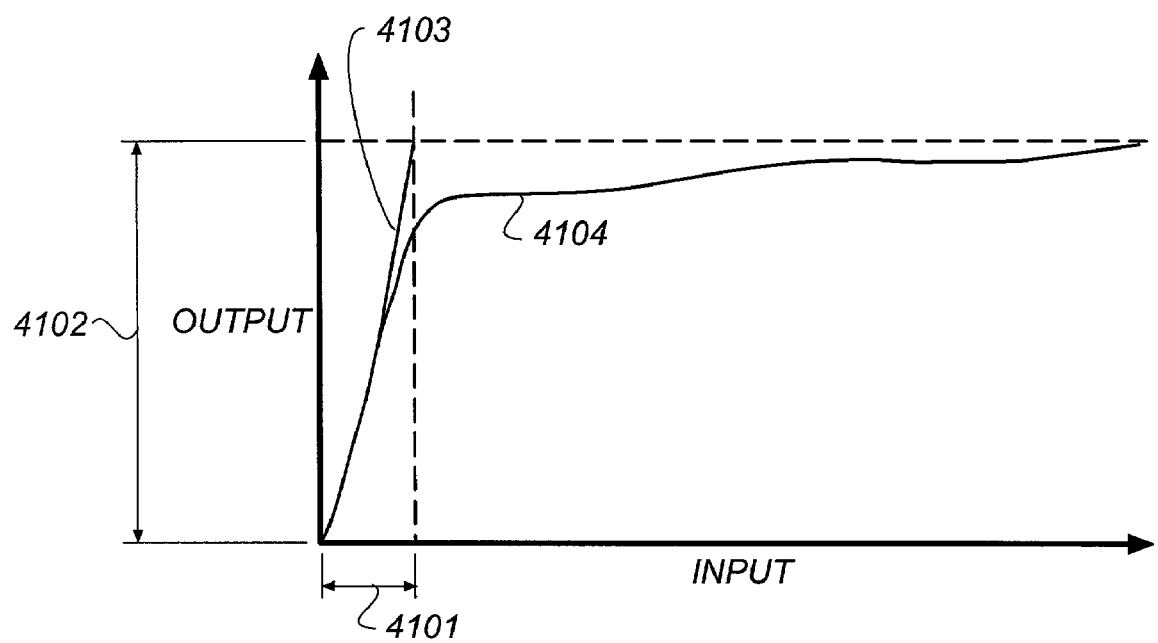
FIG. 36 illustrates a method of detecting highlights, according to embodiments of the invention.
Figure 37:
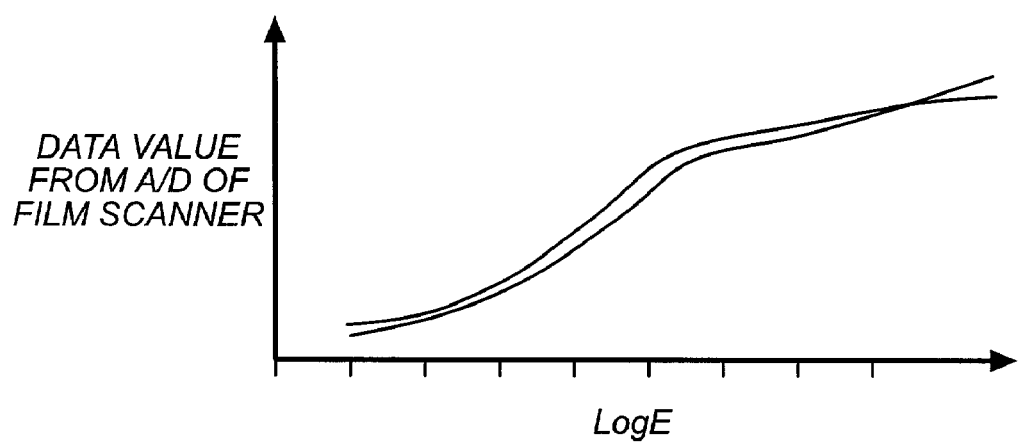
FIG. 37 illustrates the response for different colors, according to embodiments of the invention.

Another method of detecting highlights is to give up part of the available dynamic range of the output device and apply the highlight using an electronically generated single tone scale transformation as shown on FIG. 36 where 4101 is the normal input range for example between 0 and 100% diffuse reflectance and 4102 is the available output range of the output device. While curve 4103 corresponds to the normal response 4104 that may extend up to 1000 times the distance 4101 in linear scene exposure space, preserve some detail of the highlights. One way to better preserve the color of metallic highlights using this approach when the presence of a highlight is identified, is to have the brightest color channel, for example the brightest of red, green and blue in terms of its response in linear space, follow the 4104 curve while the response of the other channels are modified to preserve the color in either a hue and saturation, or a*, b* or XY sense. This, as already discussed, involves identifying the color of the highlight or area surrounding the image and then ensuring that this color persists while reducing the overall brightness of the highlight accomplishes this. , As with the other techniques described here, is best done taking into account the color response of the output device so that the transformation curves produce the desired response in the final viewing environment.

Another alternative is to pursue a step-by-step processing approach. This method comprises knowing the full dynamic range of the target device or knowing the calibrated standard signal data values that will fall within the dynamic range of a device or group(s) of devices. The method further includes establishing, from an artistic point of view, the way in which highlights are to be rendered. The method also includes sensing highlights within the image and rendering them artistically. While the knowing and establishing may be optional, the essential step of rendering the highlights must be performed if highlight information is to be preserved. Fortunately, the human eye can perceptually interpret highlights correctly even if the highlights do not match their original brightness. Thus, the detailed structure and color of a highlight can be inserted in an image at a brightness that is much lower than the value in the scene, and the image will still appear realistic and essentially carry the full information.

Figure 11A:
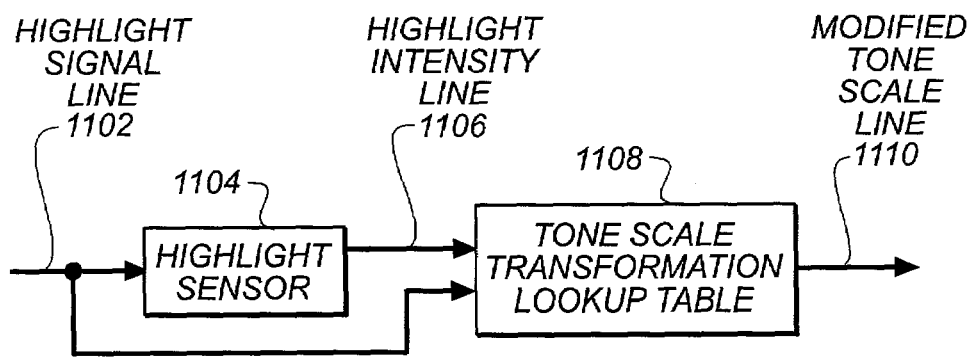
FIGS. 11a–f illustrate an apparatus and methods for processing the output of an electronic sensor, according to embodiments of the invention.

FIG. 11a shows an approach for implementing this highlight processor. The signal reproducing the highlights enters on highlight signal line 1102. Highlight sensor 1104 senses the presence of highlights in a region around the highlight. The information regarding the intensity of a highlight is sent on highlight intensity line 1106 to tone scale transformation lookup table 1108. This line causes tone scale transformations other than the normal range tone scale to be applied to the incoming image that enters tone scale transformation lookup table 1108 on highlight signal line 1102. A modified tone scale is output on modified tone scale line 1110 in the region of the highlight. The shape, size, and feathering of the region into the scene can be artistically adjusted, but once chosen, can be applied to scenes in general.

Figure 11B:
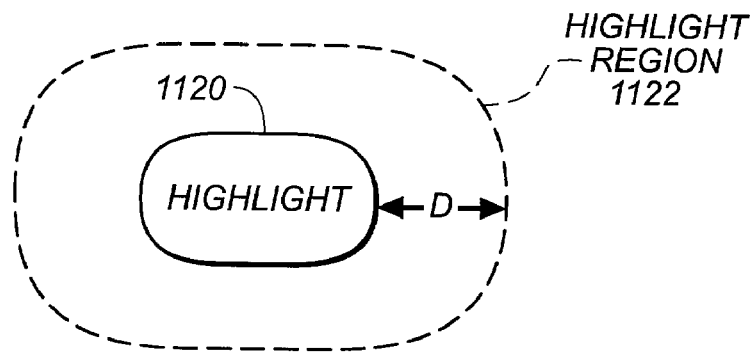
Figure 11C:
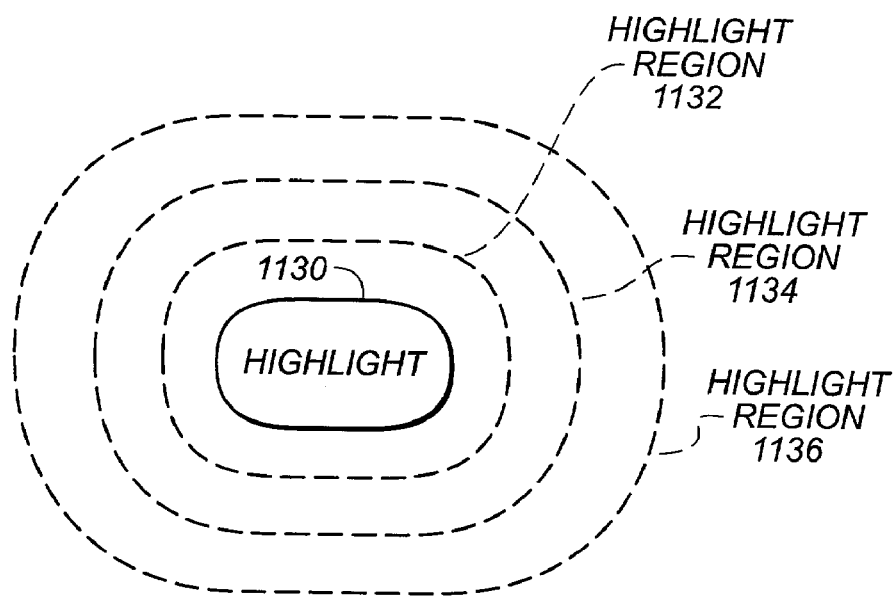
Figure 11D:
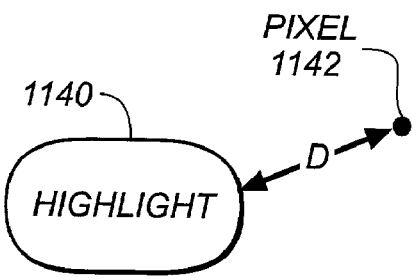

Highlight sensing within a region is shown in FIG. 11b, where a highlight 1120 within a scene causes a highlight region 1122 to be generated around it, shown by a dotted line. This highlight region 1122 boundary is defined as having a distance D from highlight 1120. Highlight regions can also be defined as a continuum. Thus, as shown in FIG. 11c, the highlight 1130 has highlight regions 1132, 1134, and 1136. Returning to FIG. 11a, outside of these regions, the signal on modified tone scale line 1110 corresponds to the signal on highlight signal line 1102. However, inside these regions, either a step change to a different contrast range as in FIG. 11b, a gradual change in contoured steps as in FIG. 11c, or a continuous change as shown in FIG. 11d. In FIG. 11d, pixel 1142 is designated as having a distance D from its closest highlight (highlight 1140, as illustrated) that has a given intensity. In order to manage this highlight appropriately so that it fits within the dynamic range of the data representing the scene, printer, or display, the range of the highlight must be attenuated by modifying the tone scale.

Figure 11E:
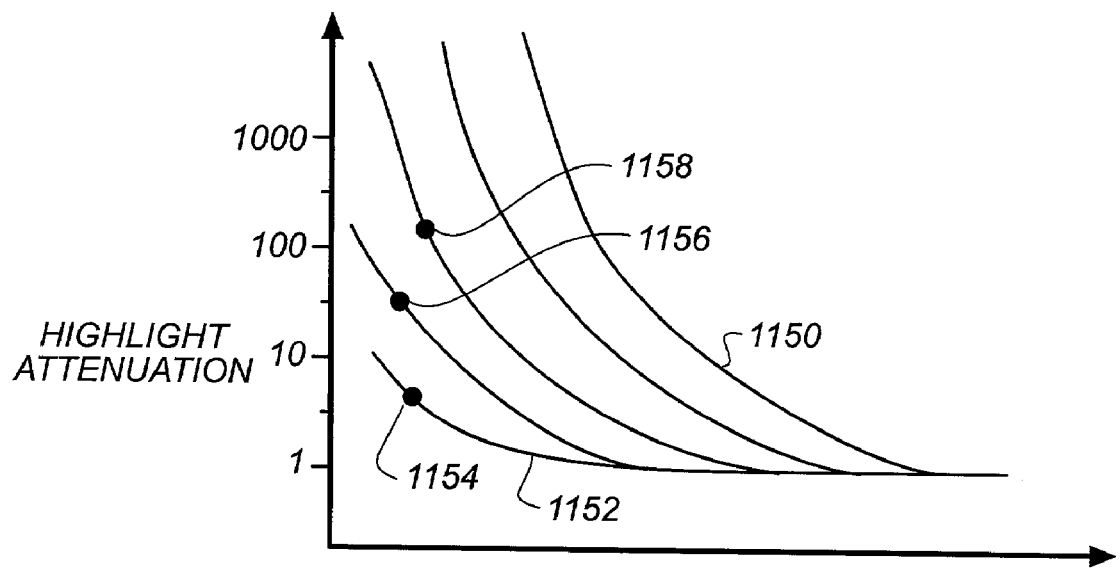

FIG. 11e shows a degree of highlight attenuation where the numbers on the vertical axis refer to the degree of highlight attenuation of the modified tone scale in linear scene exposure units. Every point on each of these lines corresponds to a tone scale and the specific lines, such as line 1150 refers to the locus of tone scale transformations that are selected as a function of distance D. The specific tone scale transformation applied to a given pixel will therefore depend on the distance from the highlight and the intensity of that highlight. For an intense highlight, the tone scale transformation locus will correspond to line 1150, while for a highlight that is not as intense, the locus of tone scale transformations will correspond to line 1152. Lines between 1150 and 1152 correspond to the tone scales for highlighted whose intensity values are progressively between these extremes. It will be appreciated that the exact shape of these curves will depend on artistic preference and the characteristics of the desired look. Examples of the Tone scale transformation are shown in FIG. 11f.

Figure 11F:
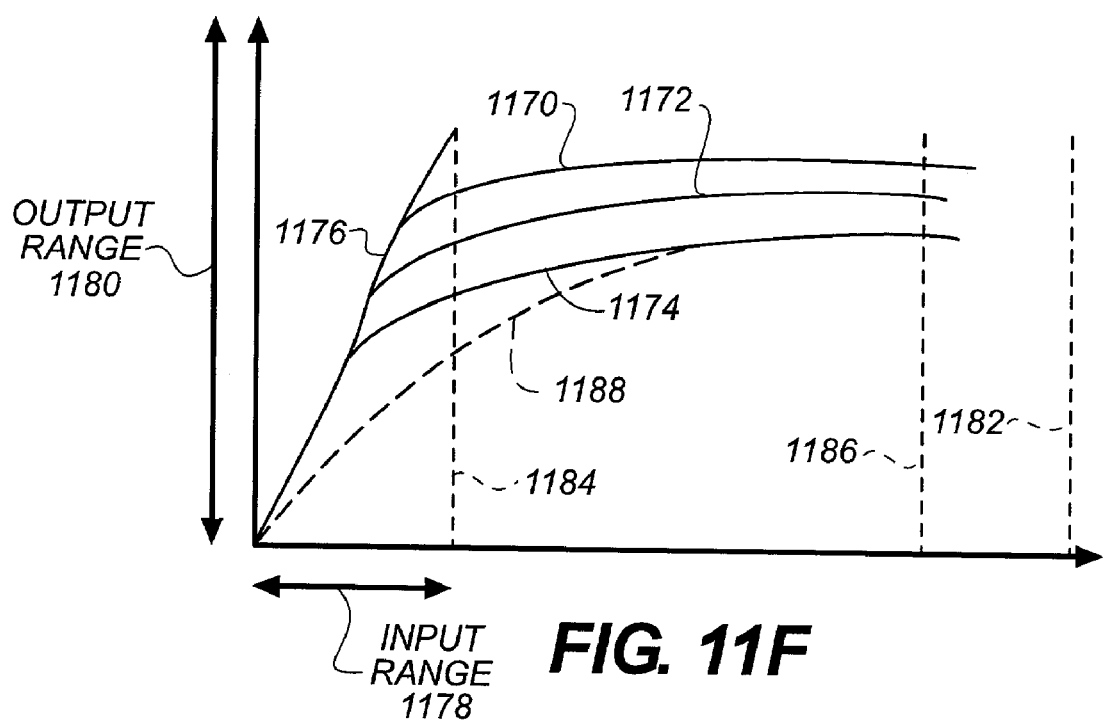

FIG. 11f shows examples of transformations performed by tone scale transformation lookup table 1108 (from FIG. 11a). Based on data passing on highlight intensity line 1106 corresponding to the distance from the highlight and the brightness of the highlight, tone scale transformations are selected for the transformation of the signal on highlight signal line 1102 to the signal on modified tone scale line 1110. For example, the tone scale transformation chosen at point 1154 in FIG. 11e may correspond to the transformation 1170 between the input on highlight signal line 1102 and modified tone scale line 1110. For point 1156 corresponding to a highlight of greater intensity, the transformation curve will correspond to transformation 1172. Similarly, for point 1158, the transformation curve will correspond to transformation 1174.

Transformation 1176 that continues upward corresponds to the situation where no transformation occurs. Specifically, input range 1178 corresponds to the normal input range of a scene without highlights, while the output range 1180 corresponds to the available dynamic range of the output channel or output device. Thus, the input data on highlight signal line 1102 will correspond to the output data on modified tone scale line 1110. However, as a highlight, for example, one which has ten times the brightness in scene exposure space, occurs corresponding to line 1152 in FIG. 11e, the transformation curve point 1154 would apply where the dotted line 1182 corresponds in scene exposure space to ten times the maximum level of line 1184 of the normal input range 1178. Thus, the highlight attenuation ratio is defined as the ratio of the maximum level of the tone scale transformation to the maximum level of the transformation curve. Thus, for transformation 1170, the highlight attenuation is the ratio of the input level of input level line 1186 to the normal input level of line 1184. While for white highlights these transformation curves may be the same, for each color for colored highlights, the transformation curve shown in FIG. 11f may be different.

The shape of the transformation curve affects the look and artistry of the image. For example, transformation 1188 corresponds to a transformation having the same highlight attenuation ratio as transformation 1174, but with a different shape giving a less contrasted look. As discussed previously, the lookup table, which is a function of input value, distance from a highlight, and intensity of a highlight, can be very large. However its size can be reduced using the techniques already discussed, including tri-linear interpolation. As already mentioned, such a lookup table may handle colors in the same manner or be sensitive to the fact that highlights can be colored, and generate tone scale transformations for each color channel, for example red, green, and blue.

Another method for handling highlights within the dynamic range is to suppress the highlight by reducing its size. This technique senses the presence of a highlight and then substitutes for the highlight values of surrounding colors. This approach may first identify whether the highlight is from a glossy or metallic surface. The approach for glossy surfaces can be to substitute the value of immediately surrounding pixels, while the approach for metallic surfaces may be to suppress the brightness of the highlight while preserving the color and texture.

Figure 12A:
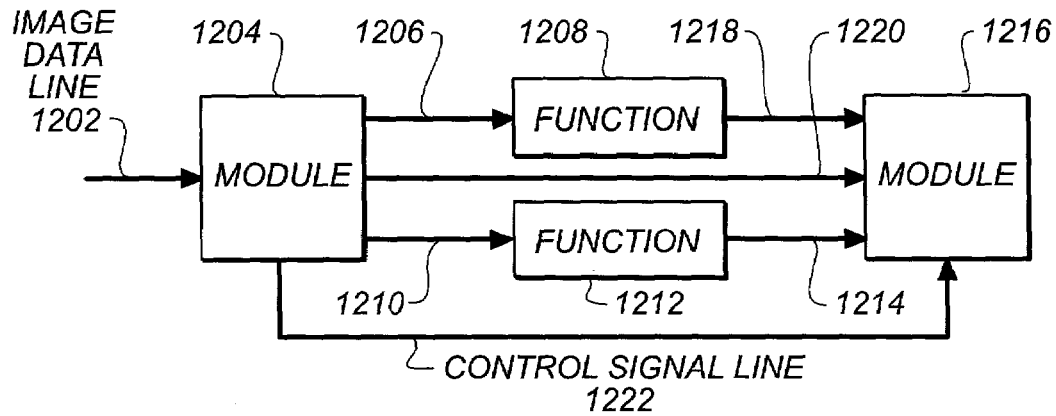
FIGS. 12a–b illustrate a block diagram of a system and method for suppressing highlights or changing the size of highlights, according to embodiments of the invention.

FIG. 12a shows a block diagram of a system for suppressing or reducing the intensity of highlights or changing the size of highlights. In FIG. 12a, image data enters on image data line 1202 and passes to a module 1204, which identifies the type of highlight by determining if the highlight (defined as a pixel whose brightness exceeds the level of 100% diffuse reflectivity) has the same color as the surrounding pixels. If it does, it is sent to function 1208 (which is similar to tone scale transformation lookup table 1108 in FIG. 11a along line 1206. If the highlight is identified as one from a neutral glossy surface, its central value will be brighter than 100% diffuse reflection and it will have a color close to the white point of the scene. In such a case, the data is passed on line 1210 to function 1212 where the image is transformed to have the same color as the surrounds.

Figure 12B:
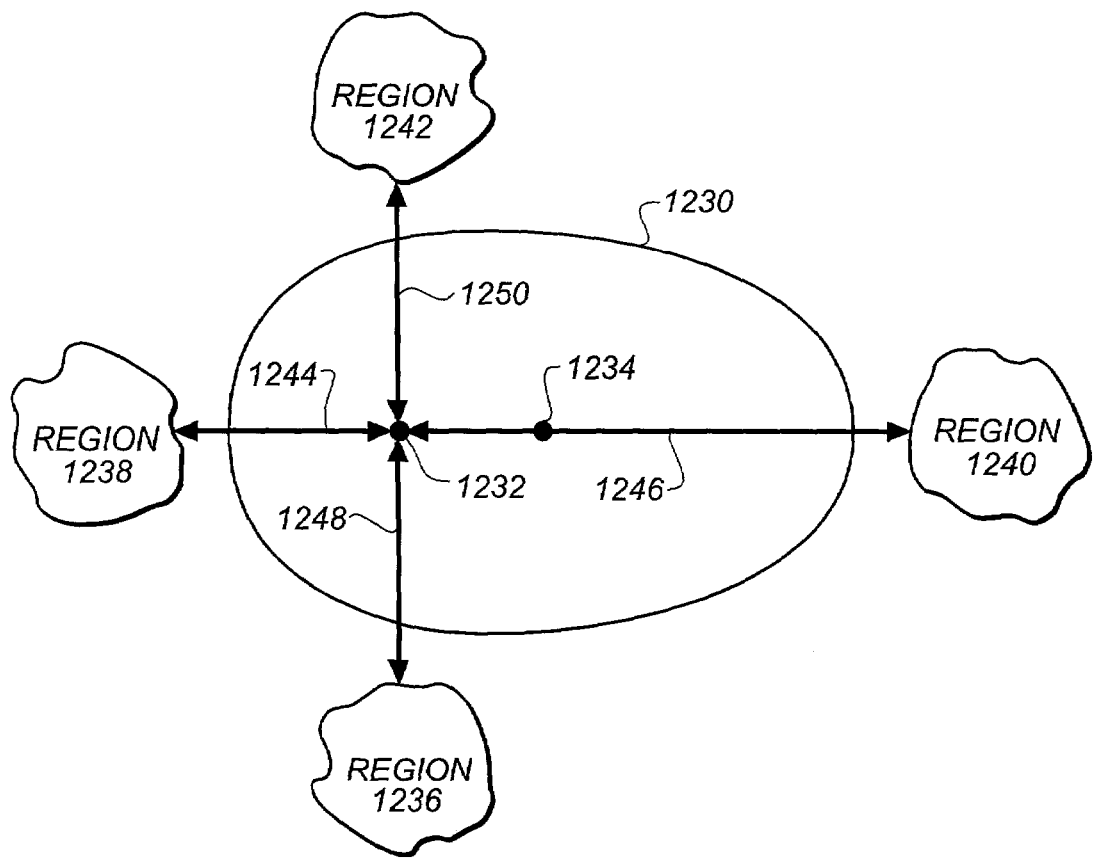

This operation is further explained in FIG. 12b, where a highlight having a boundary 1230 contains a number of pixels, for example pixels 1232 and 1234. The new value of each pixel is computed using bilinear processing from pixels in the region outside the highlight, such as regions 1236, 1238, 1240, and 1242, where the bilinear or higher order function is computed in RGB or YCC is based in the X direction on the ratio of the distance 1244 to the sum of the distances 1244 plus 1246. Similarly, the bilinear or higher order function interpolation in the Y direction is based on the ratio of the distance 1248 to the sum of the distances 1248 and 1250.

Returning to FIG. 12a, the new pixels are output from functions 1212 and 1208 to module 1216. Module 1216 selects the output of function 1208 on line 1218 corresponding to pixels from metallic surfaces, the output of module 1204 on line 1220 corresponding to unmodified pixels which are not associated with highlights, and the output of function 1212 on line 1214 corresponding to the bi-lineally or higher order function interpolated pixels which suppress glossy highlights. The selection of these outputs is determined by control signal line 1222 from module 1204, which is based on the classification performed in module 1204.

One approach to estimate the level of 100% diffuse reflectivity is to histogram each of the color channels across the scene. For each of red, green, and blue, the method involves plotting the value of intensity of the red, green, or blue along the X axis and the number of pixels at that intensity level along the Y axis. The level of the 100% white point can be chosen as the range at which the histogram count drops off for each color. There will be other non-zero values of the histogram count at brighter levels. For correctly exposed scenes, the point at which the histogram count drops off will fall within a range of the red, green, or blue level. Thus, the points at which the histogram count drops off for each color define the white point of the scene.

Different image applications will require different levels of image quality. Therefore, for various formats such as television, DVD, cinematographic projection, image preview, print, and graphic arts, the same degree of dynamic range, image fidelity, and accuracy may not be required. Thus, different degrees of processing, as well as additionally intercepting the image data stream and outputting for certain applications, may be appropriate.

Faithfully capturing the dynamic range of an image is an important part of preserving overall image quality and maximizing the dynamic range of an electronic image; however, many display and printing devices are unable to reproduce the up to million-to-one dynamic range that can be found in an accurately captured image. To ensure that the faithfully captured image lies within the dynamic range of the output device, regardless of whether it is a cathode ray tube, LCD display, ink jet printer, photographic print, television set, or movie screen, it is necessary to process the signal appropriately.

The method of processing the database collected during calibration depends on the method used for processing image data from the sensor. There are various ways to extend the range of a CCD and other electronic scene sensors. These various sensors may be grouped as follows:

1. Single output for each color at multiple discrete sensitivities
2. Single output for each color with non-linear response
3. Multiple outputs for each color
4. Single output for each color with a single channel for highlights
5. Single output from an image produced using a color filter array, with an array element for highlights Depending on the type of output, different correction strategies are applied.

The output from the class of system that includes a single output at multiple discrete sensitivities may take on one of several values, depending on the level of sensitivity. The goal of processing this data is to ensure that seamless transitions occur between data from one mode and data from another. This is extremely important because discontinuities between modes can produce contour lines in the resulting image produced by the sensor system. It is also important that the sensor not have a gap in values between the two modes. Alternatively, if there is a gap, it is important that it be minimized.

Figure 18A:
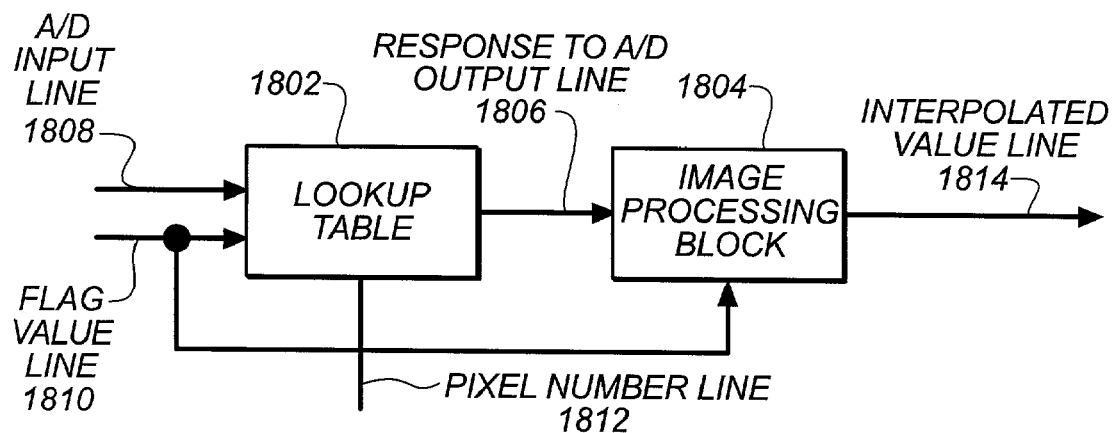
FIGS. 18a–c illustrate an apparatus for compensating for discontinuities between modes, according to embodiments of the invention.
Figure 18B:
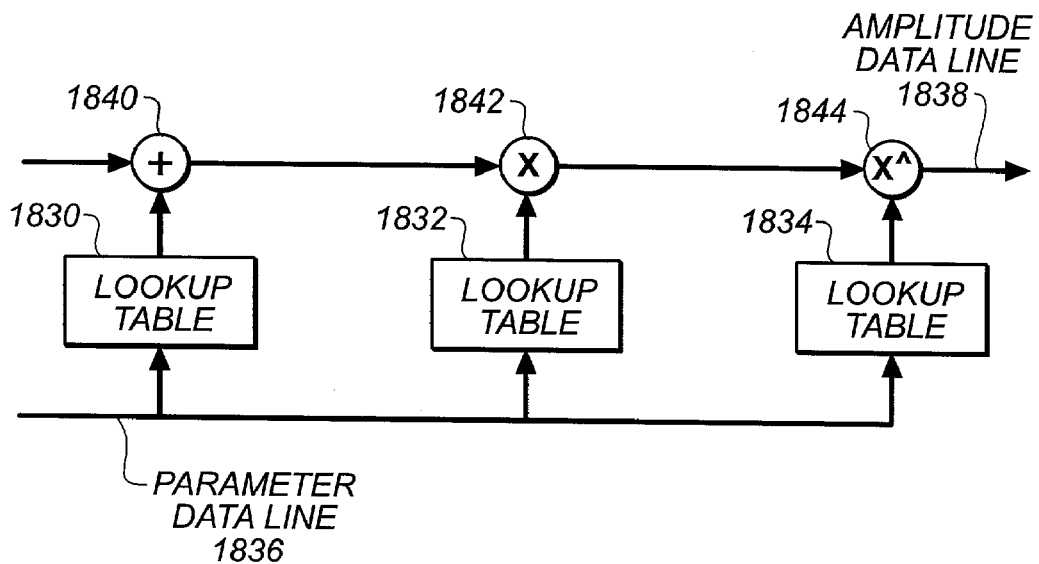
Figure 18C:
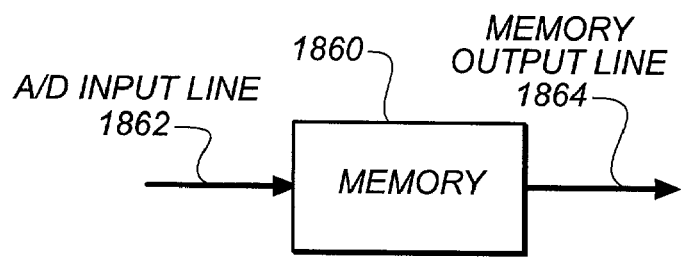
Figure 23:
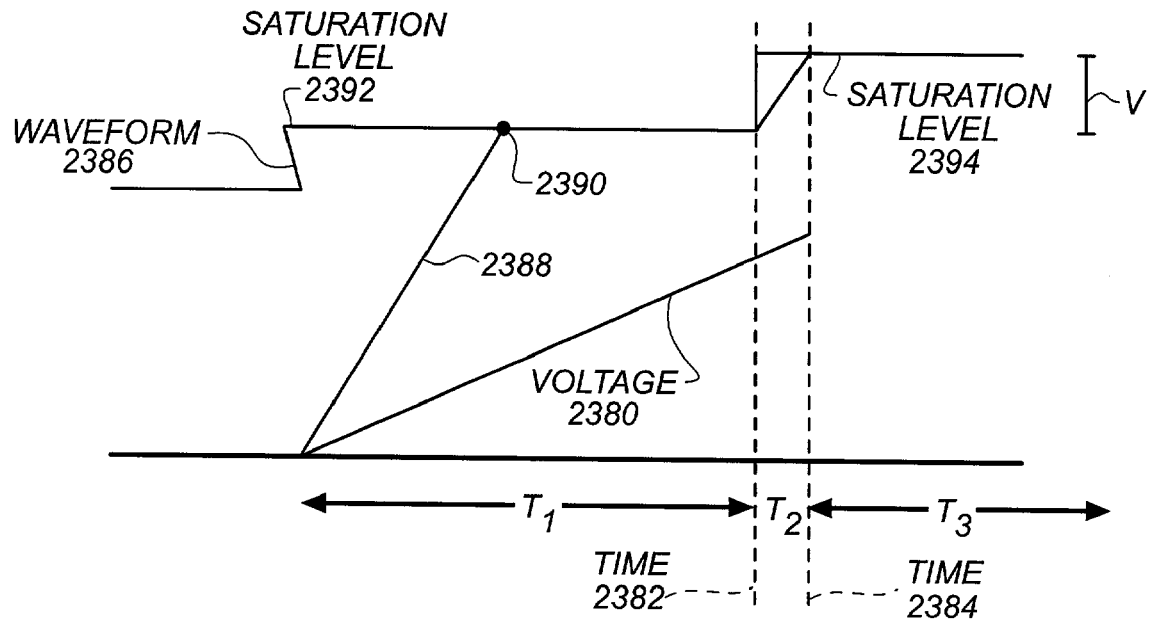
FIGS. 23 illustrates another sensor option according to embodiments of the invention.
Figure 25:
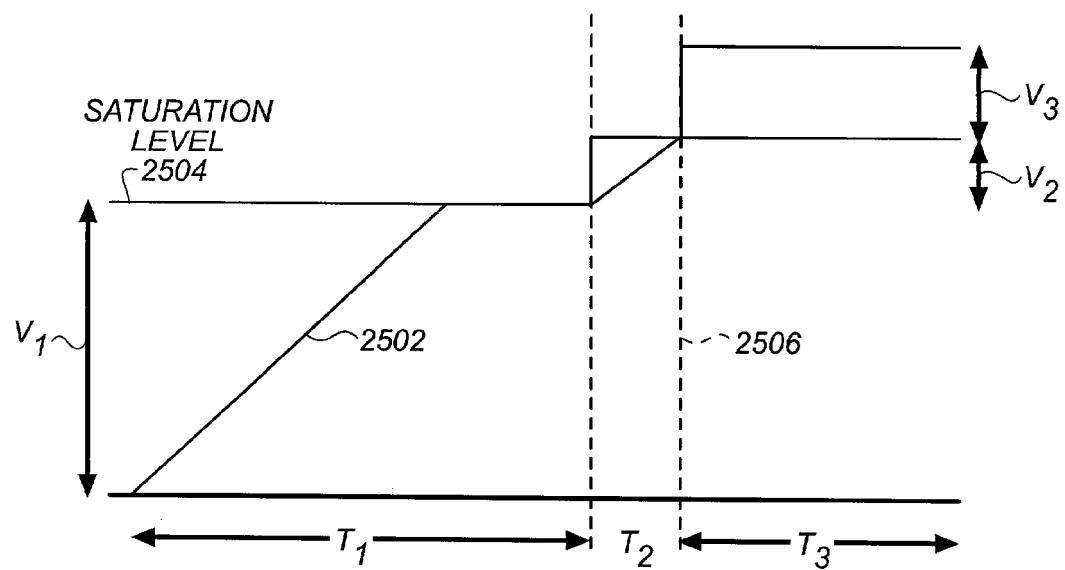
FIG. 25 illustrates a multiple breakpoint approach, according to embodiments of the invention.

FIGS. 18a–c illustrate an apparatus for compensating for discontinuities between modes. Specifically, FIG. 18a includes lookup table 1802 and image processing block 1804, which are coupled together via response to output line 1806. The signal enters from an A/D converter such as A/D 2354 in FIG. 23d on digital input line 1808. A flag value is received on flag value line 1810. Lookup table 1802 receives these values and outputs pixel values that correspond to the intensity of light sensed by the pixel converted from a multi-mode format at the input of lookup table 1802 to a single mode corresponding to the pixel response amplitude associated with conventional image data where a single value is used for each pixel intensity. Thus, lookup table 1802 contains a set of output values for each mode so that when input data corresponding to a specific mode of CCD sensitivity is received, the output values on line 1806 that correspond to the intensity of light sensed by the CCD pixel when operating in the mode specified by the flag value. FIGS. 23e and 25 show the type response that may occur to the input of an A/D (for example A/D 2354) and the A/D will produce a digital response proportional to these intensities. The goal of lookup table 1802 is to produce a merged value of pixel intensity by merging data from each mode of operation. This lookup table is loaded with values computed from the designed circuit response, or obtained experimentally using the experiments outlined with respect to FIGS. 6a–b. The resulting response for that data is the desired tone scale that spans the full range of sensitivity of the scene response data. At transitions of the flag bit, processing may be required to ensure that miscalibration does not produce contouring. If data indicating a switch from one mode to another on flag value line 1810 is sent to image processing block 1804, image processing block 1804 receives the data and stores neighboring values of the current pixel, and from those neighboring values, computes the slope or rate of change of video intensity in the neighborhood. Image processing block 1804 uses this information to predict the value of the current pixel and to predict whether the pixel is on the boundary of a mode switch. Image processing block 1804 computes an interpolated value between the predicted value and the actual value in order to mask any contouring. This interpolated value is passed out on interpolated value line 1814. In regions of the image away from the transition between modes, values on line 1806 are passed through unchanged to interpolated value line 1814.

Another technique for smoothly handling the transition between modes is to use sensors that simultaneously output data from both modes to form a weighted average between the two modes. For example, in a region of increasing intensity, the weighting of the signal between the two modes changes from a more sensitive mode to a less sensitive mode, before the less sensitive mode saturates. Thus, the weighting factor is programmed into a lookup table and is a function of light intensity. Another approach for a single output is to apply a digital processing function (similar to the feathering and rubber stamp operations found in Adobe Photoshop version 6.0) on the resulting image in the vicinity of the amplitude, where transition between modes are to occur.

If the sensor is of the type that requires calibration correction for each pixel, then the pixel address may enter lookup table 1802 on line 1812. This may substantially increase the size of lookup table 1802. Similarly, if other parameters such as temperature, overall image brightness, flare, response to neighborhood pixels, latent image keeping, sensor age, etc. also influence sensor response, then the size of lookup table 1802 will also increase. These variables may also be received on line 1812, and lookup table 1802 must be constructed (based on either calibration or modeling of the sensor) to generate values that are appropriate under those varying conditions, and based on this parameter data received on pixel value line 1812.

Some of these secondary corrections may not be so severe as to require an expansion of lookup table 1802. They may instead be entered as additions or multiplications of the lookup table output, and therefore depending on the overall system design as shown in FIG. 18b. Each of these corrections may have its own lookup table 1830, 1832, or 1834, respectively, each of which computes the appropriate offset values based on parameter data entered on parameter data line 1836. This parameter data may be any of the parameters mentioned above, including the pixel count, temperature, humidity, etc. Thus, on image data amplitude data line 1838, scene amplitude data is produced which is compensated for these values. Another way to reduce size of lookup tables 1830–1834 is by using multi-dimensional tri-linear, bilinear, or other interpolation techniques as part of the lookup table. Each of lookup tables 1830–1834 outputs a function 1840–1844, respectively, which alters the output mathematically for transmission or amplitude data line 1838.

One of the key issues in this type of system is managing movements in the intensity level thresholds between modes. Errors between the points where the lookup table expects the switch and where it actually occurs may, even with the image processing outlined above, introduce significant image artifacts. As previously discussed, a thorough calibration approach can address this issue, provided that all variables are monitored.

To address these errors, a number of techniques can be used. One is to monitor the switch point within the sensor by having the voltage switched in the CCD or light sensor so that, at regular intervals, the threshold level at every photo site is output in a data stream. This threshold stream is stored in a separate memory. This threshold memory data is then applied to the lookup table 1802 on line 1812, and lookup table 1802 is configured to correctly compensate for those levels. This is shown in FIG. 18c, where the output of an A/D converter, such as A/D 2354 in FIG. 23d, is routed to memory 1860 during quiescent time. The output of memory 1860 on memory output line 1864 becomes part of the input data set on pixel value line 1812 in lookup table 1802 (of FIG. 18a).

Figure 19A:
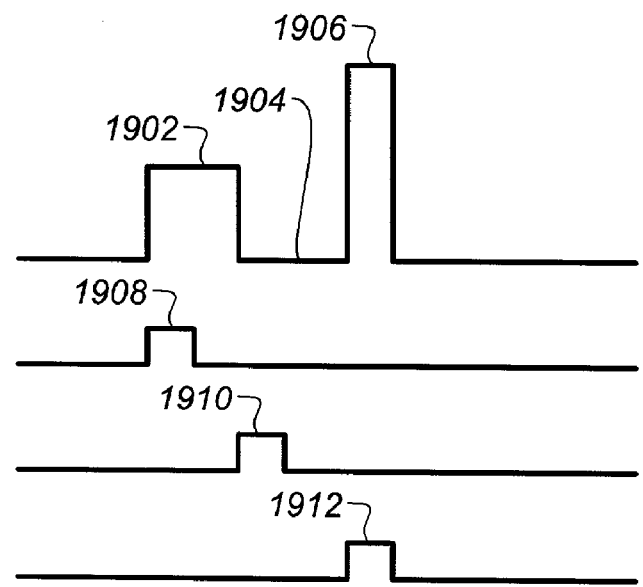
FIGS. 19a–b illustrate a method of managing the threshold point, according to embodiments of the invention.

Another method of managing the threshold point is to output it as part of the image stream together with the black level. This level would then be sampled by a sample and hold circuit. This sample would be used as a reference whenever the highlight or high intensity mode is enabled. This is shown in FIG. 19a, where an analog output signal from a light sensor contains three elements the signal intensity element 1902, the black reference element 1904, and the threshold sensing level 1906 (an output signal), which can, for example, correspond to the maximum output in the normal intensity mode. This threshold sensing level 1906 may also be used as white signal reference.

Figure 19B:
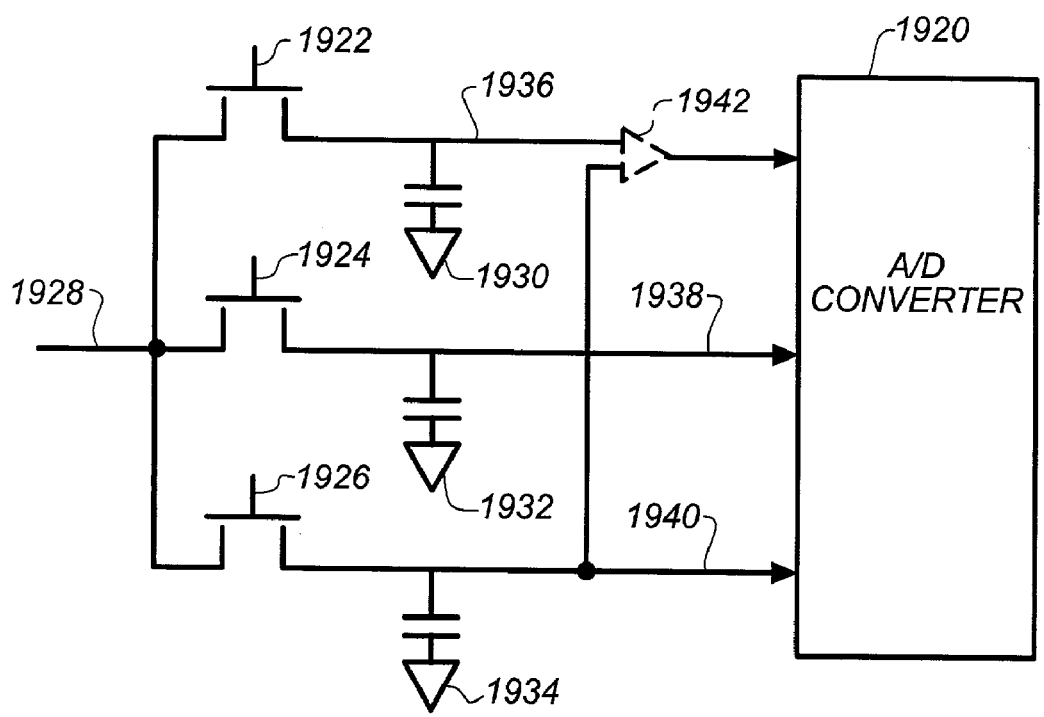

FIG. 19b illustrates a diagram where the signal from a light sensor on input line 1928, and switch 1922 (in an embodiment, a gating transistor) is enabled during period 1906 in response to time impulse 1912 so that capacitor 1930 can establish the white reference level for the normal range on line 1936. Pulse 1908 enables switch 1924 to establish the signal level, and capacitor 1932 to A/D converter 1920 on line 1938. The black level for A/D converter 1920 is established by pulse 1910 switch 1926 to establish through capacitor 1934 the black level on line 1940. This helps ensure that for each pixel the maximum value in the normal mode produces the same digital output level from A/D converter 1920.

These levels may be different when outputting during the high intensity mode. For example, if the sensor operates at a sensor threshold value, then the level on threshold sensing level 1906 may be the threshold value at which the decision is made to prematurely discharge the photo site during a first phase discharge cycle. In this case, the appropriate white level is this reference voltage V multiplied by the ratio of time when the sample is taken to the total possible integration time. This ratio is greater than one and will be a reference to the black level. Thus, in this case, a gain amplifier 1942 (shown using dotted lines) may be inserted, and its accurately controlled gain sets the reference of A/D converter 1920. Using a dual photosite, this gain must be compensated by the ratio of the sensitivity between the sites or the gain may be embedded in to the data used to create the lookup table.

Figure 13:
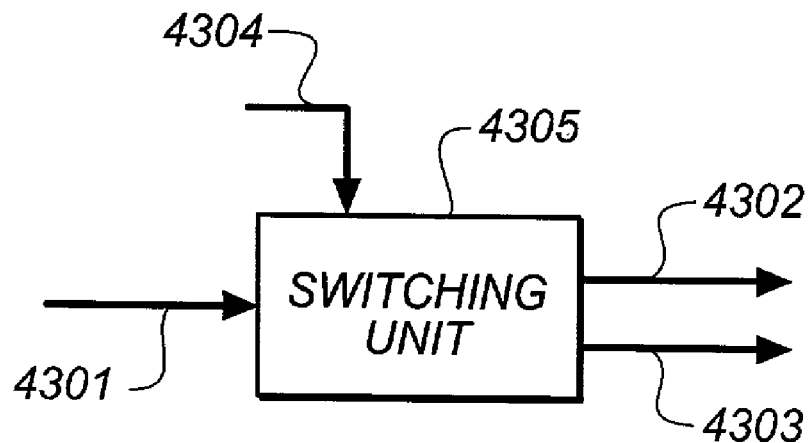
FIG. 13 illustrates a switching unit, according to embodiments of the invention.

The techniques explained below for multiple output channels for each color may also be used with a single output for each color at multiple discrete sensitivities and other imaging methods. To use it with this method as shown in FIG. 13, the single output from the sensor enters on line 4301 and a switching unit sensitive 4305 to the mode in which the sensor is operating which is communicated on line 4304 switches between modes to produce a signal on line 4302 when in the first mode and a signal on line 4303 when in the second mode. These signals can then go to 4302 and 4303 in FIG. 13, 2112 and 2113 in FIG. 21 and 2212 and 2213 in FIG. 22 respectively. The switching unit 4305 may perform the calibration function.

To process signals from sensors that provide a single output for each color with a non-linear response to intensity, so as to achieve the necessary dynamic range to handle highlights, the techniques shown in FIGS. 18a–b and related FIGS may be used. With these types of sensors, individual calibration of photo sites using the brute force technique of one lookup table or one lookup table bank per photo site, or an extensive lookup table that can receive photo site numbers (or addresses) and access the appropriate look up table region may be required. Alternatively, a clustering technique for identifying classes of photo site response and then indexing to those may be more cost effective. Threshold profiles as a function of sensor temperature may be applied by sending, as one of the inputs to the lookup table, values relating to the temperature of the sensor, so that shifts or drifts of the non-linearity profile (due to temperature changes) may be corrected.

Scanned film systems where the initial image is on film and the final image is electronic fall into this class. Calibration may be performed using the techniques shown in FIGS. 6a–b and 2b. It may be also necessary to add color filters to these systems during the calibration process. The individual frames produced from different colors at different intensities are scanned to produce the calibration database. Calibration may be performed on a film-type-by-film-type basis or on a batch-to-batch basis. In the case of calibration on a batch-to-batch basis, the data would be provided for the batch so that the values to be loaded into the lookup table 1802 for each color channel change with each batch.

Figure 20:
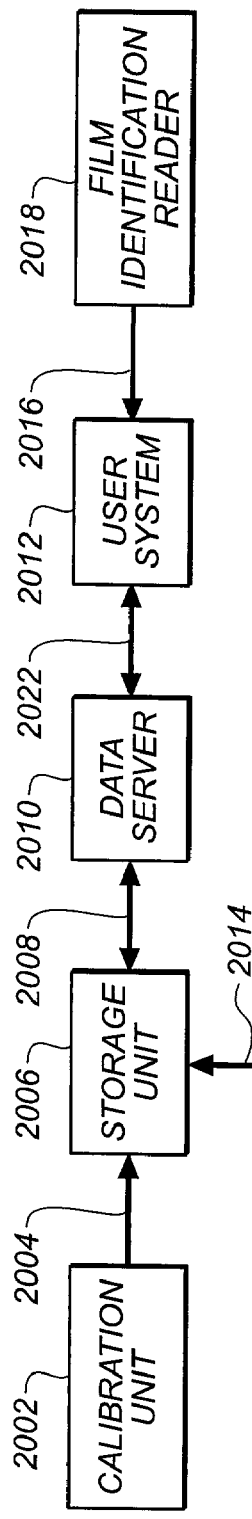
FIG. 20 illustrates an apparatus for calibrating film, according to embodiments of the invention.

The non-linearity of film in a film to electronic image system may be similarly calibrated using an automatic system for calibrating film by downloading the film batch or other ID via the Internet or other electronic communication technique to provide data automatically into the system for appropriate calibration. This is shown in FIG. 20 where calibration unit 2002 generates calibration data based on specific film type and/or batch number. This data together with the film/batch information is transmitted on line 2004 to storage unit 2006. Data server 2010 receives input requests via the Internet on line 2008 or other communication from user system 2012, including identification and password information on line 2022. Requests for data are passed on line 2008 to storage unit 2006 (in one embodiment, a memory), which provides calibration data to data server 2010 and to user system 2012. If data is, for example, shelf life dependent, processor system 2020 (on a regular basis) accesses calibration data stored in storage unit 2006 along line 2014 and modifies the calibration data in accordance with shelf life models for the change in calibration characteristics as a function of time. Thus, when user system 2012 accesses data based on identification information on line 2016 from film identification reader 2018, calibration data provided to user system 2012 is compensated for shelf life degradation.

Additional data such as time of exposure, conditions of exposure, film development methods, and related data are also sent by user system 2012 to data server 2010. Based on this information, processor system 2020 can modify the calibration data stored in storage unit 2006 so that the calibration data is appropriate for the conditions communicated from user system 2012. This calibration data is then loaded into user system 2012 to ensure that, during the process of scanning the film for which the calibration data has been provided, the data produced is accurately calibrated to the film.

Another method for ensuring that the film scanning process is accurately calibrated to the film is to send the data along with the film in an appropriately encoded form. Thus, the data could be stored in a CD ROM or bar code system associated with the film, and the user system scanning the film could read the information at time of scan. Another way to modify data based on film history including processing and developing is to perform the modification functions within the scanner based on the data downloaded directly from encodings on the film.

Different approaches between these two extremes may be used. For example, data may be provided to all regular users of scanners in the form of a CD ROM, and this may be used as the basis for calibration using functional or lookup table approaches. Data, which is batch-specific or process-specific, may then be downloaded as a modification for the base data. These modifications may be incremental fractional, first, second, third, and/or fourth order changes to the data or may be parametric where the data may be stored and transmitted as coefficients of a pre-established correction equation that is applied to the image stream to correct for film characteristics. The parameters or coefficients of the equation may be re-specified or incrementally modified by the downloaded data.

When multiple outputs for each color are provided due to for example, mode switching in electronic sensors, multiple data streams are produced from each output, or a mode status signal may be used to show an output mode that is valid for each of the light levels encountered by each photo site or outputs from each channel may be available. When multiple output channels are used for each color, it is generally necessary to merge these multiple output channels into a single channel, or to provide separate images or image layers corresponding to each channel. However, if separate images or image layers are used, calibration can be on a per image basis. Generally, it will be necessary to merge these various image layers, and this merging operation of calibrated layers may be performed using techniques that render the boundary between the layers imperceptible.

One method of performing this is by shooting a reference image such as a ramp or test image and using this image to achieve calibration in the transition area between channels. When multiple output channels are used, there may be a considerable overlap where both channels can legitimately contribute to the image. In this case, calibration is simplified because there is a region where weighted averaging between channels is applied.

A method for handling merging between channels is to define a function $F(C_1,C_2)$ where $C_1$ and $C_2$ are signals from each of the channels and F defines the combined response between the two channels. This function is defined for the area of overlap or joining between channels. In general, $C_1$ and $C_2$ will be the calibrated response of each channel. Function F has coefficients $M_1, M_2, \ldots M$. V is the response of the combined channels as a result of the function F in the region of overlap and $C_1$ and $C_2$ in the region outside overlap and $$V=V(F,C_1,C_2).$$

Filtering the function V produces a smoothed version of V, $V_s$. By computing using Newton, Conjugate, or related techniques, the minimal error defined is the sum of the pixel errors across a range of images from the sensor, where the pixel errors are defined, for each pixel, as $$(V^2-V_s^2)^2.$$

Optimization selects the values of the coefficients M, to produce an optimal function, F that will be determined under the appropriate constraints. The nature of these constraints depends on the specific data being created and specific form of the functions being implemented. It is often necessary to experiment with different constraints before the optimal solution is found. Constraints generally are associated with bounding the available ranges of the coefficient M. Thus, constraints may be experimentally derived, for example, to constrain the values of M to converge on a solution or due to constraints that arise from the physical limitations of the software or hardware implementing the function F.

Figure 14:
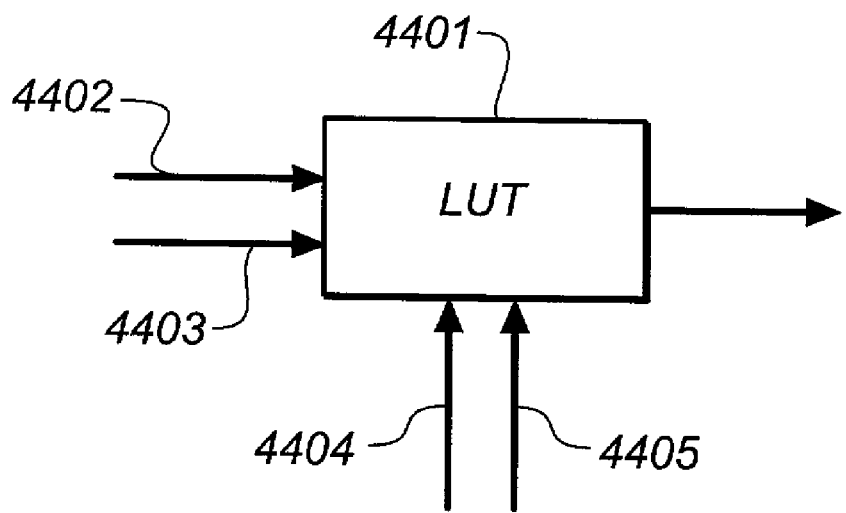
FIG. 14 illustrates a response function unit, according to embodiments of the invention.

In some cases, although data $C_1$ and $C_2$ are calibrated, the function F will be a function of individual pixels. This can occur when the point at which channel overlap occurs varies pixel-by-pixel. In this case a number of solutions are possible as previously discussed. Once the function V has been computed, it can be imbedded in a lookup table as shown in FIG. 14 where lookup table 4401 receives on line 4402 data $C_1$ and on line 4403 data $C_2$ together with pixel identifying data on line 4404 and additional parameter data on line 4405. Pixel line identifying data on line 4404 may be individual pixel data or may be pixel cluster identifying data.

Figure 21:
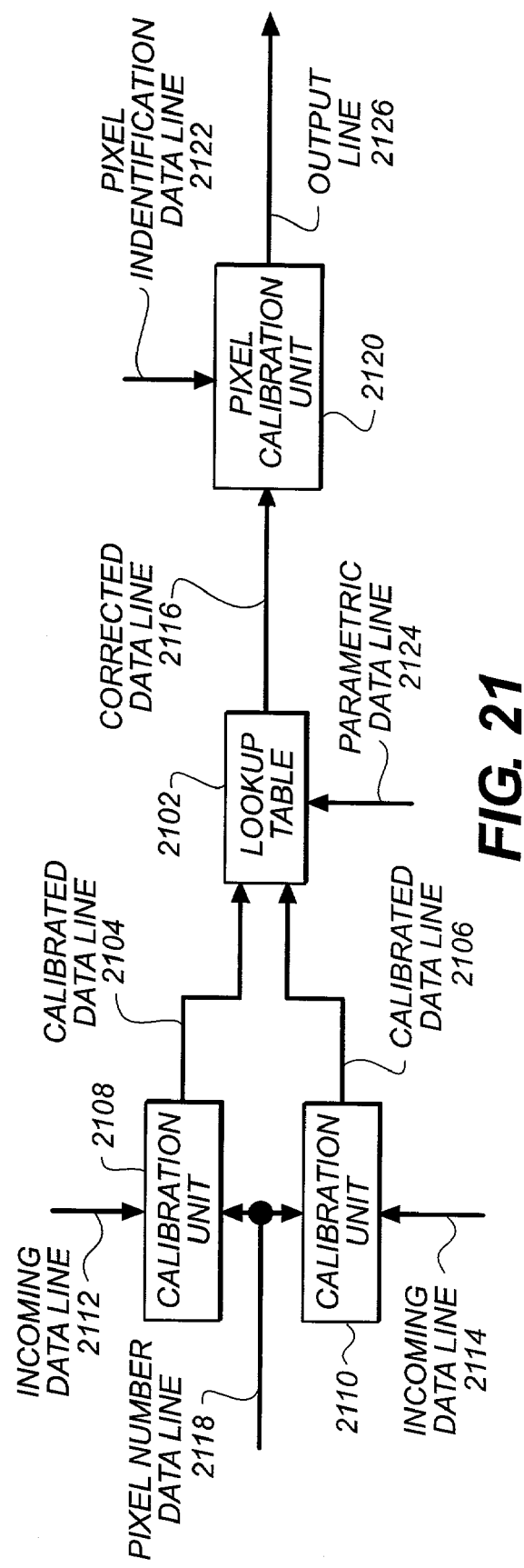
FIG. 21 illustrates an apparatus for calibrating data, according to embodiments of the invention.

When calibrated, data normalized to the switch point is used, as shown in FIG. 21. In FIG. 21, data $C_1$, which enters on calibrated data line 2104, and $C_2$, which enters on calibrated data line 2106, are first calibrated in calibration units 2108 and 2110 based on incoming data on incoming data lines 2112 and 2114, respectively, from the light sensor. This data is then received into lookup table 2102 where the function V is applied to produce corrected data on corrected data line 2116. Calibration units 2108 and 2110 will both calibrate the incoming data based on pixel values entered on pixel value line 2118. Similarly, pixel calibration, to remove the breakpoint normalization, will be performed in pixel calibration unit 2120 based on the pixel identification data received on pixel identification data line 2122. Using this approach, lookup table 2102 may account for parametric data, such as temperature and other variables, which is received on parametric data line 2124. Pixel calibration unit 2120 transmits output to output line 2126. However, lookup table 2102 will be greatly reduced in size because it does not require pixel calibration data.

Figure 22:
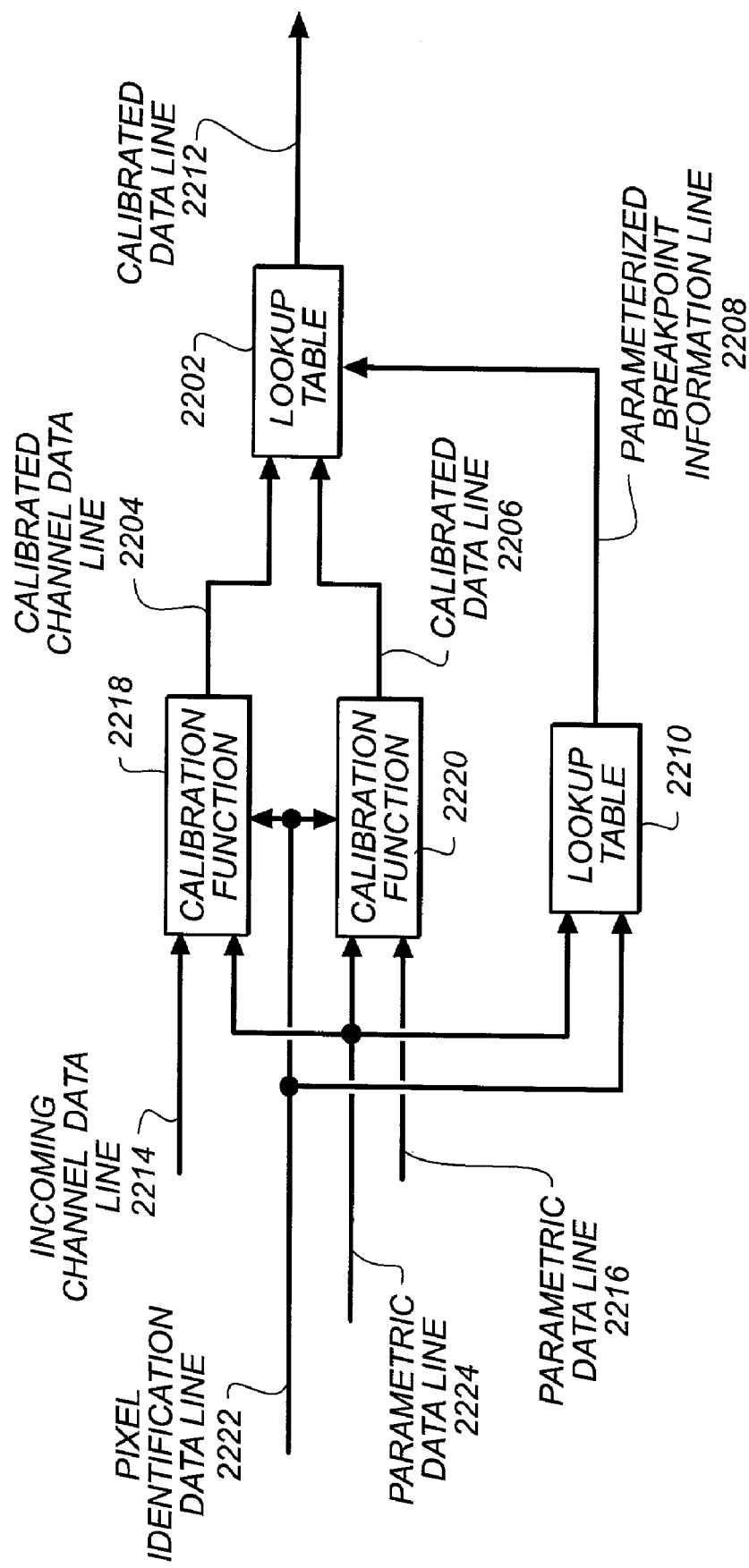
FIG. 22 illustrates a block diagram for performing calibration based on parameterized values for the breakpoint, according to embodiments of the invention.

FIG. 22 illustrates a block diagram for performing calibration correction based on parameterized values for the breakpoint. Incoming data from the sensor enters on incoming channel data line 2214 and parametric date line 2224 into calibration functions 2218 and 2220, respectively. Information received on pixel identification data line 2222 is used together with parametric data received on parametric data line 2224 to calibrate the incoming channel data on incoming channel data lines 2214 and 2216. Calibrated channel data appears on calibrated channel data lines 2204 and 2206, and is transmitted to lookup table 2202, which receives data on parameterized breakpoint information line 2208 corresponding to parameterized breakpoint information generated in lookup table 2210. This data is generated as a function of a pixel number and other parameter information such as temperature, and contains the breakpoint parameter data, which is used to select the coefficients M in look up table 2202. This produces a single calibrated stream of data on calibrated data line 2212.

Sensors designed for accommodating highlights, or highlight sensitive sensors can be provided in a number of different ways as previously discussed. In another embodiment, the maximum CCD well voltage is set to a certain value for most of the integration time. Then, the well value is briefly increased. FIG. 23e illustrates primary integration time $T_1$, where a cell integrates with a voltage 2380 until the conclusion of $T_1$ at time 2382 and then continues into the integration time $T_2$ (which may be $1/100^{th}$ or $1/100^{th}$ of $T_1$), where the voltage on the cell continues to increase. The conclusion of the integration time is at time 2384. The threshold voltage is shown as waveform 2386, where it is increased by a voltage V at time 2382 for the integration time $T_2$.

However, a cell with a high intensity of light falling on it is shown increasing its voltage along line 2388 and reaches saturation at point 2390. It then maintains saturation level 2392 during the remainder of integration period $T_1$. Then, waveform 2386 is increased during time $T_2$, and because the brief period of the integration time $T_2$, although the voltage increment is small between saturation levels 2392 and 2394, as indicated by voltage V. The site does not reach saturation during time $T_2$, and therefore is able to be discharged during time $T_3$, producing a voltage that is related to the intensity of the highlight. Calibration of this system is performed by measuring cell response described herein thereby accurately determining saturation level 2394 at the output of the electronic sensor.

Alternatively, in another procedure embodiment, the threshold level may be set for each photosite by determining the saturation level 2392 at the output of the electronic sensor. This may be done during the exposure to highlights in a procedure that has no second period $T_2$. This procedure ensures that all cells are charged to the saturation level. This enables the calibration process to measure the sensor output corresponding to the saturation level 2392 for every photosensitive site in the sensor.

The saturation level 2392 may not be constant but may be influenced by the amount of light falling on the photocell due to resistance in the path between the photo site and the saturation reference voltage source. This resistance may occur at both the source and drain or cathode and anode side of the photo site. This resistance will only be apparent when the photo site is in the saturation mode as it is only at that time that current is flowing through the photo site into the reference voltage source. This resistance will also affect the apparent level of the saturation level 2392, the reference voltage. Thus, part of the process must be able to account for variations in this resistance from site to site. If the technique is not able to account for the variations in this resistance, the highlight accuracy will suffer. Once saturation level 2392 is determined, the slope of each mode can be determined, and these values can become parameters in the computation of the highlight calibration lookup tables referred to in the herein.

Figure 24:
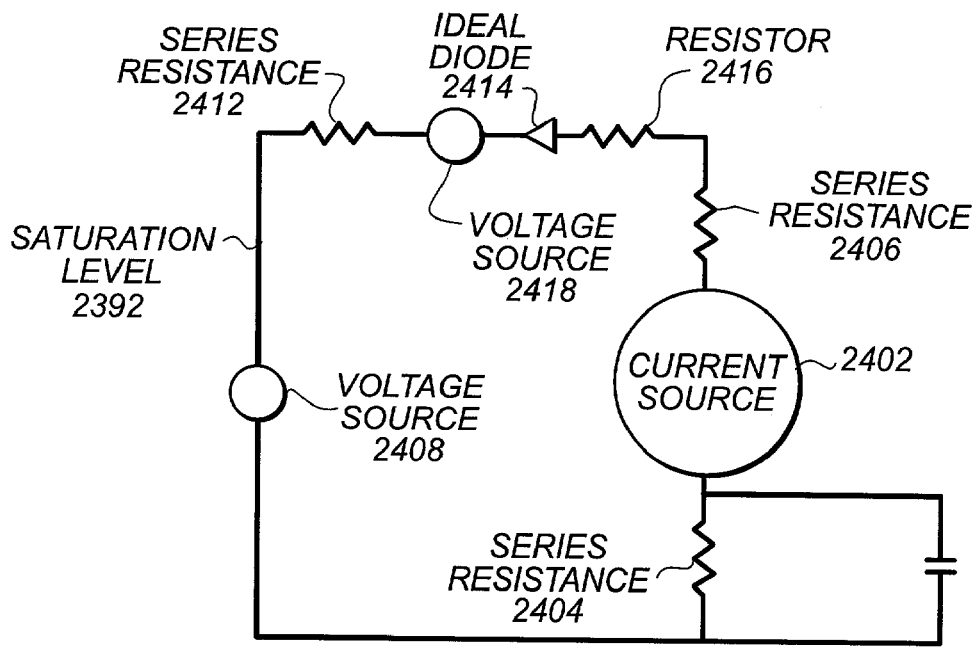
FIG. 24 illustrates a model of a photosite in discharge mode, according to embodiments of the invention.

FIG. 24 shows a model of a photosite in a discharge mode. The photosite is modeled as current source 2402 with series resistance 2404 and 2406 and the switchable voltage reference at saturation level 2392 is generated by voltage source 2408 that has series resistance 2412 and an ideal diode 2414. Resistor 2416 is added to model as the effective series resistance of the diode and this resistance value will change with the amount of current flowing into ideal diode 2414. Voltage source 2418 models the forward voltage of diode 2414. Returning to FIG. 23, the current source 2402 switches between initial saturation level 2392 during $T_1$ and to saturation level 2394 during $T_2$. The effect of these components can be factored into the choice of the form of functions F and $K(O, X_0, X_{iti}, \ldots, X_n$ referred to herein.

Specific sources of variation from photosite to photosite (and also with regard to temperature and light intensity) include: photosite dark current, photosite sensitivity, photosite linearity, photosite series resistance 2404, photosite series resistance 2406, resistor 2416, current source 2402, series resistance 2412, voltage source 2408, variation in the $T_1$ integration time, variation in the $T_2$ integration time, and CCD discharge gate resistance.

By calibrating using the measurements and analysis procedures described herein these variables are implicitly addressed by measuring the response of the light sensor or sensors at a calibrated range of values. As a result, data is produced that takes into account all of these factors that have an impact on the sensor response to highlights and across the entire range of the sensor. Thus, the method for determining light intensity from the output of this particular device architecture is to use the calibration methods outlined herein. The ratio of $T_1$ to $T_2$, coupled with the voltage V and the sensitivity of the photo site, determines the amount of additional range that this technique provides. Other components that have some effect on this function are the values of series resistance 2404, 2406, and 2412, voltage sources 2408 and 2418, and resistor 2416.

If an approach with multiple break points is required, then the process explained in FIG. 25, which provides a signal break point, may be repeated as shown previously where periods $T_1$, $T_2$, and $T_3$ are used in conjunction with voltages $V_1$, the initial voltage for charging, $V_2$, and $V_3$. Voltage on the photosite initially accumulates along line 2502 to saturation level 2504 and then remains saturated until $T_2$ where saturation first occurs. Integration continues until dotted line 2506, which corresponds to the discharge time. Additional steps may be used, and while these additional steps do consume both available integration time and available integrated cell voltage, they more than make up for this by increasing the dynamic range of the sensor 100 or even 1000 fold. In these embodiments, various techniques may be used for electronic sensing. These include CMOS, CCD, and Light Intensifiers, using avalanche and secondary emission techniques. Many of these techniques also apply in Vidicon and related sensor technologies.

Figure 26:
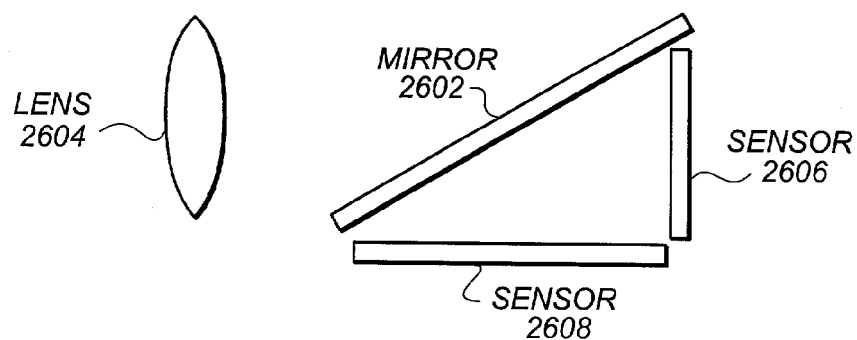
FIG. 26 illustrates a multiple sensor approach, according to embodiments of the invention.

In an additional embodiment, a further technique is to use a separate CCD or sensor device and image a highly attenuated version of the image onto the CCD using optical methods. This is shown in FIG. 26, where a lightly silvered beam splitter mirror 2602 is positioned behind the sensor optical lens 2604 to form an image on sensors 2606 and 2608. The image on sensor 2608, due to the light silvering of mirror 2602, will receive a far lower intensity image profile and therefore be able to more accurately capture the highlights in the image. Techniques for signal processing the signals from these sensors to achieve a single calibrated video or data stream will be described.

Figure 27:
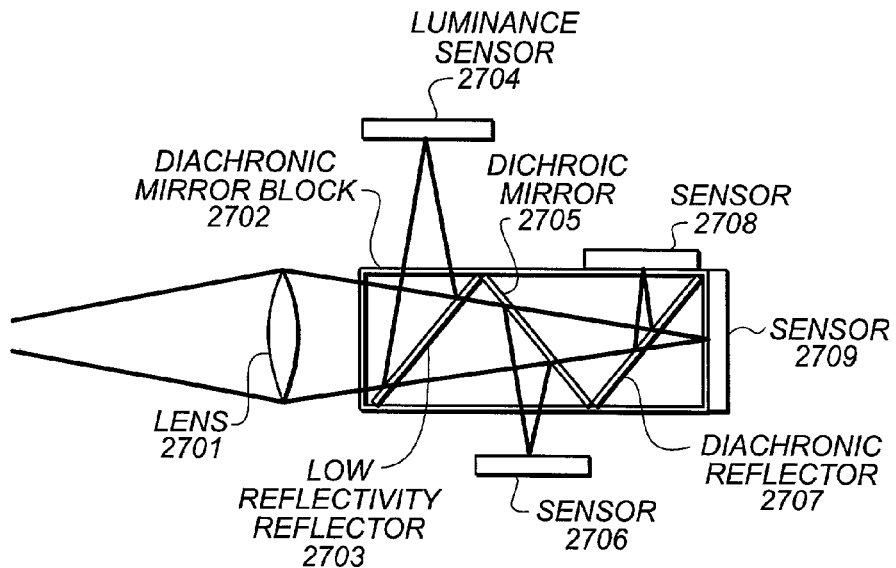
FIG. 27 illustrates a single highlight sensor in conjunction with color sensors, according to embodiments of the invention.

It is also possible as shown in FIG. 27 to use a single highlight sensor in conjunction with color sensors. For example optical lens 2701 images a beam through diachronic mirror block 2702. Low reflectivity reflector 2703 within the block reflects for example high intensity images including highlights to a luminance sensor 2704. If desired this sensor could use a colored filter array to provide color information regarding the highlights or it may simply sense the luminance of the scene. However, most of the light will pass through the low reflectivity mirror 2703 to dichroic mirror 2705 which for example will reflect red light to sensor 2706. The remaining light will pass to diachronic reflector 2707 where for example green light is passed to sensor 2708 and the remaining blue light passes to sensor 2709.

Figure 28:
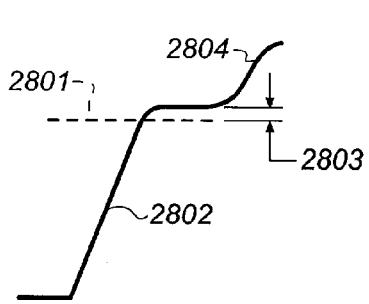
FIG. 28 illustrates the charging profile that can result from a resistive element between the photosite and the reference voltage, according to embodiments of the invention.

Because specular highlights will inevitably result in overflow of the CCD well in areas of the image where the highlight occurs, another method is to ensure that this overflow generates small calibrated increases of well voltage which can be later processed to compute the value of the specular highlights. This may involve using a diode or similar structure used to produce the increases. FIG. 28 shows the charging profile that can result from a resistive element between the photo site and the reference voltage. The reference voltage 2801 is encountered by the voltage accumulating due to a charge on a specific photosensitive site. Once this voltage is reached, the saturation level 2804 in excess of the voltage reference 2801 is quiescently reached. The voltage offset 2803 is determined by the light intensity, the effective resistance between the photo site and the voltage reference level 2601, and the forward voltage of any diode or any other element in the overflow path.

Figure 29:
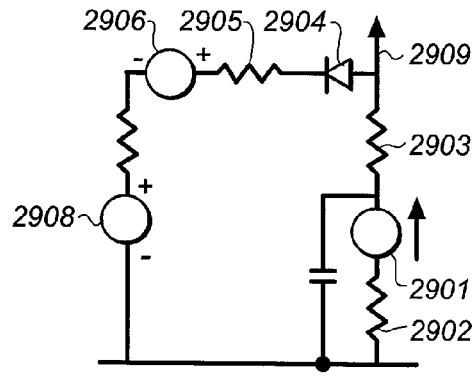
FIG. 29 illustrates a model of a photosite, according to embodiments of the invention.

This is illustrated in FIG. 29, where the photo site is modeled as a current source 2901 with series resistors 2902 and 2903 and the saturation overflow path is modeled through ideal diode 2904 series resistor 2905 and forward voltage element 2906. Reference voltage with its series resistor 2907 is modeled as voltage source 2908. Each of these values will affect the relationship between light intensity and sensor output.

Figure 30:
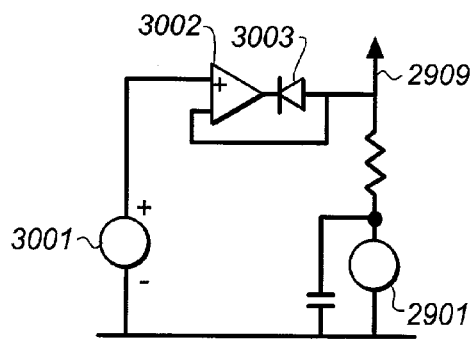
FIG. 30 illustrates an op-amp discharge mechanism, according to embodiments of the invention.

Alternatively, a CMOS element in a source follower or drain follower configuration may be used to enable the discharge in either FIG. 23e or FIG. 25. This will provide different discharge characteristics. An op-amp discharge mechanism illustrated in FIG. 30 may also be used. Voltage reference 3001 establishes a reference for operational amplifier 3002 and diode 3003 connects to photo site 3001. Discharge path for the photo site is through connection 2909 on both Figures.

A further method is to use a single CCD site with multiple resets. As that site reaches close to the saturation value within a certain fraction of the integration time, the specific site is reset. In the remaining time, a faster integration is performed, thereby rendering the CCD site less sensitive.

The timing configuration for this approach is illustrated in FIGS. 31a and 31b. FIG. 31a shows the case where photo site is in a highlight area or in a high intensity area. During the integration time 3101, the photo site charges towards the saturation level of site 3102. At time 3103, a check is made by a comparator at the site to see if intermediate capacity level 3104 has been exceeded. If so, at time 3105, the site is discharged as shown, and at time 3106, is clamped at a zero reference level until time 3108, when it is released for a second integration time from 3108 to 3107. This briefer integration time enables a site with highlights to charge and remain within the capacity range 3102. For a cell that is not saturated, FIG. 31b shows the charge cycle along line 3110 that has a more shallow slope than the slope in FIG. 31a from the start of period 3101 to time 3107 at which it is discharged.

The advantage of this approach is that both charging cycles begin at the same voltage level. However, it is still necessary to have a calibration technique that can accurately calibrate in spite of changes of the level 3104, so that a seamless image may be achieved for areas where photo site charge level would be close to 3104 at time 3103—that is within the region where this process transitions from the single charge mode to the dual charge mode.

There are a variety of ways to communicate to the external control electronics and calibration electronics that must process the resulting signal. One way is to actually discharge through the CCD transfer mechanism the output signal at time 3105 and then again at time 3107. In the case of FIG. 31b, there is no discharge at time 3105, whereas in FIG. 31a, there is a discharge signal at 3105 and 3107. This means that there must be two discharge cycles for every exposure. This can increase power dissipation on the sensor.

An alternative approach to signaling which cycle the site discharge corresponds to is to exclude charge ranges that occur during the output of the single discharge cycle (FIG. 31b) by inserting an offset in the output of one of the cycles to enable differentiation. For example, a discharge from the condition shown in FIG. 31a could result in negative charge by switching in a current mirror circuit in the discharge path at 3107 if a second charge has taken place. This is illustrated in FIG. 32. Light sensor site comprising current source 3201 and capacitor 3202 charges up, and its resulting voltage is sensed by comparator 3203, which receives at its other input a voltage V corresponding to threshold level 3204. Gating pulse 3204 at time 3203 latches the output of comparator 3203 in D flip flop 3205 and the output of the D flip flop 3205 is sent to AND gate 3206 whose other input corresponds to the timing pulse beginning at time 3105 and ending at time 3108. This timing pulse causes the transistor 3207 to discharge the photo site capacitor 3202 corresponding to discharge 3106. At the end of this time corresponding to 3108, transistor 3207 is released as a result of the timing pulse on gate 3206 on input 3209, releasing at time 3108. The discharge pulse on line 3210 goes to AND gates 3211 and 3212, and depending on the condition of flip flop 3205, either discharge path gate transistor 3213 or 3214 is closed to initiate the discharge along line 3215 to the CCD transfer mechanism. Gate 3214 is turned on if flip-flop 3205 has not been activated by the output of 3203 (corresponding to the condition of FIG. 31b). However, if flip flop 3205 has been activated at time 3207 corresponding to the pulse appearing on line 3210, gate 3212 causes transistor 3213 to discharge current from capacitor 1602 through current mirror 3216, to provide a negative signal on line 3215, thereby signaling that the gate has switched to the highlight mode as shown in FIG. 31a.

Figure 33:
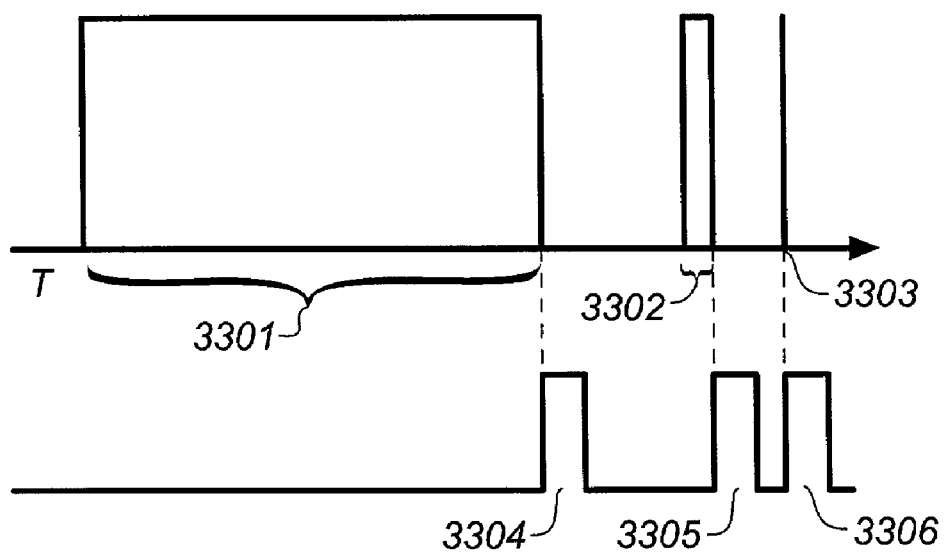
FIG. 33 illustrates a multiple discreet exposures approach, according to embodiments of the invention.

Another approach is to use multiple discrete exposures with different integration times such that the resulting image dynamic range covers the entire range of the scene. This multiple approach may require motion compensation between frames. This is illustrated in FIG. 33. A series of three exposures may be made at times corresponding to the normal exposure time 3301, $\frac{1}{30}^{th}$ normal exposure time 3302, and $\frac{1}{1000}^{th}$ normal exposure time 3303. Each of these are discharged through the CCD array or other electronic sensor at times 3304, 3305, and 3306, and the three frames of the image are then stored in three frame buffer memories and correlated in the signal processing section such as shown in FIGS. 18a–b. For example in FIG. 18a, the image output of each of the frame buffers is sequentially sent along line 1808 to lookup table 1802. The flag value line 1810 indicates the specific frame buffer that is reading out thus the lookup table produces an output signal indicating the intensity of light falling on the sensor. Alternatively the three frame store memories may output data in a pixel interleaved manner (that is the corresponds to firstly the normal exposure time 3101 for a given pixel, then the $\frac{1}{30}^{th}$ normal exposure time 3102 for that pixel and finally $\frac{1}{1000}^{th}$ normal exposure time 3103 for that pixel. Then lookup table 1802 would output the value based on which one of the three inputs for that pixel corresponded to the linear range of the sensor.

Photographic film is often able to capture the full dynamic range of a scene. However, this full dynamic range is generally not communicated to the viewer through conventional optical techniques. However, it is possible to scan the photograph using digital scanning techniques, and capture the full dynamic range that is found on the film. Thus, it is possible to produce a digital signal that represents the dynamic range. Digital intermediate is a term used to describe the process of inserting a digital image processing after film origination or before film output.

Figure 34:
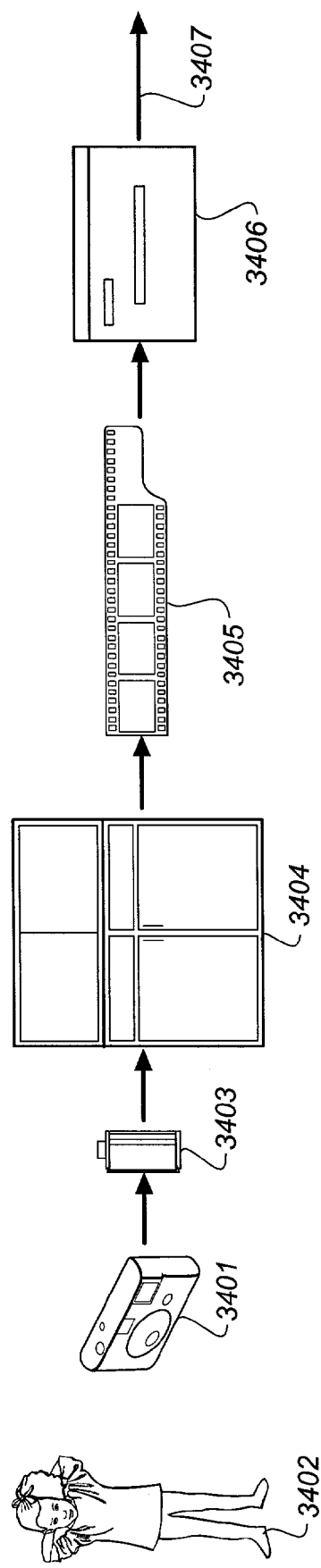
FIG. 34 illustrates a hybrid imaging approach, according to embodiments of the invention.

Another term that is used to describe this approach is hybrid imaging. The term is used because the approach as illustrated in FIG. 34 is a mixed combination of film processing and digital processing. The film is exposed and captured by a photographic film camera 3401 that views scene 3402. The film 3403 is processed to produce a film negative in film processor 3404. This processed film 3405 is scanned in scanner 3406 to produce digital data on line 3407 corresponding to the scene 3402. If the scanner is properly designed and calibrated using techniques that accurately describe the density or transmittance of the negative 3405 and if this data is transferred into an appropriate digital format, the information regarding highlights on the film can be captured. This flow also is included on the general diagram shown in FIG. 35b An example of this technology is the Cineon scanner using Cineon color space image data described in SMPTE standard 244M. In highlight regions, this is not specifically calibrated unless the techniques disclosed herein are employed.

The present invention has been described with respect to multi-mode electronic image sensors. However, the present invention can also be applied to scanned film where highlight corrections/shaping is possible by identifying and correcting highlight regions.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An electronic camera, comprising:
   a multi-mode image sensor having an array of light sensitive elements, wherein the sensor provides an output signal derived from the array, and wherein the output signal has a transfer function that includes a normal sensitivity region, a highlight sensitivity region, and a breakpoint between the regions; and a correction circuit for correcting differences between breakpoints of the transfer function, wherein the differences are caused by different light sensitive elements of the array, and wherein the correction circuit includes at least one lookup table, wherein the at least one lookup table has an input to identify a plurality of particular light sensitive elements of the array, and wherein the at least one lookup table has an output to provide a same cluster identifier for each of the plurality of particular light sensitive elements.

2. An electronic camera as recited in claim 1, wherein the correction circuit includes a second lookup table, wherein the second lookup table has an input to identify a particular light sensitive element of the array, and wherein the second lookup table has an output to provide a correction value.

* * * * *